United States Patent
Cao

(10) Patent No.: US 12,212,391 B2
(45) Date of Patent: Jan. 28, 2025

(54) ELECTRONIC DEVICES AND COMMUNICATION METHODS

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/366,698

(22) Filed: Aug. 8, 2023

(65) Prior Publication Data

US 2023/0387986 A1 Nov. 30, 2023

Related U.S. Application Data

(63) Continuation of application No. 17/865,423, filed on Jul. 15, 2022, now Pat. No. 11,757,510, which is a
(Continued)

(30) Foreign Application Priority Data

Sep. 27, 2018 (CN) .......................... 201811127709.2

(51) Int. Cl.
 *H04B 7/06* (2006.01)
 *H04L 5/00* (2006.01)
 (Continued)

(52) U.S. Cl.
 CPC ......... *H04B 7/0617* (2013.01); *H04B 7/0695* (2013.01); *H04L 5/0053* (2013.01);
 (Continued)

(58) Field of Classification Search
 CPC ... H04W 72/23; H04W 76/19; H04W 72/046; H04W 16/28; H04W 74/0833;
 (Continued)

(56) References Cited

U.S. PATENT DOCUMENTS 10,123,322 B1* 11/2018 Nam ..................... H04B 7/0617
10,764,024 B2* 9/2020 Hafeez ..................... H04L 5/18
(Continued)

FOREIGN PATENT DOCUMENTS

CN 108023717 A 5/2018
WO 2018/118409 A1 6/2018
(Continued)

OTHER PUBLICATIONS

Vivo, "Discussion on beam measurement, beam reporting and beam indication", R1-1717472_ 3GPP TSG RAN WG1 Meeting #90bis, Oct. 3, 2017, full text.
(Continued)

*Primary Examiner* — Eva Y Puente
(74) *Attorney, Agent, or Firm* — XSENSUS LLP

(57) ABSTRACT

Disclosed are electronic devices and communication methods. An electronic device comprises a processing circuit, the processing circuit being configured to: receive an RRC signaling and/or a MAC CE signaling from a control-side electronic device; determine, based on a first beam indication information of control channel in the RRC signaling and/or the MAC CE signaling, an activated beam for performing a transmission in the physical control channel with the control-side electronic device; rewrite the activated beam based on a second beam indication information of control channel included in a downlink control information (DCI) carried by a physical downlink control channel (PDCCH); and use the rewritten activated beam to perform the transmission in the physical control channel with the control-side electronic device.

15 Claims, 29 Drawing Sheets

Related U.S. Application Data continuation of application No. 17/258,171, filed as application No. PCT/CN2019/107438 on Sep. 24, 2019, now Pat. No. 11,431,391.

(51) Int. Cl.
*H04W 72/044* (2023.01)
*H04W 72/23* (2023.01)
*H04W 52/02* (2009.01)

(52) U.S. Cl.
CPC ......... *H04L 5/0094* (2013.01); *H04W 72/046* (2013.01); *H04W 72/23* (2023.01); *H04W 52/0216* (2013.01)

(58) Field of Classification Search
CPC ..... H04W 24/08; H04W 24/10; H04W 24/04; H04B 7/0695; H04B 7/088; H04B 7/06964; H04B 7/0617; H04B 7/0408; H04B 7/024; H04B 7/0626; H04B 17/373; H04L 5/0053; H04L 5/0048; H04L 5/0023; H04L 5/001; H04L 5/0094; H04L 5/0051; H04L 5/0035; H04L 5/005
USPC ........................................................ 375/272
See application file for complete search history.

(56) References Cited

U.S. PATENT DOCUMENTS

| | | | |
|---|---|---|---|
| 11,483,721 | B1 | 10/2022 | Enescu et al. |
| 2018/0359790 | A1* | 12/2018 | Ingale ................. H04W 72/51 |
| 2019/0150124 | A1 | 5/2019 | Nogami et al. |
| 2020/0022067 | A1 | 1/2020 | Pan et al. |
| 2020/0137588 | A1* | 4/2020 | Zhang ................. H04L 5/0053 |
| 2021/0152233 | A1 | 5/2021 | Pan et al. |
| 2021/0153215 | A1 | 5/2021 | Guan et al. |
| 2021/0281305 | A1 | 9/2021 | Grant et al. |
| 2021/0306867 | A1 | 9/2021 | Hamidi-Sepehr et al. |
| 2021/0352646 | A1 | 11/2021 | Li |
| 2022/0132549 | A1 | 4/2022 | Yu et al. |
| 2023/0037605 | A1 | 2/2023 | Koskela et al. |
| 2023/0121938 | A1 | 4/2023 | Zhou et al. |

FOREIGN PATENT DOCUMENTS

| | | |
|---|---|---|
| WO | WO-2018128970 A1 | 7/2018 |
| WO | 2018/143702 A1 | 8/2018 |

OTHER PUBLICATIONS

Intel Corporation, "On beam indication on control and data channel" 3GPP TSG RAN WG1 #88 R1-1702200 , TSGR1_88 Feb. 7, 2017 p. 1-p. 4.

International Search Report and Written Opinion mailed on Nov. 19, 2019, received for PCT Application PCT/CN2019/107438, Filed on Sep. 24, 2019, 8 pages.

Apple Inc., "Discussion on beam measurement and reporting", 3GPP Draft; R1-1802288 Discussion on Beam Measurement and Reporting, 3rd Generation Partnership PROJECT(3GPP), Mobile Competence Centre 650, Route Des Lucioles, F-06921 Sophia-Antipolis Cedex; France, vol. RAN WG1, No. Athens, Greece: Feb. 26, 2018-Mar. 2, 2018, Feb. 17, 2018 (Feb. 17, 2018), XP051397818, Retrieved from the Internet: URL:http:/www.3gpp.org/ftp/tsg%5Fran/WG1%5FRL1/TSGR1%5F92/Docs/.

CATT: Consideration on Beam Management, 3GPP Draft; R1-1717812, 3rd Generation Partnership Project(3GPP), Mobile Competence Centre 650, Route Des Lucioles, F-06921, Sophia-Antipolis Cedex; France, vol. RAN WG1, No. Prague, CZ: Oct. 9, 2017-Oct. 13, 2017 Oct. 8, 2017 (Oct. 8, 2017). XP051340997, Retrieved from the Internet: URL:http://www.3gpg.org/ftp/Meetings_3GPP_SYNC/RAN1/Docs/.

Ericsson: "Analysis of beam indication signaling options", 3GPP Draft; R1-1718743, Analysis of Beam Indication Signalling Options, 3rd Generation Partnership Project(3GPP), Mobile Competence Centre 650, Route Des Lucioles, F-06921, Sophia-Antipolis Cedex; France, vol. RAN WG1, No. Prague, CZ: Oct. 9, 2017-Oct. 13, 2017 Oct. 3, 2017 (Oct. 3, 2017), XP051353231. Retrieved from the Internet: URL:http://www.3gpp.org/ftp/tsg_ran/WG1_RL1/TSGR1_90b/Docs/.

LG Electronics: "Clarification on PDCCH beam indication by higher layers", 3GPP Draft; R1-1800362 BM_Final, 3rd Generation Partnership Project(3GPP), Mobile Competence Centre 650, Route Des Lucioles, F-06921, France, vol. RAN WG1, No. Vancouver, Canada: Jan. 22, 2018-Jan. 26, 2018 Jan. 13, 2018 (Jan. 13, 2018), XP051384817, Retrieved from the Internet: URL:http://www.3gpp.org/ftp/tsg%5Fran/WG1%5FRL1/TSGR1%5FAH/NR%5FAH%5F1801/Docs/.

Qualcomm, "Beam management for NR", 3GPP Draft; R1-1718541, 3rd Generation Partnership Project(3GPP), Mobile Competence Centre 650, Route Des Lucioles, F-06921, Sophia-Antipolis Cedex; France, vol. RAN WG1, No. Prague, P.R. Czechia; Oct. 9, 2017-Oct. 13, 2017 Oct. 8, 2017 (Oct. 8, 2017), XP051341723, Retrieved from the Intenet: URL:http://www.3gpp.org/ftp/Meetings_3GPP_SYNC/RAN1/Docs/.

Qualcomm, "Summary on Beam management Beam Management Offline", 3GPP Draft; Summary of Beam Mgmt Contribution V7, R1-1718541, 3rd Generation Partnership Project(3GPP), Mobile Competence Centre 650, Route Des Lucioles, F-06921, Sophia-Antipolis Cedex; France, vol. RAN WG1, No. Nagoya, Japan, Sep. 18, 2017-Sep. 21, 2017 Sep. 26, 2017 (2017-09-252, XP051353998, Retrieved from the Internet: URL:http://www.3gpp.org/ftp/tsg_ran/WG1_RL1/TSGR1_AHINR_AH_1709_Docs/.

Samsung, "Discussion on beam indication for UL transmission", 3GPP Draft, R1-1720304, 3rd Generation Partnership Project(3GPP), Mobile Competence Centre 650, Route Des Lucioles, F-06921, Sophia-Antipolis Cedex; France, vol. RAN WG1, No. Reno, USA, Nov. 27, 2017-Dec. 1, 2017 Nov. 17, 2017 (Nov. 17, 2017), XP051368952. Retrieved from the Internet: URL:http://www.3gpp.org/ftp/tsg%5Fran/WG1%5FRL1/TSGR1%5F91/Docs/.

* cited by examiner

| 460 | | |
|---|---|---|
| R | serving cell index | BWP-ID |
| R | PUCCH resource ID 461 | |
| S7 | S6 | S5 | S4 | S3 | S2 | S1 | S0 |

462

ELECTRONIC DEVICES AND COMMUNICATION METHODS

CROSS-REFERENCE TO RELATED APPLICATIONS

This application is a continuation of U.S. application Ser. No. 17/865,423, filed Jul. 15, 2022, which is a continuation of U.S. application Ser. No. 17/258,171, filed Jan. 6, 2021 (now U.S. Pat. No. 11,431,391), which is based on PCT filing PCT/CN2019/107438, filed Sep. 24, 2019, which claims priority of Chinese patent application No. 201811127709.2 filed on Sep. 27, 2018, and the content of each of which hereby incorporated by reference in their entirety as a part of this application.

TECHNICAL FIELD

The present disclosure relates to electronic devices and communication methods, and in particular, to an electronic device and a communication method with a beam indication with a short latency in a 5G New Radio (NR) system.

BACKGROUND

5G NR technology is rapidly developing and standardizing. Since the carrier frequencies used by a 5G NR system may be in a wide range from 700 MHz to 70 GHz, user-side electronic devices (for example UEs) and control-side electronic devices (for example base stations) need to employ activated beams with high directivity. For this reason, 5G NR systems usually use a process called "beam management" to optimize the directivity of activated beams.

The beam management process selects and maintains activated beams used for transmissions between the user-side electronic device and the control-side electronic device. The beam management process in the 5G NR system may generally include three sub-processes: a beam measurement process, a beam reporting process, and a beam indication process, wherein, the performance of multiple receive/transmit beam pairs between the user-side electronic device and the control-side electronic device is measured via the beam measurement process, then the measured result is reported to the control-side electronic device via the beam reporting process, the control-side electronic device in turn indicates to the user-side electronic device, via the beam indication process, activated beams to be used for transmitting/receiving. The beam management process enables control-side electronic devices and user-side electronic devices to use activated transmit/receive beams with good directivity for uplink transmissions or downlink transmissions.

In the beam management process, some systems use a Radio Resource Control (RRC) signaling and/or a MAC Control Element (MAC CE) signaling to perform the beam indication process. However, due to inherent properties of the RRC signaling and the MAC CE signaling, the use of these signaling will result in a great latency. For example, for some user-side electronic devices, processing of the MAC CE signaling has an inherent latency. These latencies will not only degrade system performance but also degrade user experience.

SUMMARY

The present disclosure provides communication methods and electronic devices that have reduced latency of beam indication, which enables the control-side electronic device and the user-side electronic device to dynamically adjust activated beams to be used, with a DCI that is carried by the physical downlink control channel, thereby reducing the latency of beam indication.

An aspect of the present disclosure relates to an electronic device comprising a processing circuit configured to: receive an RRC signaling and/or a MAC CE signaling from a control-side electronic device; determine, based on a first beam indication information of control channel in the RRC signaling and/or the MAC CE signaling, an activated beam for performing a transmission in a physical control channel with the control-side electronic device; rewrite the activated beam based on a second beam indication information of control channel included in a DCI that is carried by a physical downlink control channel (PDCCH); and use the rewritten activated beam to perform a transmission in the physical control channel with the control-side electronic device.

A further aspect of the present disclosure relates to an electronic device comprising a processing circuit configured to: send an RRC signaling and/or MAC CE signaling to a user-side electronic device, the RRC signaling and/or the MAC CE signaling including a first beam indication information of control channel, and the first beam indication information of control channel indicates to the user-side electronic device an activated beam for a transmission in the physical control channel; send a DCI to the user-side electronic device through a physical downlink control channel (PDCCH), the DCI including a second beam indication information of control channel, and the second beam indication information of control channel indicates to the user-side electronic device an activated beam for the transmission in the physical control channel; and use the activated beam as indicated by the second beam indication information of control channel to perform the transmission in the physical control channel with the user-side electronic device.

Another aspect of the present disclosure relates to an electronic device comprising a processing circuit configured to: receive, through a physical downlink control channel (PDCCH), a DCI from a control-side electronic device; determine, based on a first beam indication information of data channel in the DCI, a first activated beam for the physical data channel that is scheduled by the DCI; determine, based on a second beam indication information of data channel in the DCI, one or more second activated beams to be used by one or more subsequent transmissions in the physical data channel; use the first activated beam to perform a transmission in the physical data channel with the control-side electronic device; after using the first activated beam to perform the transmission in the physical data channel with the control-side electronic device, use the one or more second activated beams to perform the one or more subsequent transmissions in the physical data channel with the control-side electronic device.

Yet another aspect of the present disclosure relates to an electronic device comprising a processing circuit configured to: send, through a physical downlink control channel (PDCCH), a DCI to a user-side electronic device, the DCI including: a first beam indication information of data channel to indicate to the user-side electronic device a first activated beam for a transmission in the physical data channel that is scheduled by the DCI; and a second beam indication information of data channel to indicate to the user-side electronic device one or more second activated beams to be used by one or more subsequent transmissions in the physical data channel; use the first activated beam to perform the transmission in the physical data channel with the user-side electronic device; and after using the first activated beam to perform the transmission in the physical data channel with the user-side electronic device, use the one or more second activated beams to perform the one or more subsequent transmissions in the physical data channel with the user-side electronic device.

A further aspect of the present disclosure relates to a communication method comprising: receiving an RRC signaling and/or a MAC CE signaling from the control-side electronic device; determining, based on a first beam indication information of control channel in the RRC signaling and/or the MAC CE signaling, an activated beam for performing a transmission in the physical control channel with the control-side electronic device; rewriting the activated beam based on a second beam indication information of control channel included in a DCI that is carried by a physical downlink control channel (PDCCH); and using the rewritten activated beam to perform the transmission in the physical control channel with the control-side electronic device.

Another aspect of the present disclosure relates to a communication method comprising: sending an RRC signaling and/or a MAC CE signaling to the user-side electronic device, the RRC signaling and/or the MAC CE signaling including a first beam indication information of control channel, wherein the first beam indication information of control channel indicates to the user-side electronic device an activated beam for a transmission in the physical control channel; sending, through a physical downlink control channel (PDCCH), a DCI to the user-side electronic device, the DCI including a second beam indication information of control channel, wherein the second beam indication information of control channel indicates to the user-side electronic device an activated beam for a transmission in the physical control channel; and using the activated beam indicated by the second beam indication information of control channel to perform the transmission in the physical control channel with the user-side electronic device.

Yet another aspect of the present disclosure relates to a communication method comprising: receiving, through a physical downlink control channel (PDCCH), a DCI from the control-side electronic device; determining, based on a first beam indication information of data channel in the DCI, a first activated beam for the physical data channel that is scheduled by the DCI; determine, based on a second beam indication information of data channel in the DCI, one or more second activated beams to be used by one or more subsequent transmissions in the physical data channel; using the first activated beam to perform the transmission in the physical data channel with the control-side electronic device; after using the first beam to perform the transmission in the physical data channel with the control-side electronic device, using the one or more second activated beams to perform the one or more subsequent transmissions in the physical data channel with the control-side electronic device.

A further aspect of the present disclosure relates to a communication method comprising: sending, through a physical downlink control channel (PDCCH), a DCI to a user-side electronic device, the DCI including: a first beam indication information of data channel to indicate to the user-side electronic device a first activated beam for a transmission in the physical data channel that is scheduled by the DCI; and a second beam indication information of data channel to indicate to the user-side electronic device one or more second activated beams to be used by one or more subsequent transmissions in the physical data channel; using the first activated beam to perform the transmission in the physical data channel with the user-side electronic device; and after using the first activated beam to perform the transmission in the physical data channel with the user-side electronic device, using the one or more second activated beams to perform the one or more subsequent transmissions in the physical data channel with the user-side electronic device.

Yet another aspect of the present disclosure relates to a computer-readable storage medium having a computer program stored thereon, and is characterized in that, the computer program, when loaded and executed by a processor, is used to implement communication methods as described above.

According to various aspects of the present disclosure, with additional beam indication information for the physical control channel or the physical data channel included in the DCI, the control-side electronic device and the user-side electronic device are able to use the DCI to dynamically indicate activated beams to be used, such that they no longer rely on updates of the RRC signaling and/or the MAC CE signaling, thereby reducing the latency of beam indication.

BRIEF DESCRIPTION OF DRAWINGS

The above and other objectives and advantages of the present disclosure will be further described below in conjunction with specific embodiments and with reference to accompany drawings. In the drawings, the same or corresponding technical features or components will be indicated by the same or corresponding reference numerals.

DETAILED DESCRIPTION

Figure 1:
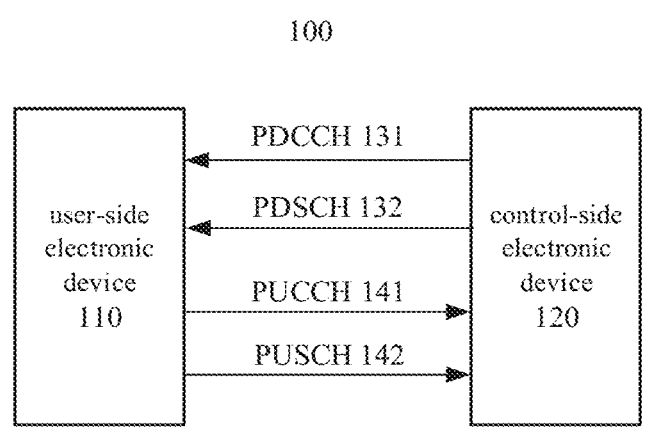
FIG. 1 illustrates a schematic block diagram of a 5G NR system according to an embodiment of the present disclosure.

Hereinafter, exemplary embodiments of the present disclosure will be described with reference to the drawings. For the purpose of clarity and conciseness, not all features of the embodiments are described in the specification. However, it should be understood that many implementation-specific settings must be made during the implementation of the embodiments in order to achieve the specific goals of the developer, for example, to meet those restrictions related to devices and businesses, and these restrictions may vary from implementation to implementation. In addition, it should also be understood that, although development work may be very complicated and time-consuming, for those skilled in the art who benefit from the present disclosure, such development work is merely a routine task.

Here, it should also be noted that, in order to avoid obscuring the disclosure with unnecessary details, only the processing steps and/or device structures closely related to at least the solution according to the disclosure are illustrated in the drawings, and other details not so relevant to the present disclosure are omitted.

Next, the description will be made in the following order.

1. 5G NR System

FIG. 1 illustrates a schematic block diagram of a 5G NR system 100 according to an embodiment of the present disclosure. The 5G NR system 100 includes a user-side electronic device 110 and a control-side electronic device 120. A link from the control-side electronic device 120 to the user-side electronic device 110 is referred to as a downlink, and a link from the user-side electronic device 110 to the control-side electronic device 120 is referred to as an uplink. In the 5G NR system 100 illustrated in FIG. 1, the channels used for the downlink include a physical downlink control channel (PDCCH) 131 and a physical downlink shared channel (PDSCH) 132. The channels used for the uplink include a physical uplink control channel (PUCCH) 141 and a physical uplink shared channel (PUSCH) 142. PDCCH 131 and PUCCH 141 may be collectively referred to as physical control channels. The PDCCH 131 may be used to carry a Downlink Control Information (DCI), the content of which includes but is not limited to scheduling and control information for other channels, for example, information about transmission format, resource allocation, scheduling permission, power control, and so on. The PUCCH 141 may be used to carry control information to be uploaded to the control-side electronic device 120, for example, ACK/NACK, CQI, PMI, and so on. The PDSCH 132 and the PUSCH 142 may be collectively referred to as physical data channels. The PDSCH 132 may be used to carry data from the control-side electronic device 120 to the user-side electronic device 110, while the PUSCH 142 may be used to carry data from the user-side electronic device 110 to the control-side electronic device 120. In the 5G NR system 100, an activated receive beam and an activated transmit beam to be used by the user-side electronic device 110 and the control-side electronic device 120 may be specified for one or more channels among the PDCCH 131, the PDSCH 132, the PUCCH 141, and the PUSCH 142. For example, a pair of activated receive beam and activated transmit beam for the one or more channels may be indicated by the control-side electronic device 120 to the user-side electronic device 110 through a beam indication process. The control-side electronic device 120 and the user-side electronic device 110 then use the indicated activated transmit/receive beams, respectively, to perform a transmission in a respective channel.

However, existing systems often need to perform a beam indication process by means of an RRC signaling and/or a MAC CE signaling, and the beam indication process is only used for a current transmission. Therefore, existing systems often have a large latency of beam indication, and their beam indication processes have limited dynamics. This is undesirable for realizing a system with highly efficiency and highly dynamics, as described in detail in the following embodiments.

Figure 2:
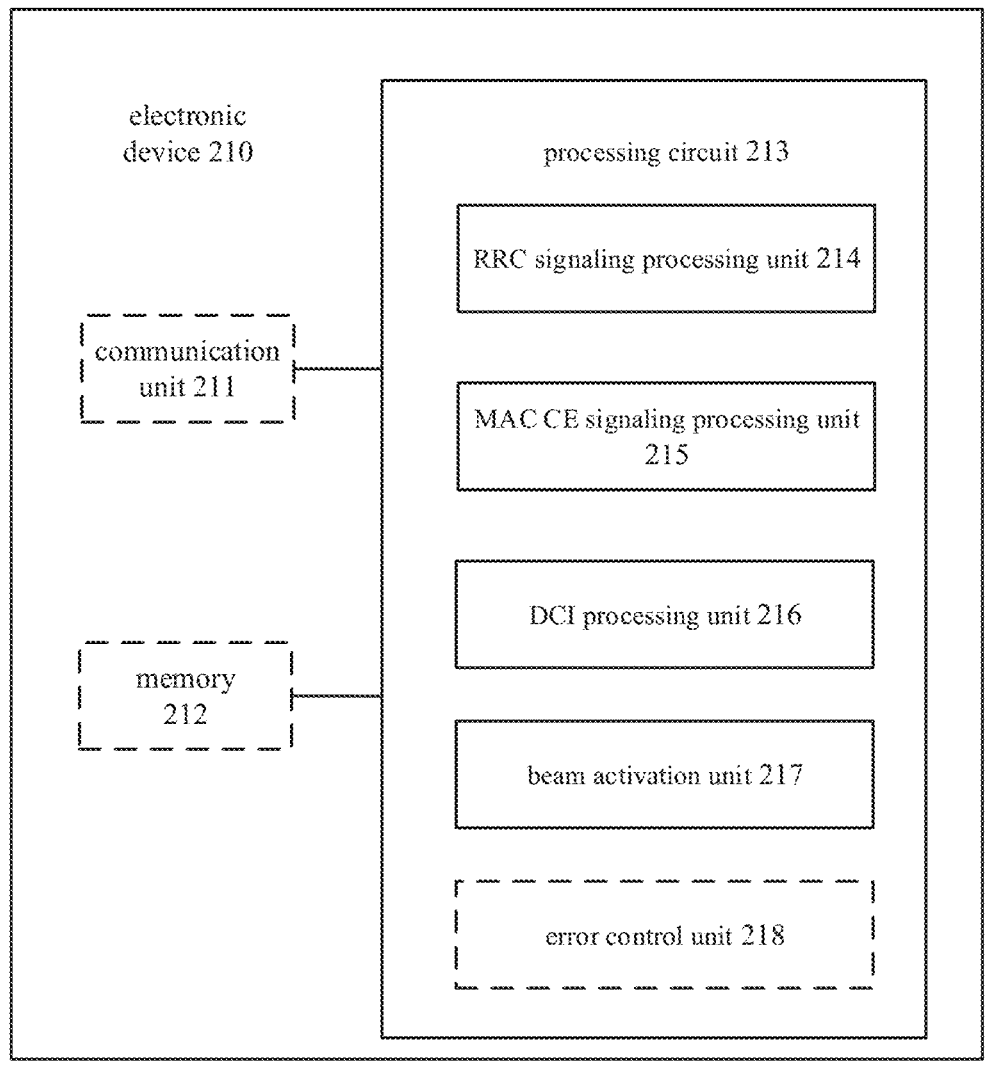
FIG. 2 illustrates a block diagram of a user-side electronic device that has a reduced latency of beam indication for a physical control channel according to an embodiment of the present disclosure.

2. a User-Side Electronic Device with a Reduced Latency of Beam Indication for a Physical Control Channel According to an Embodiment of the Present Disclosure FIG. 2 illustrates a block diagram of a user-side electronic device 210 that has a reduced latency of beam indication for a physical control channel according to an embodiment of the present disclosure. The electronic device 210 may reside in a user-side communication device (such as a smart phone). According to an embodiment of the present disclosure, the electronic device 210 may include, for example, a communication unit 211, a memory 212, and a processing circuit 213.

The communication unit 211 may be used to receive radio signals transmitted by the control-side electronic device through one or more of the PDCCH or the PDSCH, and may further perform processing such as down-conversion and analog-digital conversion on the received radio signals, and may provide the information obtained from the radio signals to other parts of the electronic device 210 (for example, the processing circuit 213 or the memory 212). The communication unit 211 may also be used to transmit radio signals from the user-side electronic device 210 to the control-side electronic device through the PUCCH or the PUSCH, and may perform processing such as digital-to-analog conversion and up-conversion on the radio signals before transmitting. The information transmitted by the communication unit 211 may come from other parts of the electronic device 210 (for example, the processing circuit 213 or the memory 212). The radio signals received or transmitted by the communication unit 211 may include control information or data (e.g., RRC signaling, MAC CE signaling, DCI or ACK/NACK, CQI, PMI, etc.). In an embodiment of the present disclosure, the communication unit 211 may be implemented as a communication interface component like an antenna device, a radio frequency circuit, and part of a baseband processing circuit etc., for example. The communication unit 211 is drawn with a dashed line, as it may also reside within the processing circuit 213 or outside of the electronic device 210.

The memory 212 of the electronic device 210 may store information generated by the processing circuit 213, information received from other devices through the communication unit 211, programs, machine codes, and data used for operations of the electronic device 210, and the like. The memory 212 is drawn with a dashed line, as it may also reside within the processing circuit 213 or outside of the electronic device 210. The memory 212 may be a volatile memory and/or a non-volatile memory. For example, the memory 212 may include, but is not limited to, a random access memory (RAM), a dynamic random access memory (DRAM), a static random access memory (SRAM), a read only memory (ROM), and a flash memory.

The processing circuit 213 may provide various functions of the electronic device 210. According to an embodiment of the present disclosure, the processing circuit 213 may be configured to receive (for example, through the communication unit 211) an RRC signaling and/or a MAC CE signaling from a control-side electronic device; determine, based on a first beam indication information of control channel in the RRC signaling and/or the MAC CE signaling, an activated beam for performing a transmission in the physical control channel with the control-side electronic device; rewrite the activated beam based on a second beam indication information of control channel included in a DCI that is carried by a physical downlink control channel (PDCCH); and use the rewritten activated beam to perform the transmission in the physical control channel with the control-side electronic device.

According to an embodiment of the present disclosure, the processing circuit 213 may include various units, e.g., an RRC signaling processing unit 214, a MAC CE signaling processing unit 215, a DCI processing unit 216, and a beam activation unit 217, for implementing the functions described above. These processing units included in the processing circuit 213 may be communicatively coupled to each other (not shown) and/or coupled to one or more of the communication unit 211 or the memory 212 (not shown). It should be noted that, although each unit is illustrated as a separate unit in FIG. 2, one or more of these units may be combined into one unit as well or split into multiple units.

According to an embodiment of the present disclosure, the RRC signaling processing unit 214 may be configured to process the RRC signaling from the control-side electronic device, so as to extract at least a beam configuration information in the RRC signaling. The beam configuration information may be used by the beam activation unit 217 as a part of the first beam indication information of control channel.

According to an embodiment of the present disclosure, the MAC CE signaling processing unit 215 may be configured to process the MAC CE signaling from the control-side electronic device, so as to extract at least a beam activation information in the MAC CE signaling. The beam activation information may be used by the beam activation unit 217 as an additional part of the first beam indication information of control channel. According to one embodiment of the present disclosure, the beam activation unit 217 may determine the activated beam based on a combination of the beam activation information from the MAC CE signaling and the beam configuration information from the RRC signaling.

According to an embodiment of the present disclosure, the DCI processing unit 216 may be configured to process the DCI from the control-side electronic device to extract the second beam indication information of control channel included in the DCI. The beam activation unit 217 may rewrite the activated beam (for example, rewrite an activated beam previously determined based on the MAC CE signaling and the RRC signaling) based on the second beam indication information of control channel. The rewritten activated beam may be used to perform the transmission in the physical control channel with the control-side electronic device.

As already described above, the beam activation unit 217 may be configured to determine the activated beam to be used for performing the transmission in the physical control channel with the control-side electronic device, based on the first beam indication information of control channel from the RRC signaling processing unit 214 and/or the MAC CE signaling processing unit 215, or based on the second beam indication information of control channel from the DCI processing unit 216.

According to an embodiment of the present disclosure, in the beam indication process for the physical control channel, the electronic device 210 may not always rely on the first beam indication information of control channel from the RRC signaling and/or the MAC CE signaling to determine the activated beam. Advantageously, the electronic device 210 may determine the activated beam further based on the second beam indication information of control channel included in the DCI. Since the DCI is carried by the PDCCH, it is at a lower layer than the RRC signaling and the MAC CE signaling. Therefore, using the DCI for beam indication will have a significantly reduced latency as compared with using the RRC signaling and/or the MAC CE signaling for beam indication.

According to an embodiment of the present disclosure, the processing circuit 213 of the electronic device 210 may further include an optional error control unit 218. The error control unit 218 may be configured to indicate, based on whether the second beam indication information of control channel is correctly extracted, whether to rewrite the activated beam in accordance with the information extracted from the DCI. Specifically, when the second beam indication information of control channel is correctly extracted, the error control unit 218 may allow the activated beam to be rewritten based on the second beam indication information of control channel. Otherwise, the error control unit 218 may prohibit such rewriting. The electronic device 210 may, for example, keep using a current activated beam. Such an error control mechanism may avoid incorrectly rewriting the activated beam.

According to an embodiment of the present disclosure, the error control unit 218 may further be configured to send a feedback information to the control-side electronic device (for example, through the communication unit 211). The feedback information indicates whether the second beam indication information of control channel has been correctly extracted. The control-side electronic device may determine whether to adjust a corresponding activated beam used by the control-side electronic device based on the feedback information, so as to ensure that the control-side electronic device and the user-side electronic device always use matching activated transmit/receive beams. According to an embodiment of the present disclosure, for systems that support the HARQ mechanism for the PDCCH, the HARQ mechanism for the PDCCH may be used to feed back to the control-side electronic device. For systems that do not support the HARQ mechanism for the PDCCH, the HARQ mechanism for the PUSCH may be used to feed back to the control-side electronic device indirectly. For example, when the second beam indication information of control channel has been correctly extracted, a HARQ-ACK message may be sent to the control-side electronic device; otherwise, a HARQ-NACK message may be sent.

In addition, it should be noted that, using the second beam indication information of control channel that is included in DCI does not mean that the electronic device 210 will no longer be able to configure an activated beam based on the RRC signaling and/or the MAC CE signaling. In other words, the second beam indication information of control channel included in DCI is another approach for beam indication, which is compatible with configuring the activated beam based on the RRC signaling and/or the MAC CE signaling, and is not intended to exclude performing the beam indication process through the RRC signaling and/or the MAC CE signaling. According to an embodiment of the present disclosure, if the electronic device 210 subsequently receives a new RRC signaling and/or a new MAC CE signaling from the control-side electronic device, the electronic device 210 may rewrite the activated beam (for example, rewrite the activated beam that has been previously rewritten based on the second control channel beam activation information) based on the first beam indication information of control channel in the new RRC signaling and/or the new MAC CE signaling. According to an embodiment of the present disclosure, the electronic device 210 may rewrite the activated beam based on a more recent one of the first control channel beam instruction information and the second control channel beam instruction information.

Next, description will be made for the physical downlink control channel (PDCCH) and the physical uplink control channel (PUCCH) respectively.

2-1. Beam Indication Process for the PDCCH

The beam indication process for the PDCCH is used to indicate to the user-side electronic device an activated receive beam for the PDCCH. Existing 5G NR systems perform the beam indication process through a RRC signaling and a MAC CE signaling. The user-side electronic device relies on a first beam indication information of control channel provided by both the RRC signaling and the MAC CE signaling to determine an activated receive beam for the PDCCH. The first beam indication information of control channel may include a beam configuration information in the RRC signaling and a beam activation information in the MAC CE signaling.

Figure 3A:
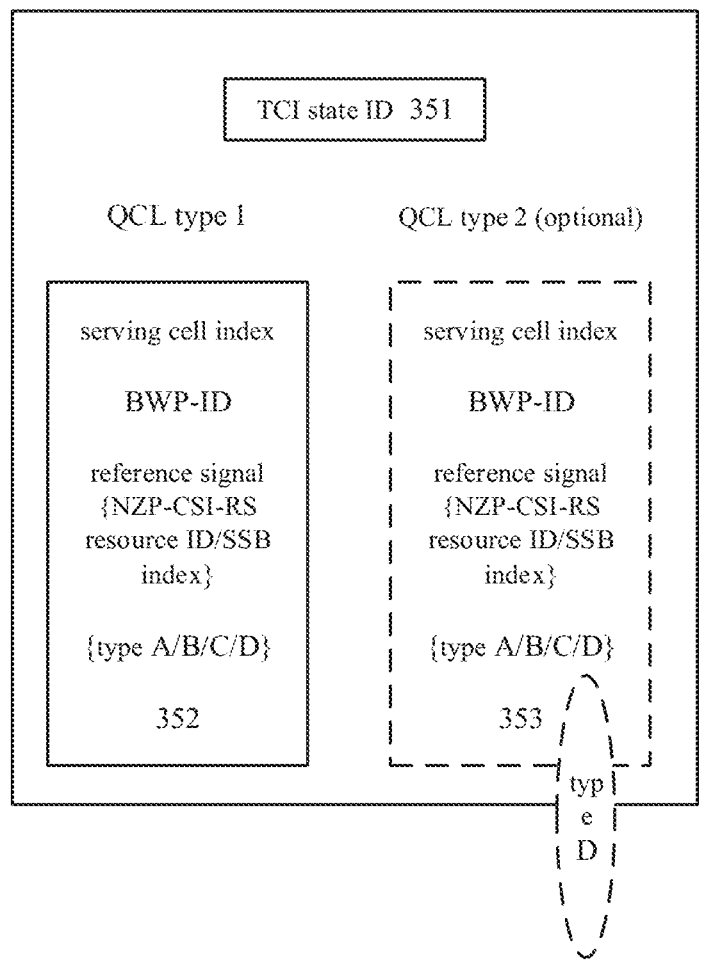
FIG. 3A illustrates a schematic block diagram of an exemplary TCI state.

According to the 5G NR standard Release 15, the beam configuration information for the PDCCH in the RRC signaling that is received by the user-side electronic device from the control-side electronic device may at least include a Transmission Configuration Indication (TCI) state. FIG. 3A illustrates a schematic block diagram of an exemplary TCI state 350. As illustrated in FIG. 3A, the TCI state 350 includes a TCI state ID (TCI state identifier) 351 for identifying that TCI state, and further includes a Quasi Co-Location (QCL) type 1 field 352 and an optional QCL type 2 field 353. Each of the QCL type 1 field 352 and the QCL type 2 field 353 may each include subfields that indicate, for example, a serving cell index, a bandwidth part identifier (BWP-ID), and a reference signal (NZP-CSI resource ID or SSB index). Each of the QCL type 1 field 352 and the QCL type 2 field 353 belongs to one of QCL-type A, QCL-type B, QCL-type C, and QCL-type D. Different QCL types indicate different meanings. For example, QCL-type A indicates {Doppler frequency shift, Doppler spread, average delay, delay spread}, QCL-type B indicates {Doppler frequency shift, Doppler spread}, QCL-type C indicates {Doppler shift, average delay}, and QCL-type D indicates {spatial reception parameters}.

When processing the RRC signaling, a RRC signaling processing unit (for example, 214) of the user-side electronic device may find a QCL field belonging to QCL-type D from one or more QCL (for example, QCL type 1 or QCL type 2) fields that are included in the TCI state 350. In FIG. 3A, the QCL type 2 field 353 is schematically illustrated as QCL-type D with a dashed ellipse. To avoid ambiguity, the TCI state 350 may be limited to include only one QCL field that is of QCL-type D. Then, the RRC signaling processing unit associates a reference signal indicated in that QCL field (in this example, the QCL type 2 field 353) with the TCI state 350. Since each reference signal has been associated with an optimal transmit/activated receive beam through a beam measurement process and a beam reporting process prior to the beam indication process, the user-side electronic device may associate the TCI state 350 with that transmit/activated receive beam.

Although FIG. 3A illustrates only one TCI state 350, it should be understood that the user-side electronic device may obtain M TCI states (M is greater than or equal to 1) through the RRC signaling, wherein each TCI state has a unique TCI state ID, and each TCI state corresponds to a transmit/activated receive beam. The user-side electronic device may store the association between the TCI state acquired from the beam configuration information in the RRC signaling and the activated transmit/receive beams for subsequent use.

Figure 3B:
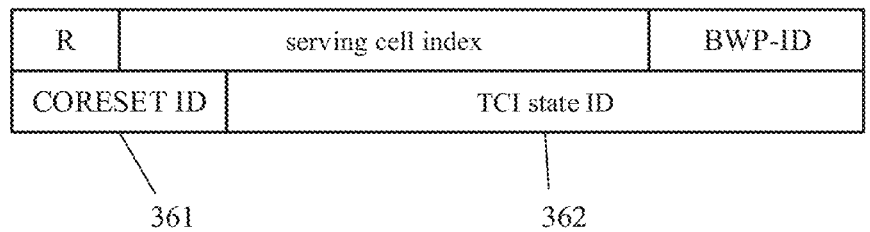
FIG. 3B illustrates a schematic block diagram of an exemplary beam activation information in a MAC CE signaling.

Then, the user-side electronic device may extract the beam activation information from the MAC CE signaling from the control-side electronic device through the MAC CE signaling processing unit (for example, 215). The beam activation information may include an index of the TCI state (for example, a TCI state ID) to indicate to the user-side electronic device to use an activated receive beam that is associated with the TCI state. As one example, FIG. 3B illustrates a schematic block diagram of an exemplary beam activation information in the MAC CE signaling. As illustrated in the figure, the field 360 in the MAC CE signaling may not only include subfields for indicating a serving cell index and a BWP-ID, but also include a beam activation information. The beam activation information may include a CORESET ID subfield 361 for identifying an associated Control-Resource Set (CORESET) and a TCI state ID subfield 362 for identifying a TCI state that is to be activated. It should be noted that the field arrangement illustrated in FIG. 3B is merely an example, and other arrangements than this one may be used as well.

The beam activation unit (for example, the beam activation unit 216) of the user-side electronic device may determine the activated receive beam for receiving the PDCCH on a respective CORESET, based on the TCI state ID subfield 362 in the MAC CE signaling and a previous association between the TCI state and the transmit/activated receive beam that is determined and stored based on the RRC signaling. Then, the determined activated receive beam may be used for reception in the PDCCH.

Figure 3C:
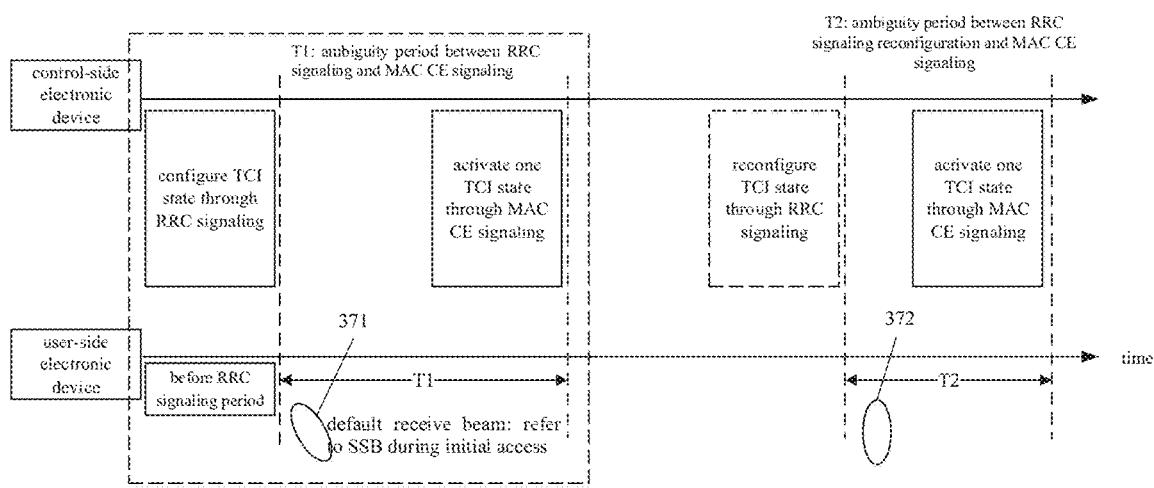
FIG. 3C illustrates a schematic diagram of a latency of beam indication for the PDCCH.

It is described above that the user-side electronic device determines the activated receive beam for the PDCCH based on the first beam indication information of control channel provided by both the RRC signaling and the MAC CE signaling. This approach has a large latency. FIG. 3C illustrates a schematic diagram of the latency of beam indication for the PDCCH. As illustrated in FIG. 3C, an initial configuration and one reconfiguration are performed for the PDCCH transmit/activated receive beam using the RRC signaling and the MAC CE signaling, wherein, the initial configuration caused a latency of T1, and the reconfiguration caused a latency of T2. It should also be noted that, both the RRC signaling and the MAC CE signaling are high layer signaling, which have long latencies. For scenarios that require frequent reconfiguration of activated transmit/receive beams through beam indication processes, performing frequent beam indication processes through the RRC signaling and/or the MAC CE signaling will cause significant latency. This is not desired for achieving a beam indication process with high dynamics and high efficiency. Therefore, there is a need to perform a beam indication process for the PDCCH with a latency that is smaller than that of the RRC signaling and the MAC CE signaling.

According to an embodiment of the present disclosure, a DCI for downlink scheduling may be used to implement a dynamic beam indication process for the PDCCH. For example, a second beam indication information of control channel may be included in the DCI. A DCI processing unit (for example, 216) of the user-side electronic device may be configured to extract the second beam indication information of control channel from the DCI, and transmit it to the beam activation unit (for example, 217). The beam activation unit may rewrite the activated beam based on the second beam indication information of control channel, without relying on an update of the high layer signaling (for example, the MAC CE signaling). Because the DCI is a physical layer information carried by the PDCCH, the DCI has a reduced latency and improved dynamics as compared with the high layer MAC signaling.

Figure 3D:
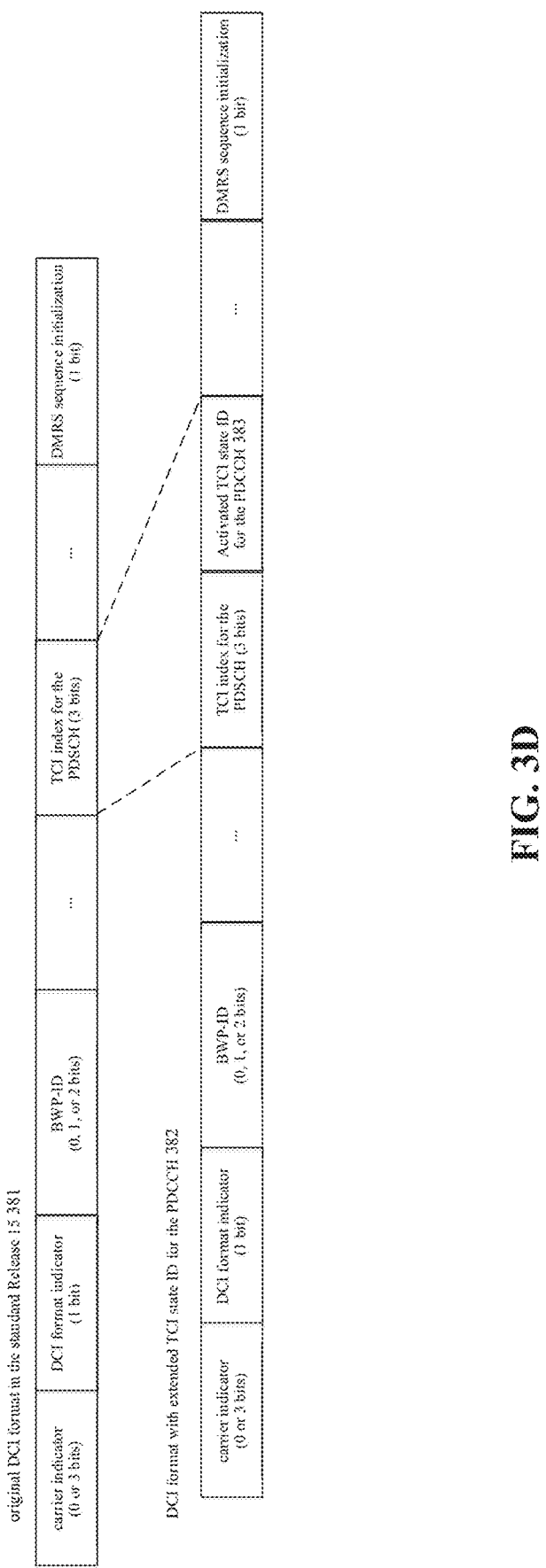
FIG. 3D illustrates a schematic diagram of an exemplary field structure of a DCI according to an embodiment of the present disclosure.

FIG. 3D illustrates a schematic diagram of an exemplary field structure of a DCI according to an embodiment of the present disclosure. The standard Release 15 has specified an original DCI format 381 for downlink scheduling, which may include subfields of: a carrier indicator (0 or 3 bits), a DCI format indicator (1 bit), a BWP-ID (0, 1, or 2 bits), a TCI index for the PDSCH (3 bits), and a DMRS sequence initialization (1 bit), and the like. According to an embodiment of the present disclosure, a DCI format 382 with an extended TCI state ID for the PDCCH may be adopted. The DCI format 382 may be an extension of the original DCI format 381. For example, an activated TCI state ID subfield 383 for the PDCCH may be added after the TCI index for the PDSCH, as the second beam indication information of control channel. Similar to the TCI state ID subfield 362 in the MAC CE signaling, the subfield 383 in the DCI may indicate to the user-side electronic device the TCI state to be activated. When a total of M TCI states are configured, the length of the subfield 383 may be any integer no less than $Log_2 M$. The TCI state to be activated as indicated by the subfield 383 may be associated with a currently used CORESET by default without any special indication. In this case, the subfield 383 indicates information related to only one activated beam, and that activated beam corresponds to the currently used CORESET.

It should be noted that although the subfield 383 is added after the TCI index for the PDSCH in FIG. 3D, this is merely one preferred embodiment. The TCI index for the PDSCH is also used to indicate the TCI state to be activated. It is advantageous to put together fields with similar functions. According to an embodiment of the present disclosure, the subfield 383 may be placed at any position in the DCI format 382.

Figure 3E:
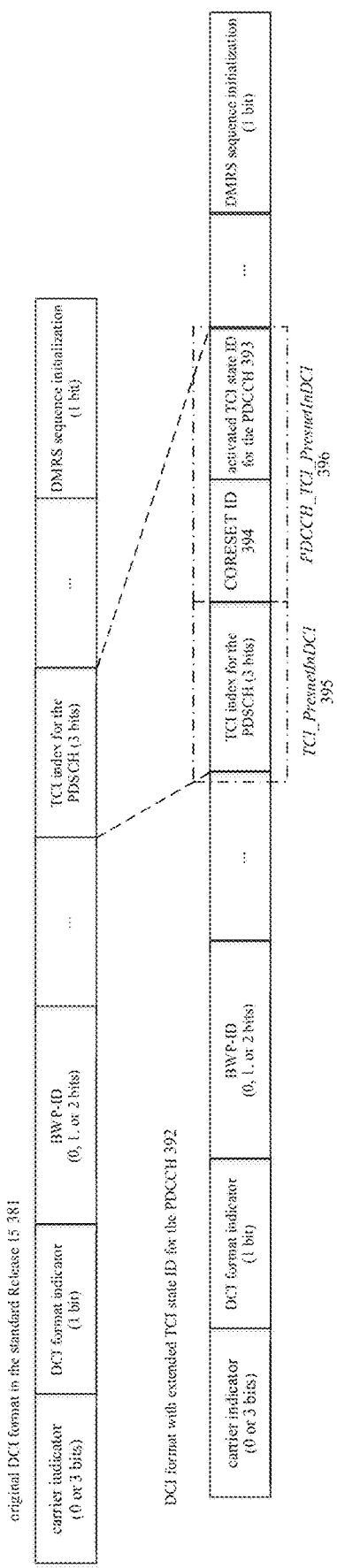
FIG. 3E illustrates a schematic diagram of an exemplary field structure of another DCI according to an embodiment of the present disclosure.

FIG. 3E illustrates a schematic diagram of another exemplary field structure of another DCI according to an embodiment of the present disclosure. FIG. 3E illustrates the same original DCI format 381 as in FIG. 3D for comparison. The DCI format 392 with the extended TCI state ID for the PDCCH as illustrated in FIG. 3E is different from the DCI format 382 in FIG. 3D. Specifically, the second beam indication information of control channel in the DCI format 392 includes not only the activated TCI state ID subfield 393 for the PDCCH, but also a CORESET ID subfield 394 indicating a CORESET associated with that activated TCI state. Although only one subfield 393 and one subfield 394 are illustrated in FIG. 3E, the DCI format 392 may include one or more CORESET ID subfields 394 to indicate one or more of the CORESETs that may be used by the user-side electronic device. The DCI format 392 may also include one or more TCI state ID subfields 393, each subfield 393 being associated with one CORESET ID subfield 394, thereby indicating the TCI state to be activated that is associated with a respective CORESET. The one or more subfields 393 and subfields 394 may be used together as the second beam indication information of control channel included in the DCI. In other words, the second beam indication information of control channel may include information related to multiple activated beams, and the multiple activated beams correspond to one or more of the multiple CORESETs that may be used by the user-side electronic device. This further increases the dynamics of the beam indication process, so that the user-side electronic device, when receiving PDCCH transmissions, may use a respective receive beam on different CORESETs to obtain a spatial diversity performance gain and increase the decoding success rate.

It should be noted that, although the subfields 393 and 394 are added after the TCI index for the PDSCH in FIG. 3E, this is merely one preferred embodiment. According to an embodiment of the present disclosure, one or more subfields 393 and 394 may be placed in any position in the DCI format 392.

One or more extraction parameters are also illustrated in FIG. 3E, for example, a TCI_PresentInDCI parameter 395 and the PDCCH_TCI_PresentInDCI parameter 396. According to an embodiment of the present disclosure, these parameters may indicate how the user-side electronic device (specifically, the DCI processing unit) extracts respective subfields from the DCI. For example, the TCI_PresentInDCI parameter 395 may be used to instruct whether there is a subfield indicating the TCI index for the PDSCH in the DCI format 392, while the PDCCH_TCI_PresentInDCI parameter 396 may be used to instruct whether there is a second beam indication information of control channel (for example, one or more of the activated TCI state ID subfield 393 and CORESET ID subfield 394 for the PDCCH) in the DCI format 392. These extraction parameters may be included in the RRC signaling. According to an embodiment of the present disclosure, the RRC signaling may not only include parameters (such as parameters 395 and 396) that identify whether the DCI includes the second beam indication information of control channel, but also include a parameter that identifies the quantity of activated beams associated with the second beam indication information of control channel (for example, the quantity of CORESET ID subfields 394 in the DCI 392). In addition, although one or more extraction parameters are illustrated and described in FIG. 3E, one or more of these extraction parameters are also applicable to the embodiment illustrated in FIG. 3D. According to an embodiment of the present disclosure, the RRC signaling processing unit may read one or more extraction parameters (for example, parameters 395 and 396) from the RRC signaling. The one or more extraction parameters may be stored locally in the user-side electronic device, for example, and remain unchanged until they are updated by a next RRC signaling. The DCI processing unit may extract the second beam indication information of control channel from the DCI based on the one or more extraction parameters.

Figures 3F, 4A:
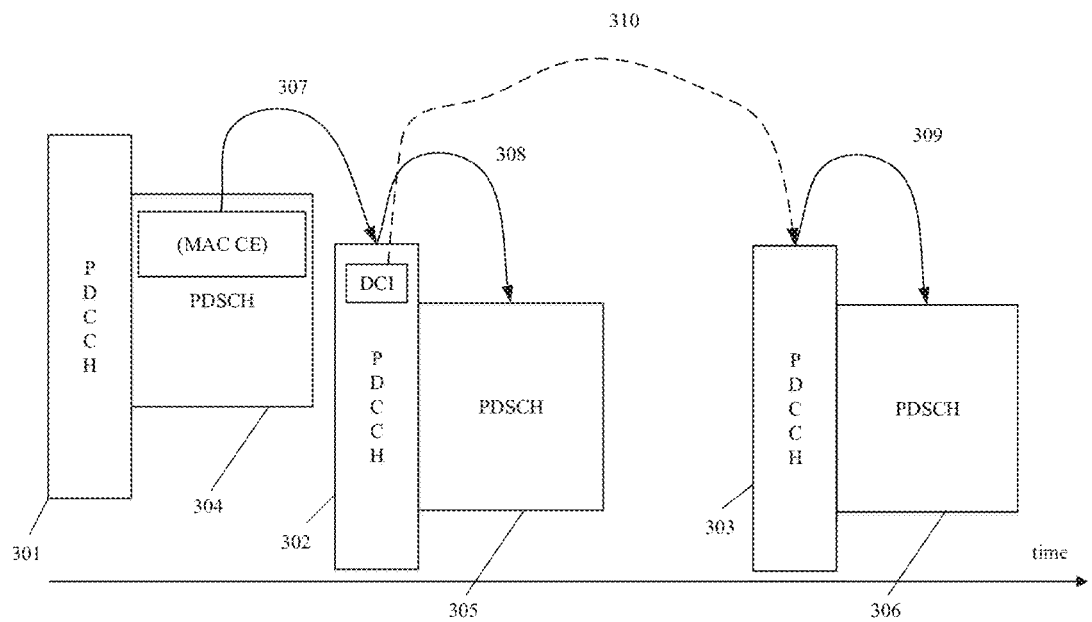
FIG. 3F illustrates a schematic diagram of a dynamic beam indication process for the PDCCH according to an embodiment of the present disclosure.
FIG. 4A illustrates a schematic block diagram of an exemplary beam activation information for the PUCCH in a MAC CE signaling.

In this way, the user-side electronic device may determine the activated beam for the PDCCH based on the DCI. This process does not need to rely on updates of the high layer signaling. FIG. 3F illustrates a schematic diagram of a dynamic beam indication process for the PDCCH according to an embodiment of the present disclosure. FIG. 3F illustrates one or more control signaling transmissions 301-303 that are carried by the PDCCH, one or more of which may include a DCI for downlink scheduling. FIG. 3F also illustrates one or more data transmissions 304-306 that are carried by the PDSCH, which correspond to the control signaling transmissions 301-303. The solid arrow in FIG. 3F illustrates a scheduling according to the standard Release 15. Specifically, the solid arrow 307 illustrates that the activated beam for the PDCCH is indicated through the MAC CE signaling. The solid arrows 308 and 309 illustrate that the PDSCH corresponding to the PDCCH is scheduled by the DCI that is carried by that PDCCH. FIG. 3F also illustrates that the DCI that is carried by the PDCCH is used to indicate the activated beam for a subsequent PDCCH according to an embodiment of the present disclosure, as illustrated by the dashed arrow 310. The dashed arrow 310 shows that the DCI in the control signaling transmission 302 carried by the PDCCH indicates an activated beam to be used for the subsequent control signaling transmission 303 as carried by the PDCCH, and this avoids performing a beam indication process by means of a MAC CE signaling carried by the PDSCH (like that illustrated by the solid arrow 307), thereby providing a reduced latency and improved dynamics.

2-2. Beam Indication Process for the PUCCH

The beam indication process for the PUCCH is used to indicate to the user-side electronic device an activated transmit beam for the PUCCH. Existing 5G NR systems perform this beam indication process through the RRC signaling and the MAC CE signaling. The user-side electronic device relies on a first beam indication information of control channel that is provided by the RRC signaling and the MAC CE signaling to determine the activated transmit beam for the PUCCH. The first beam indication information of control channel may include a beam configuration information in the RRC signaling, and a beam activation information in the MAC CE signaling.

The beam configuration information included in the RRC signaling may include at least a spatial relationship information for the PUCCH (PUCCH-SpatialRelationInfo, PUCCH-SRI). The RRC signaling processing unit (for example, 214) of the user-side electronic device may extract one or more PUCCH-SRIs from the received RRC signaling.

Then, the MAC CE signaling processing unit (for example, 215) of the user-side electronic device may extract a beam activation information from the MAC CE signaling from the control-side electronic device. The beam activation information may indicate an activated transmit beam for the PUCCH. As one example, FIG. 4A illustrates a schematic block diagram of an exemplary beam activation information for the PUCCH in the MAC CE signaling. As illustrated in the figure, the field 460 in the MAC CE signaling includes a serving cell index, a BWP-ID, and an activated beam indication information. The activated beam indication information may include the PUCCH resource ID subfield 461 and a subfield 462 (S0-S7). The PUCCH resource ID subfield 461 may be used to identify the PUCCH resource for which the beam is to be activated. The subfield 462 may be used to indicate an activated beam. For example, one of S0-S7 may be set to 1 (the rest are set to 0) to indicate one corresponding activated beam. It should be noted that although the subfield 462 is illustrated here as including 8 bits, S0-S7, the subfield 462 may also include any suitable number of bits, and its length depends on the quantity of beams available for one PUCCH resource. Similarly, the length of the PUCCH resource ID subfield 461 may also be any suitable length, which depends on the quantity of PUCCH resources available to the user-side electronic device. It should be noted that the field arrangement illustrated in FIG. 4A is merely one example, and other arrangements may also be used as well.

The beam activation unit (for example, 217) of the user-side electronic device may determine an activated transmit beam for the PUCCH based on the beam activation information in the MAC CE signaling and the PUCCH-SRI previously obtained from the RRC signaling. Then, the determined activated transmit beam may be used for a transmission in the PUCCH.

Figure 4B:
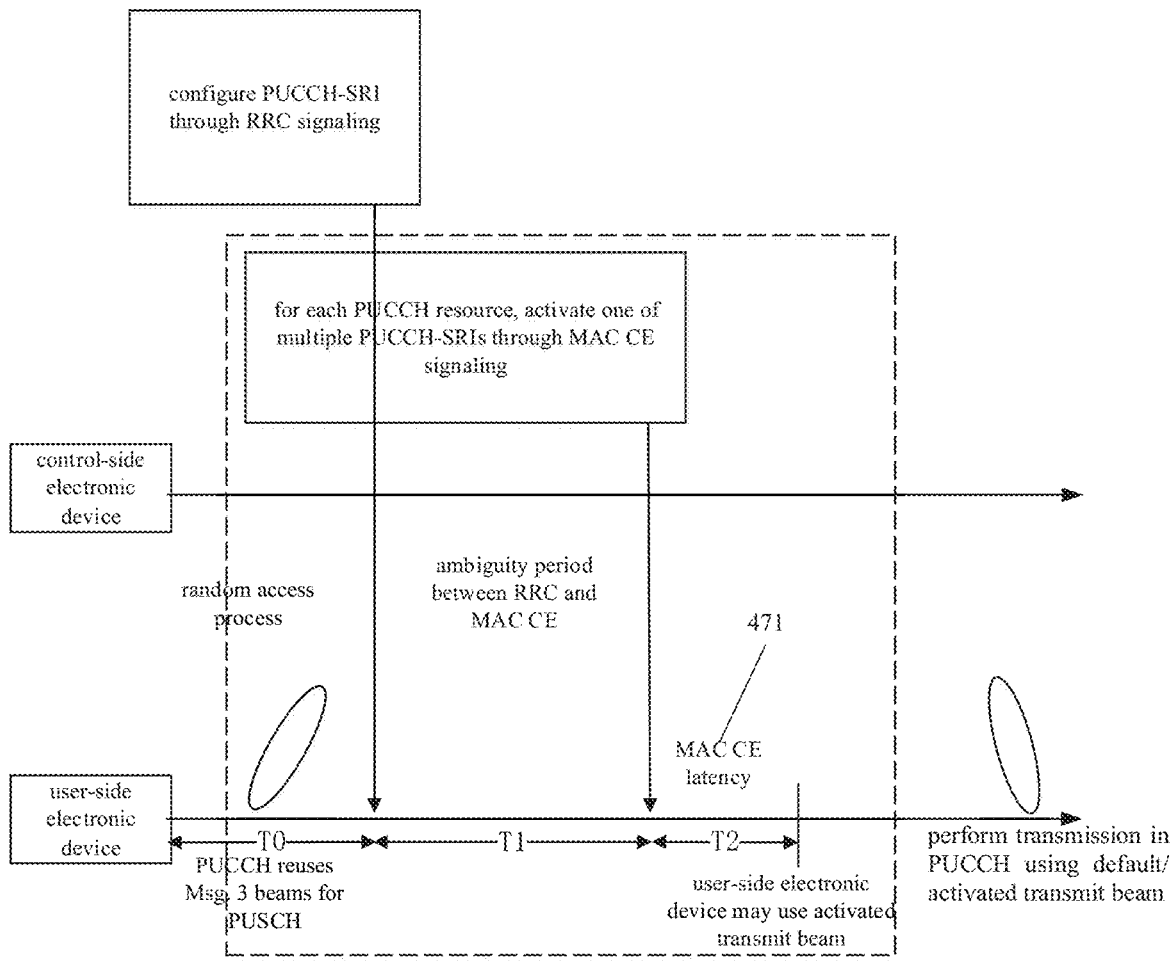
FIG. 4B illustrates a schematic diagram of a latency of beam indication for the PUCCH.

It is described above that the user-side electronic device determines an activated transmit beam for the PUCCH based on the first beam indication information of control channel provided by both the RRC signaling and the MAC CE signaling. As discussed earlier, this approach has a large latency. FIG. 4B illustrates a schematic diagram of the latency of beam indication for the PUCCH. For some user-side electronic devices, processing the MAC CE signaling has an inherent MAC CE latency 471 (for example, 3 ms). Moreover, since both the RRC signaling and the MAC CE signaling are higher layer signaling, these signalings have large latencies. Therefore, there is a need to perform the beam indication process for the PUCCH with a latency that is smaller than a combination of the RRC signaling and the MAC CE signaling.

According to an embodiment of the present disclosure, a DCI for uplink scheduling may be used to implement a dynamic beam indication process for the PUCCH. For example, a second beam indication information of control channel may be included in the DCI. The DCI processing unit (for example, 216) of the user-side electronic device may be configured to extract the second beam indication information of control channel from the DCI, and transmit it to the beam activation unit (for example, 217). The beam activation unit may rewrite the activated beam based on the second beam indication information of control channel without using a combination of the RRC signaling and the MAC CE signaling. Because DCI is a physical layer control information that is carried by the PDCCH, it has a reduced latency and improved dynamics.

Figure 4C:
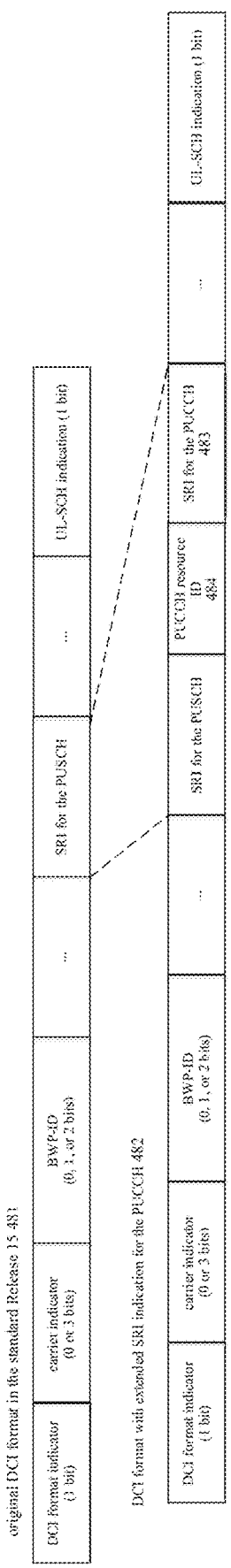
FIG. 4C illustrates a schematic diagram of an exemplary field structure of a DCI according to an embodiment of the present disclosure.

FIG. 4C illustrates a schematic diagram of an exemplary field structure of the DCI according to an embodiment of the present disclosure. The standard Release 15 has specified an original DCI format 481 (for example, DCI format 0_1) for uplink scheduling, which may include subfields of: a DCI format indicator (1 bit), a carrier indicator (0 or 3 bits), a BWP-ID (0, 1, or 2 bits), a SRI for the PUSCH (3 bits), and a UL-SCH indication (1 bit), and the like. According to an embodiment of the present disclosure, a DCI format 482 with an extended SRI for the PUCCH may be adopted. The DCI format 482 may be an extension of the original DCI format 481. For example, a SRI subfield 483 for the PUCCH and a corresponding PUCCH ID subfield 484 may be added after the SRI for the PUSCH. The subfields 483 and 484 in the DCI format 482 may be used as the second beam indication information of control channel included in the DCI. Similar to the aforementioned subfields 461 and 462 in the MAC CE signaling, the subfields 484 and 483 may indicate to the user-side electronic device an activated transmit beam for the PUCCH. The lengths of the subfields 484 and 483 may depend on the quantity of available PUCCH resources and the quantity of beams available for each PUCCH resource, respectively.

It should be noted that although only one subfield 483 and one subfield 484 are illustrated in FIG. 4C, the DCI format 482 may include one or more PUCCH resource ID subfields 484 so as to indicate one or more of all PUCCH resources that may be used by the user-side electronic device. The DCI format 482 may also include a subfield 483 that is associated with each PUCCH resource indicated, thereby indicating an activated transmit beam associated with that PUCCH resource. This allows the DCI format 482 to indicate the activated beam associated with each PUCCH resource of one or more different PUCCH resources. In other words, the second beam indication information of control channel may include information related to one or more activated beams, and the one or more activated beams correspond to one or more PUCCH resources that may be used by the user-side electronic device. This further increases the dynamics of the beam indication process.

It should be noted that although the subfields 483 and 484 are illustrated as being placed after the SRI for the PUSCH in FIG. 4C, this is merely one preferred embodiment. According to an embodiment of the present disclosure, one or more subfields 483 and 484 may be placed in any position in the DCI format 482.

According to an embodiment of the present disclosure, the DCI format 482 may not include the PUCCH resource ID subfield 484 for indicating PUCCH resources as well. In this case, it may be considered that the activated beam indicated by the subfield 483 is associated with the PUCCH resource that is currently used.

According to an embodiment of the present disclosure, one or more extraction parameters for the second beam indication information of control channel may be included in the RRC signaling to instruct the user-side electronic device (specifically, the DCI processing unit) how to extract the second beam indication information of control channel from the received DCI. For example, the PUCCH_SRI_PresentInDCI parameter may be included in the RRC signaling to indicate whether there is a second beam indication information of control channel in the DCI; in addition, when multiple PUCCH resources are involved in the DCI, another parameter K_PUCCH_SRI_PresentInDCI may further be used to indicate the quantity of PUCCH resources (i.e., the quantity of subfields 484). When the PUCCH resource ID subfield 484 is not included in the DCI format, the parameter K_PUCCH_SRI_PresentInDCI may not be included in the RRC signaling. According to an embodiment of the present disclosure, the RRC signaling processing unit of the user-side electronic device may read the one or more extraction parameters from the RRC signaling, and store them locally in the user-side electronic device. When the DCI for uplink scheduling is received through the PDCCH, the DCI processing unit of the user-side electronic device may extract the second beam indication information of control channel from the DCI based on these extraction parameters.

Figure 4D:
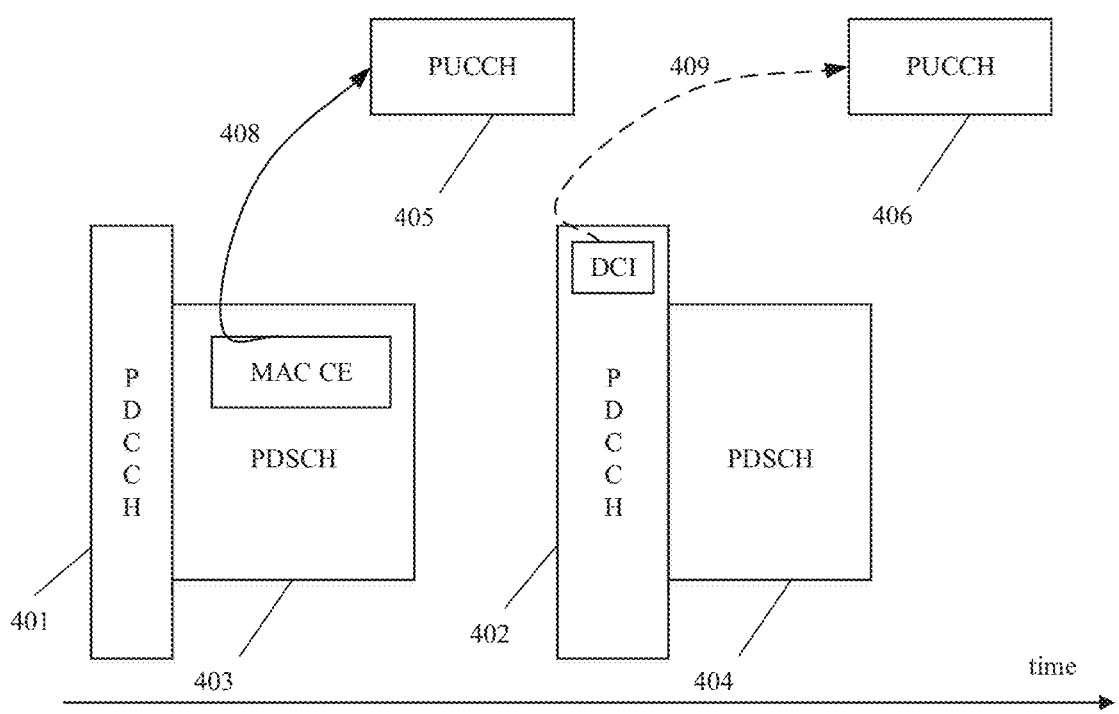
FIG. 4D illustrates a schematic diagram of a dynamic beam indication process for the PUCCH according to an embodiment of the present disclosure.

In this way, the user-side electronic device may determine the activated transmit beam for the PUCCH based on the DCI. This process bypasses the RRC signaling and the MAC CE signaling. FIG. 4D illustrates a schematic diagram of a dynamic beam indication process for the PUCCH according to an embodiment of the present disclosure. FIG. 4D illustrates one or more control signaling transmissions 401-402 carried by the PDCCH, one or more of which may include a DCI for uplink scheduling. FIG. 4D also illustrates one or more data transmissions 403-404 carried by the PDSCH corresponding to the control signaling transmissions 401-402, and one or more control signaling transmissions 405-406 carried by the PUCCH. The solid arrow in FIG. 4D illustrates the scheduling according to the standard Release 15. Specifically, the solid arrow 408 illustrates that the activated beam for the PUCCH is indicated through the MAC CE signaling. FIG. 4D also illustrates that the DCI that is carried by the PDCCH is used to indicate the activated transmit beam for the PUCCH according to an embodiment of the present disclosure, as illustrated by the dashed arrow 409. The dashed arrow 409 donates that the DCI in the control signaling transmission 402 carried by the PDCCH indicates an activated transmit beam for the control signaling transmission 406 carried by the PUCCH, which may avoid performing the beam indication process by means of the MAC CE signal carried by the PDSCH (as illustrated by the solid arrow 408), thereby having a reduced latency and improved dynamics.

Figure 5:
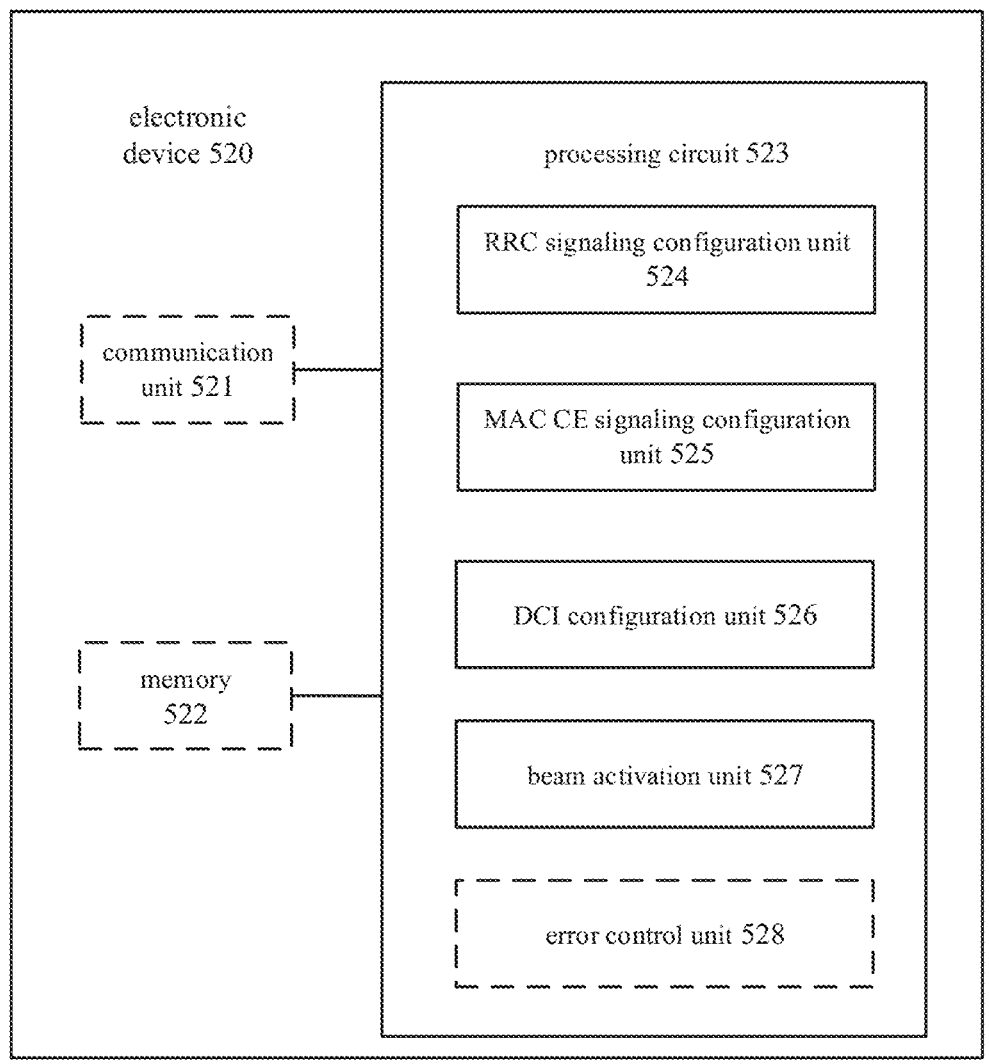
FIG. 5 illustrates a block diagram of a control-side electronic device that has a reduced latency of beam indication for a physical control channel according to an embodiment of the present disclosure.

3. a Control-Side Electronic Device that has a Reduced Latency of Beam Indication for the Physical Control Channel FIG. 5 illustrates a block diagram of a control-side electronic device 520 that has a reduced latency of beam indication for the physical control channel according to an embodiment of the present disclosure. According to an embodiment of the present disclosure, the electronic device 520 may reside in various control devices or transmitting apparatus. The control devices mentioned here are, for example, base stations such as eNBs or gNBs of 3GPP's 5G communication standard, remote radio heads, wireless access points, etc. The transmitting apparatus include, for example, large on-board transmitting apparatus or fixed transmitting apparatus (for example, Unmanned Aerial Vehicle management towers) and transmitters in satellite communication systems.

The communication unit 521 may be used to receive radio signals transmitted by the user-side electronic device through one or more of the PUCCH or the PUSCH, and may also perform processing such as down-conversion and analog-digital conversion on the received radio signals, and may provide the information obtained from the radio signals to other parts of the electronic device 520 (for example, the processing circuit 523 or the memory 522). The communication unit 521 may also be used to transmit radio signals from the user-side electronic device 520 to the user-side electronic device through the PDCCH or the PDSCH, and may perform processing such as digital-to-analog conversion and up-conversion on the radio signals before transmitting. The information transmitted by the communication unit 521 may come from other parts of the electronic device 520 (for example, the processing circuit 523 or the memory 522). The radio signal received or transmitted by the communication unit 521 may include control information or data (for example, the RRC signaling, the MAC CE signaling, the DCI or ACK/NACK, CQI, PMI, etc.). In an embodiment of the present disclosure, the communication unit 521 may be implemented as a communication interface component like an antenna device, a radio frequency circuit, and a part of a baseband processing circuit etc., for example. The communication unit 521 is drawn with a dashed line as it may also reside within the processing circuit 523 or outside of the electronic device 520.

The memory 522 of the electronic device 520 may store information generated by the processing circuit 523, information received from other devices through the communication unit 521, programs, machine codes, and data used for operations of the electronic device 520, and the like. The memory 522 is drawn with a dashed line as it may also reside within the processing circuit 523 or outside of the electronic device 520. The memory 522 may be a volatile memory and/or a non-volatile memory. For example, the memory 522 may include, but is not limited to, a random access memory (RAM), a dynamic random access memory (DRAM), a static random access memory (SRAM), a read only memory (ROM), and a flash memory.

The processing circuit 523 may provide various functions of the electronic device 520. According to an embodiment of the present disclosure, the processing circuit 523 may be configured to send an RRC signaling and/or a MAC CE signaling to the user-side electronic device (for example, through the communication unit 521), the RRC signaling and/or MAC CE signaling including a first beam indication information of control channel, wherein the first beam indication information of control channel indicates to the user-side electronic device an activated beam for a transmission in the physical control channel; send a downlink control information (DCI) to the user-side electronic device through the PDCCH, the DCI including a second beam indication information of control channel, wherein the second beam indication information of control channel indicates to the user-side electronic device an activated beam for the transmission in the physical control channel; and use the activated beam indicated by the second beam indication information of control channel to perform the transmission in the physical control channel with the user-side electronic device.

According to an embodiment of the present disclosure, the processing circuit 523 may include various units, e.g., an RRC signaling configuration unit 524, a MAC CE signaling configuration unit 525, a DCI configuration unit 526, and a beam activation unit 527, for implementing the functions described above. These processing units included in the processing circuit 523 may be communicatively coupled to each other (not shown) and/or coupled to one or more of the communication unit 521 or the memory 522 (not shown). It should be noted that, although each unit is illustrated as a separate unit in FIG. 5, one or more of these units may be combined into one unit as well or split into multiple units.

According to an embodiment of the present disclosure, the RRC signaling to be sent to the user-side electronic device may be configured by the RRC signaling configuration unit 524, so that the RRC signaling includes at least a beam configuration information. One or more TCI states for each CORESET may be configured by the RRC signaling configuration unit 524. As one example, in the standard Release 15, one or more TCI states may be configured for each CORESET through the following functions, where the total number of TCI states may be 64 at maximum. The beam configuration information in the RRC signaling may be sent to the user-side electronic device as a part of the first beam indication information of control channel.

tci-StatesPDCCH-ToAddList  SEQUENCE(SIZE (1..maxNrofTCI-StatesPDCCH)) OF TCI-StateId  OPTIONAL,  -- Need N
tci-StatesPDCCH-ToReleaseList  SEQUENCE(SIZE (1..maxNrofTCI-StatesPDCCH)) OF TCI-StateId  OPTIONAL,  -- Need N According to an embodiment of the present disclosure, the MAC CE signaling configuration unit 525 may be used to configure the MAC CE signaling to be sent to the user-side electronic device, so that the MAC CE signaling includes at least a beam activation information. The beam activation information may be sent to the user-side electronic device as an additional part of the first beam indication information of control channel, so as to indicate to the user-side electronic device an activated beam for the transmission in the physical control channel.

According to an embodiment of the present disclosure, the DCI configuration unit 526 may be configured to configure the DCI to be sent to the user-side electronic device, so that the DCI includes the second beam indication information of control channel. The second beam indication information of control channel may also indicate to the user-side electronic device an activated beam for a transmission in the physical control channel.

The beam activation unit 527 may be configured to activate the activated beam as indicated by the first beam indication information of control channel configured by the RRC signaling configuration unit 524 and/or the MAC CE signaling configuration unit 525, or activate the activated beam as indicated by the second beam indication information of control channel configured by the DCI configuration unit 526, thereby ensuring that the receive/activated transmit beam used by the control-side electronic device 520 matches the transmit/activated receive beam used by the user-side electronic device.

According to an embodiment of the present disclosure, in the beam indication process for the physical control channel, the electronic device 520 may not always rely on the RRC signaling and/or the MAC CE signaling to provide beam indication to the user-side electronic device. Advantageously, the electronic device 520 may also use a DCI to perform the beam indication process, that is, to include additionally the second beam indication information of control channel in the DCI. Because a DCI is a physical layer information carried by the PDCCH, use of the DCI for beam indication has a reduced latency and improved dynamics.

According to an embodiment of the present disclosure, the processing circuit 523 may also optionally include an error control unit 528. The error control unit 528 may be configured to receive a feedback information from the user-side electronic device (for example, through the communication unit 521), and determine whether to use the activated beam as indicated by the second beam indication information of control channel based on the feedback information. According to an embodiment of the present disclosure, the feedback information from the user-side electronic device may be HARQ-ACK/HARQ-NACK for the PDCCH, or HARQ-ACK/HARQ-NACK for the PDSCH. For example, in response to the DCI (which may include second beam indication information of control channel) being sent by the control-side electronic device to the user-side electronic device, the user-side electronic device may send to the control-side electronic device a feedback information on whether the DCI is correctly decoded. If the feedback information from the user-side electronic device is HARQ-ACK, the control-side electronic device 520 may consider that the user-side electronic device has correctly extracted the second beam indication information of control channel, and therefore use the transmit/activated receive beam indicated by the second control channel beam indicator information in subsequent transmission in the physical control channel. If the feedback information from the user-side electronic device is HARQ-NACK, the control-side electronic device 520 may not use the transmit/activated receive beam indicated by the second beam indication information of control channel, but instead may use the old activated beam. Such an error control mechanism may ensure that the control-side electronic device and the user-side electronic device always use matching activated transmit/receive beams.

In addition, it should be noted that the use of DCI for beam indication does not mean that the electronic device 520 will no longer be able to use the RRC signaling and/or the MAC CE signaling to perform beam indication. In other words, on the basis that the beam configuration information has been initially provided through the RRC signaling, the DCI is another approach for beam indication, which is compatible with configuring the activated beam based on the RRC signaling and/or the MAC CE signaling, and it is not intended to exclude performing beam indication through the RRC signaling and/or the MAC CE signaling. According to an embodiment of the present disclosure, the electronic device 520 may choose to enable or not enable the second beam indication information of control channel in the DCI. For example, the control-side electronic device 520 may configure one or more extraction parameters related to the second beam indication information of control channel in the RRC signaling to instruct the user-side electronic device how to extract the second beam indication information of control channel in the DCI.

Next, description will be made for the physical downlink control channel (PDCCH) and the physical uplink control channel (PUCCH) respectively.

3-1. Beam indication Process for the PDCCH

As already described in Section 2-1 about the user-side electronic device, both the RRC signaling and the MAC CE signaling may be used to perform the beam indication process for the PDCCH. The control-side electronic device 520 may be used to configure the RRC signaling and the MAC CE signaling to make them include the first beam indication information of control channel, so as to indicate to the user-side electronic device an activated beam for a transmission in the PDCCH.

For example, the RRC signaling configuration unit 524 of the control-side electronic device 520 may configure the RRC signaling to make it include a beam configuration information. The RRC signaling may be sent to the user-side electronic device through the communication unit 521. As discussed above, the beam configuration information in the RRC signaling may include one or more TCI states (for example, the TCI state 350 described in respect to FIG. 3A), and the one or more TCI states may indicate to the user-side electronic device the association between the TCI states and the transmit/activated receive beam pairs.

The MAC CE signaling configuration unit 525 of the control-side electronic device 520 may configure the MAC CE signaling to make it include a beam activation information. The MAC CE signaling may be sent to the user-side electronic device through the communication unit 521. As one example, the beam activation information in the MAC CE signaling may be included in the field 360 described in respect to FIG. 3B. For example, the MAC CE signaling configuration unit 525 may configure the CORESET ID subfield 361 and the TCI state ID subfield 362 in the field 360 to identify the associated CORESET and the TCI state to be activated, respectively.

As already discussed in respect to FIG. 3C, the approach described above has a large latency of beam indication. In order to reduce the latency of beam indication, a DCI for downlink scheduling may be used to implement a dynamic beam indication process for the PDCCH. According to an embodiment of the present disclosure, the DCI configuration unit 526 of the control-side electronic device 520 may configure the DCI for downlink scheduling so that it includes the second beam indication information of control channel. According to an embodiment of the present disclosure, that DCI may have the field structure described in respect to FIG. 3D or FIG. 3E. The beneficial effects of using DCI for the dynamic beam indication process for the PDCCH have been discussed above in respect to FIG. 3F.

3-2. Beam Indication Process for the PUCCH

As already described in Section 2-2 about the user-side electronic device, both the RRC signaling and the MAC CE signaling may be used to perform the beam indication process for the PUCCH. The control-side electronic device 520 may configure the RRC signaling and the MAC CE signaling to make them include the first beam indication information of control channel to indicate to the user-side electronic device an activated beam for a transmission in the PUCCH.

For example, the RRC signaling configuration unit 524 of the control-side electronic device 520 may configure the RRC signaling to make it include a beam configuration information. As previously discussed, the beam configuration information in the RRC signaling may include one or more PUCCH-SRIs. The RRC signaling may be sent to the user-side electronic device through the communication unit 521.

The MAC CE signaling configuration unit 525 of the control-side electronic device 520 may configure the MAC CE signaling to make it include a beam activation information. The beam activation information may be included in the field 460 described in respect to FIG. 4A. For example, the MAC CE signaling configuration unit 525 may configure the PUCCH resource ID subfield 461 and the subfield 462 in the field 460 to identify the associated PUCCH resource and the activated beam to be used, respectively. The configured MAC CE signaling may be sent to the user-side electronic device through the communication unit 521.

In addition, the beam activation unit 526 of the control-side electronic device may activate an activated receive beam corresponding to the activated transmit beam to be used by the user-side electronic device, thereby ensuring the matching of the activated transmit beam and the activated receive beam.

As discussed above in respect to FIG. 4B, the above approach has a large latency of beam indication. In order to reduce the latency of beam indication, a DCI for uplink scheduling may be used to implement a dynamic beam indication for the PUCCH. According to an embodiment of the present disclosure, the DCI configuration unit 526 of the control-side electronic device 520 may configure the DCI for uplink scheduling so that it includes the second beam indication information of control channel. The DCI may have the field structure described in respect to FIG. 4C. The beneficial effects of this dynamic beam indication process for the PUCCH have been discussed above in respect to FIG. 4D.

Figure 6:
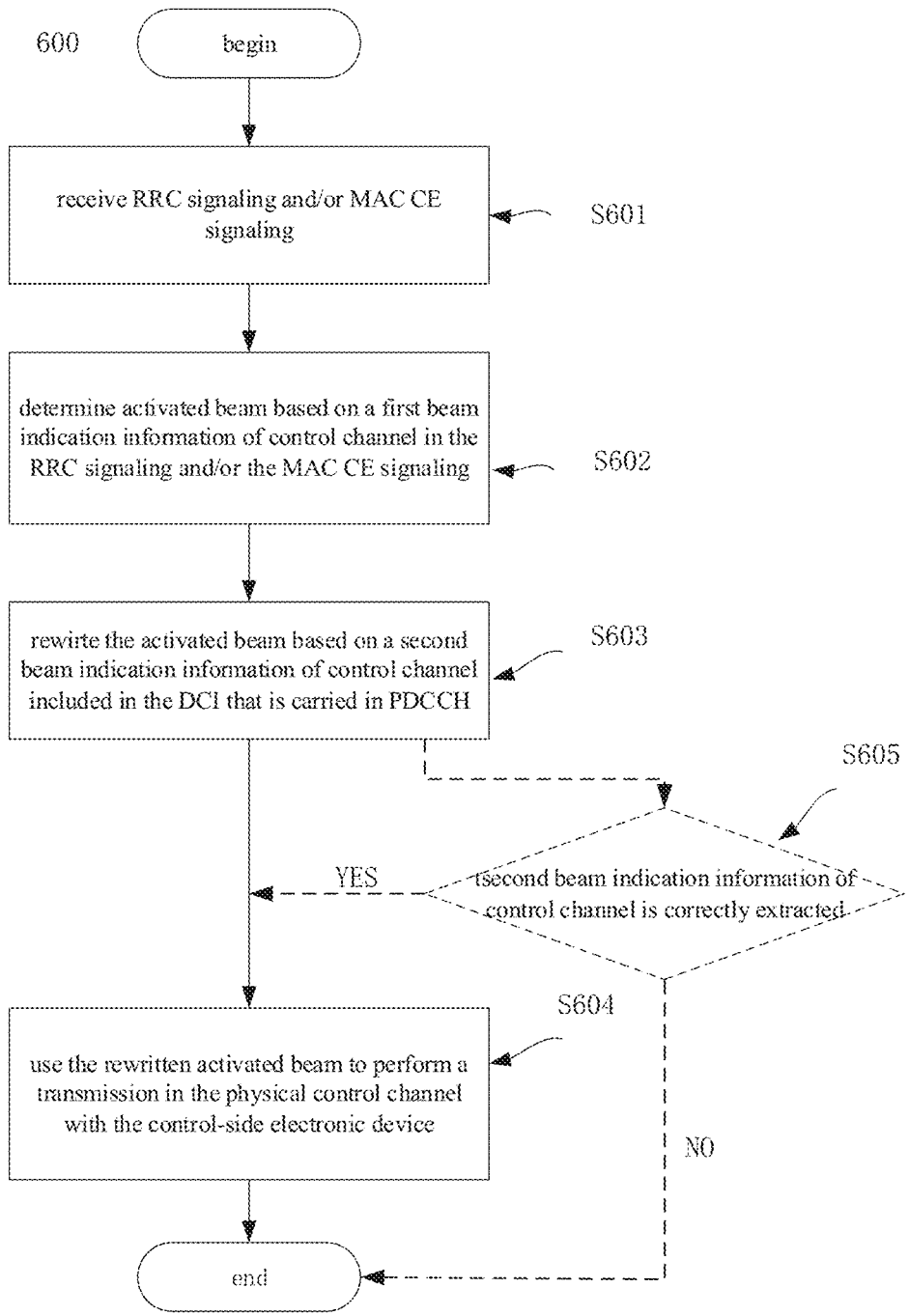
FIG. 6 illustrates a flowchart of a user-side communication method that has a reduced latency of beam indication for a physical control channel according to an embodiment of the present disclosure.

4. a User-Side Communication Method that has a Reduced Latency of Beam Indication for a Physical Control Channel According to an Embodiment of the Present Disclosure FIG. 6 illustrates a flowchart of a user-side communication method 600 that has a reduced latency of beam indication for a physical control channel according to an embodiment of the present disclosure. The communication method 600 may be executed by, for example, the user-side electronic device 210 described in respect to FIG. 2.

As illustrated in FIG. 6, at step S601, a RRC signaling and/or a MAC CE signaling from the control-side electronic device may be received. The control-side electronic device is, for example, the control-side electronic device 520 described in respect to FIG. 5.

At step S602, based on the first beam indication information of control channel in the RRC signaling and/or the MAC CE signaling, an activated beam may be determined to be used for a transmission in the physical control channel with the control-side electronic device. Specifically, the first beam indication information of control channel may be extracted from the RRC signaling and/or the MAC CE signaling through an RRC signaling processing unit (for example, 214) and a MAC CE signaling processing unit (for example, 215). The first beam indication information of control channel may be transmitted to a beam activation unit (for example, 217). The beam activation unit may determine the activated beam based on the first beam indication information of control channel. The activated beam may be used to perform the transmission in the physical control channel with the control-side electronic device. Additionally or alternatively, the RRC signaling processing unit may also extract one or more extraction parameters from the RRC signaling, which may be used to instruct the user-side electronic device how to extract the second beam indication information of control channel from a received DCI.

At step S603, based on a second beam indication information of control channel included in the DCI that is carried in the PDCCH, the activated beam is rewritten. Specifically, the second beam indication information of control channel may be extracted from the DCI through a DCI processing unit (for example, 216). According to an embodiment of the present disclosure, the second beam indication information of control channel may be extracted based on the one or more extraction parameters as obtained at step S602. The second beam indication information of control channel may be transmitted to the beam activation unit (for example, 217). The beam activation unit may rewrite the activated beam based on the second beam indication information of control channel.

At step S604, the rewritten activated beam is used to perform the transmission in the physical control channel with the control-side electronic device.

According to an embodiment of the present disclosure, the communication method 600 may optionally further include step S605 as represented by the dashed box. Step S605 may reside between step S603 and step S604, and it may be executed by, for example, an error control unit (for example, 218). At step S604, it may be determined whether the second beam indication information of control channel is correctly extracted. If it is determined that the second beam indication information of control channel has been correctly extracted, the communication method 600 may proceed to step S604 described above. Otherwise, the communication method 600 may skip step S604, that is, the old activated beam may be used for the transmission in the physical control channel, without rewriting the activated beam. Additionally, at step S605, the result of determining whether the second beam indication information of control channel is correctly extracted may be fed back to the control-side electronic device, and the feedback may be provided to the control-side electronic device through a HARQ mechanism for the PDCCH or the PDSCH, for example.

The communication method 600 enables an electronic device not only to determine an activated beam for the physical control channel based on the RRC signaling/MAC CE signaling, but also to dynamically determine the activated beam for the physical control channel based on the DCI, thereby reducing a latency of beam indication and improving dynamics of beam indication.

Figure 7:
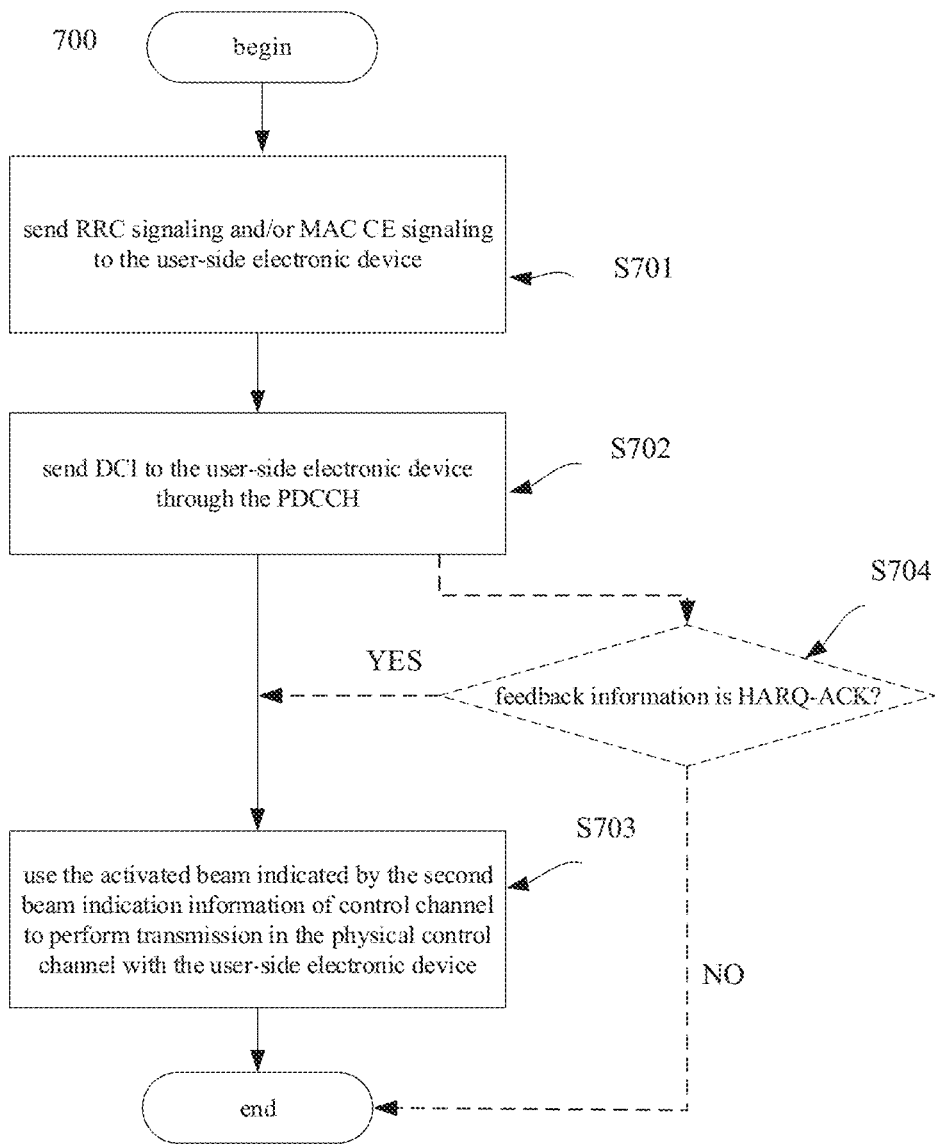
FIG. 7 illustrates a flowchart of a control-side communication method that has a reduced latency of beam indication for a physical control channel according to an embodiment of the present disclosure.

5. a Control-Side Communication Method that has a Reduced Latency of Beam Indication for a Physical Control Channel According to an Embodiment of the Present Disclosure FIG. 7 illustrates a flowchart of a control-side communication method 700 that has a reduced latency of beam indication for a physical control channel according to an embodiment of the present disclosure. The communication method 700 may be executed by, for example, the control-side electronic device 520 described in respect to FIG. 5.

As illustrated in FIG. 7, at step S701, an RRC signaling and/or MAC CE signaling may be sent to the user-side electronic device. The RRC signaling and/or the MAC CE signaling includes a first beam indication information of control channel, and the first beam indication information of control channel indicates to the user-side electronic device an activated beam for a transmission in the physical control channel. Specifically, the RRC signaling may be configured through an RRC signaling configuration unit (for example, 524) so that it includes the beam configuration information as described above in Section 2. The MAC CE signaling may be configured through a MAC CE signaling configuration unit (for example, 525) so that it includes the beam activation information as described above in Section 2. The beam configuration information and the beam activation information may be used together as the first beam indication information of control channel to indicate to the user-side electronic device the activated beam for the transmission in the physical control channel. Additionally or alternatively, the RRC signaling may also be configured to include one or more extraction parameters, which may be used to instruct the user-side electronic device how to extract the second beam indication information of control channel from a received DCI.

At step S702, a DCI may be sent to the user-side electronic device through the PDCCH. The DCI may be configured to include a second beam indication information of control channel, where the second beam indication information of control channel indicates to the user-side electronic device an activated beam for the transmission in the physical control channel. According to an embodiment of the present disclosure, the second beam indication information of control channel may be configured through a DCI configuration unit (for example, 526).

At step S703, the activated beam indicated by the second beam indication information of control channel may be used to perform the transmission in the physical control channel with the user-side electronic device. This may ensure that the control-side electronic device and the user-side electronic device use matching transmit/activated receive beam pairs to perform transmissions in the physical control channel.

According to an embodiment of the present disclosure, the communication method 700 may optionally further include step S704 represented by the dashed box. Step S704 may reside between step S702 and step S703, and it may be executed by, for example, an error control unit (for example, 528). At step S704, a feedback information from the user-side electronic device may be received, and it is determined, based on the feedback information, whether to use the activated beam indicated by the second beam indication information of control channel. As discussed above, the feedback information may be HARQ-ACK/HARQ-NACK for the PDCCH or HARQ-ACK/HARQ-NACK for the PDSCH. According to an embodiment of the present disclosure, if the feedback information is HARQ-ACK, the communication method may proceed to step S703; if the feedback information is HARQ-NACK, the communication method 700 may skip step S703, that is, the transmit/activated receive beam indicated by the second beam indication information of control channel may not be used, but instead the old activated beam may be used.

The communication method 700 enables the control-side electronic device to use the DCI for a dynamic beam indication process, in addition to using the RRC signaling/MAC CE signaling for beam indication for the physical control channel, thereby reducing a latency of beam indication and improving dynamics of beam indication.

6. A Beam Indication Process that has a Reduced Latency of Beam Indication for a Physical Control Channel According to an Embodiment of the Present Disclosure FIG. 8 illustrates a signaling diagram 8000 of a beam indication with a reduced latency of beam indication for a physical control channel according to an embodiment of the present disclosure.

Figure 8:
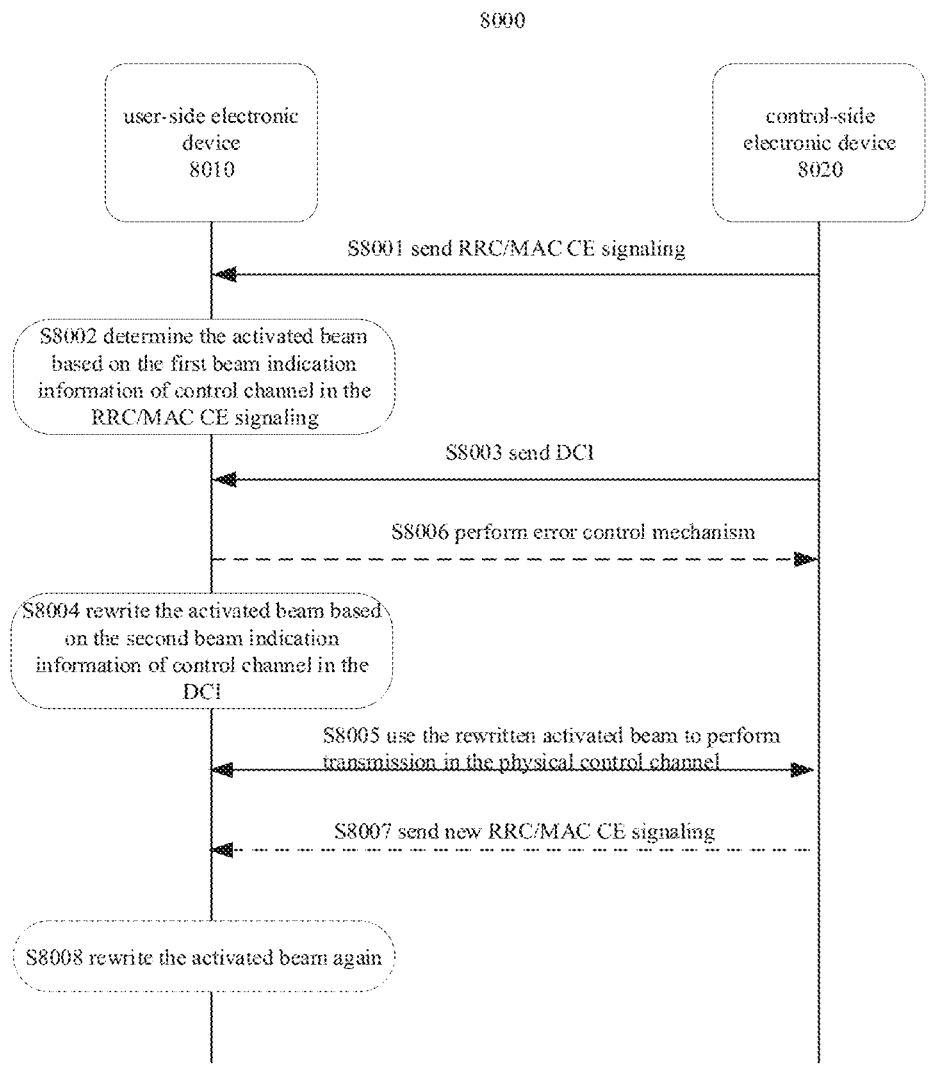
FIG. 8 illustrates a signaling diagram of a beam indication process that has a reduced latency of beam indication for a physical control channel according to an embodiment of the present disclosure.

As illustrated in FIG. 8, at step S8001, the control-side electronic device 8020 sends an RRC signaling and a MAC CE signaling to the user-side electronic device 8010.

At step S8002, the user-side electronic device 8010 determines an activated beam to be used for a transmission in the physical control channel communication with the control-side electronic device according to a first beam indication information of control channel in the received RRC signaling and MAC CE signaling.

At step S8003, the control-side electronic device 8020 sends a DCI to the user-side electronic device 8010 through the PDCCH.

At step S8004, the user-side electronic device 8010 rewrites the activated beam according to a second beam indication information of control channel in the received DCI.

At step S8005, the user-side electronic device 8010 uses the rewritten activated beam, and the control-side electronic device 8020 uses a corresponding transmit/receive beam, to perform the transmission in the physical control channel.

Additionally or alternatively, there may be an optional step S8006 between steps S8003 and S8004. In S8006, an error control mechanism between the user-side electronic device 8010 and the control-side electronic device 8020 determines whether to use the transmit/activated receive beam as indicated by the second beam indication information of control channel in the DCI, as described above in respect to step S605 in FIG. 6 and step S704 in FIG. 7.

Further, as illustrated in FIG. 8, if after step S8005, the control-side electronic device 8020 has further sent a new RRC signaling and a new MAC CE signaling to the user-side electronic device 8010 at step S8007, the user-side electronic device 8010 may rewrite the activated beam, which has been rewritten in S8004, again at step S8008 based on a first beam indication information of control channel in the new RRC signaling and the new MAC CE signaling. That is, the user-side electronic device 8010 may rewrite the activated beam based on a more recent one of the first beam indication information of control channel and the second beam indication information of control channel.

The electronic device and the communication method with a reduced latency of beam indication for the physical control channel according to an embodiment of the present disclosure have been described above in conjunction with FIGS. 2-8. In the following, an electronic device and a communication method with a reduced latency of beam indication for the physical data channel according to an embodiment of the present disclosure will be described.

Figure 9:
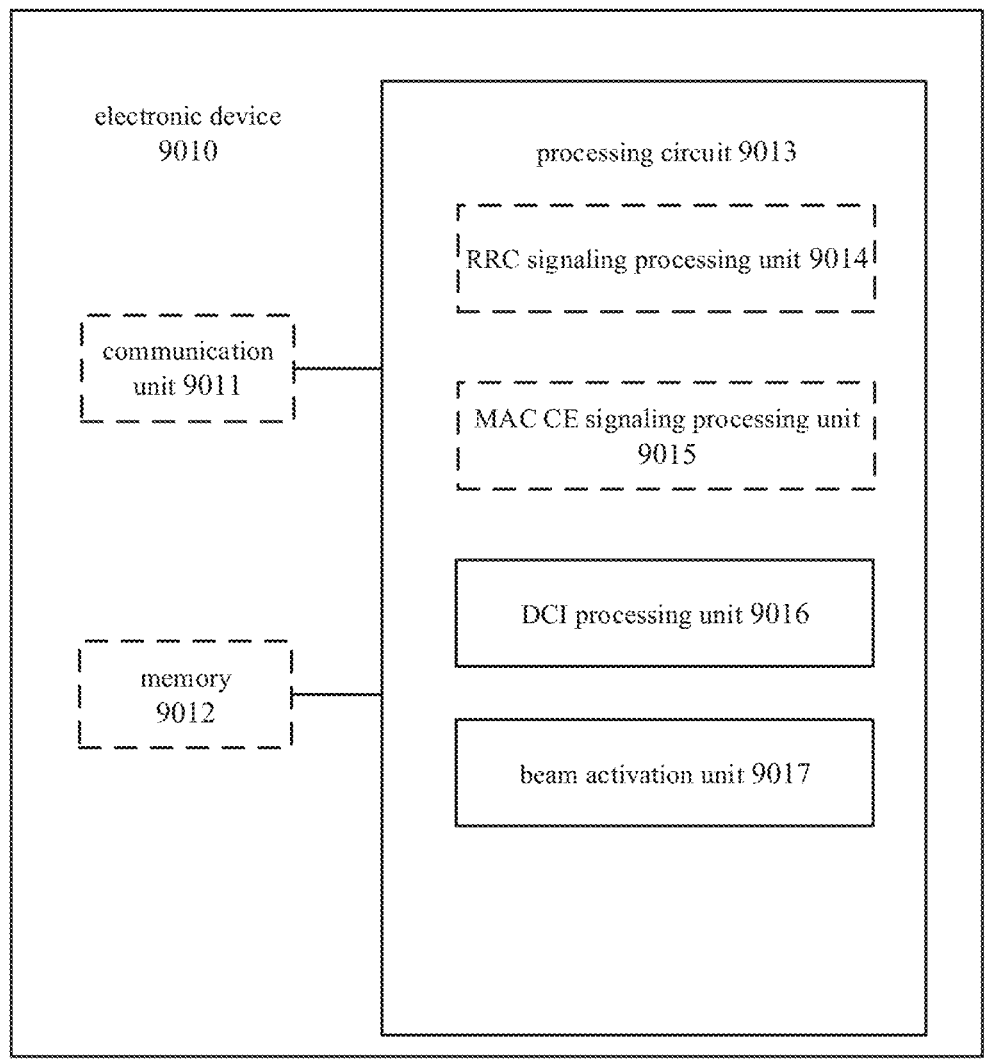
FIG. 9 illustrates a block diagram of a user-side electronic device that has a reduced latency of beam indication for a physical data channel according to an embodiment of the present disclosure.

7. A User-Side Electronic Device that has a Reduced Latency of Beam Indication for a Physical Data Channel According to an Embodiment of the Present Disclosure FIG. 9 illustrates a block diagram of a user-side electronic device that has a reduced latency of beam indication for a physical data channel according to an embodiment of the present disclosure. The electronic device 9010 may reside in a user-side communication device (such as a smart phone). According to an embodiment of the present disclosure, the electronic device 9010 may include, for example, a communication unit 9011, a memory 9012, and a processing circuit 9013.

The communication unit 9011 may be used to receive radio signals transmitted by the control-side electronic device through one or more of the PDCCH or the PDSCH, and may further perform processing such as down-conversion and analog-digital conversion on the received radio signals, and may provide the information obtained from the radio signals to other parts of the electronic device 9010 (for example, the processing circuit 9013 or the memory 9012). The communication unit 9011 may also be used to transmit radio signals from the user-side electronic device 9010 to the control-side electronic device through the PUCCH or the PUSCH, and may perform processing such as digital-to-analog conversion and up-conversion on the radio signals before transmitting. The information transmitted by the communication unit 9011 may come from other parts of the electronic device 9010 (for example, the processing circuit 9013 or the memory 9012). The radio signals received or transmitted by the communication unit 9011 may include control information or data (e.g., a RRC signaling, a MAC CE signaling, a DCI or ACK/NACK, CQI, PMI, etc.). In an embodiment of the present disclosure, the communication unit 9011 may be implemented as a communication interface component like an antenna device, a radio frequency circuit, and part of a baseband processing circuit etc., for example. The communication unit 9011 is drawn with a dashed line, as it may also reside within the processing circuit 9013 or outside of the electronic device 9010.

The memory 9012 of the electronic device 9010 may store information generated by the processing circuit 9013, information received from other devices through the communication unit 9011, programs, machine codes, and data used for operations of the electronic device 9010, and the like. The memory 9012 is drawn with a dashed line, as it may also reside within the processing circuit 9013 or outside of the electronic device 9010. The memory 9012 may be a volatile memory and/or a non-volatile memory. For example, the memory 9012 may include, but is not limited to, a random access memory (RAM), a dynamic random access memory (DRAM), a static random access memory (SRAM), a read only memory (ROM), and a flash memory.

The processing circuit 9013 may provide various functions of the electronic device 9010. According to an embodiment of the present disclosure, the processing circuit 9013 may be configured to receive a DCI from the control-side electronic device through the PDCCH; determine, based on a first beam indication information of data channel in the DCI, an first activated beam for the physical data channel that is scheduled by the DCI; determine, based on a second beam indication information of data channel in the DCI, one or more second activated beams to be used by one or more subsequent transmissions in the physical data channel; use the first activated beam to perform a transmission in the physical data channel with the control-side electronic device; after using the first beam to perform the transmission in the physical data channel with the control-side electronic device, use the one or more second activated beams to perform the one or more subsequent transmissions in the physical data channel with the control-side electronic device.

According to an embodiment of the present disclosure, the processing circuit 9013 may include various units, e.g., a DCI processing unit 9016 and a beam activation unit 9017, for implementing the functions described above. The processing units included in the processing circuit 9013 may be communicatively coupled to each other (not shown) and/or coupled to one or more of the communication unit 9011 or the memory 9012 (not shown). It should be noted that, although each unit is illustrated as a separate unit in FIG. 9, one or more of these units may be combined into one unit as well or split into multiple units.

According to an embodiment of the present disclosure, the DCI processing unit 9016 may be configured to process the DCI from the control-side electronic device to extract the first beam indication information of data channel and the second beam indication information of data channel in the DCI. The DCI processing unit 9016 may also send the first beam indication information of data channel and the second beam indication information of data channel to the beam activation unit 9017.

According to an embodiment of the present disclosure, the beam activation unit 9017 may be configured to determine the first activated beam for the physical data channel that is scheduled by the DCI based on the first beam indication information of data channel in the DCI, and determine the one or more second activated beams to be used by the one or more subsequent transmissions in the physical data channel based on the second beam indication information of data channel.

In this way, the activated beam used for a current transmission in the physical data channel may be indicated by the first beam indication information of data channel in the DCI, and the one or more second activated beams used by the one or more subsequent transmissions in the physical data channel may be further indicated by the second beam indication information of data channel in the DCI. The user-side electronic device 9010 may use the first activated beam to perform a transmission in the physical data channel with the control-side electronic device, and after using the first activated beam to perform the transmission in the physical data channel with the control-side electronic device, use the one or more second activated beams to perform the one or more subsequent transmissions in the physical data channel with the control-side electronic device. In the process of indicating the activated beam to be used for that one or more subsequent transmissions in the physical data channel, use of an RRC signaling and a MAC CE signaling is avoided. Moreover, indicating in advance the activated beam to be used for subsequent transmissions may avoid being unready for the indicated activated beam due to limitation of the user-side electronic device itself, which may further reduce the possible latency caused by the beam indication process.

According to an embodiment of the present disclosure, the processing circuit 9013 of the electronic device 9010 may also optionally include one or more of the RRC signaling processing unit 9014 and the MAC CE signaling processing unit 9015. In FIG. 9, the optional RRC signaling processing unit 9014 and the MAC CE signaling processing unit 9015 are illustrated with dashed boxes. The RRC signaling processing unit 9014 and the MAC CE signaling processing unit 9015 may process an RRC signaling and a MAC CE signaling from the control-side electronic device, respectively. The RRC signaling and the MAC CE signaling may be received from the control-side electronic device before receiving the DCI that includes the first beam indication information of data channel and the second beam indication information of data channel, for example. The RRC signaling processing unit 9014 and the MAC CE signaling processing unit 9015 may extract configuration information related to beam indication of the data channel from the RRC signaling and the MAC CE signaling.

According to one embodiment of the present disclosure, the configuration information received from the RRC signaling and the MAC CE signaling may a include beam configuration information and a beam activation information. This will be described in detail in Sections 7-1 and 7-2 below.

According to an embodiment of the present disclosure, the configuration information received from the RRC signaling may further include one or more extraction parameters. The DCI processing unit 9016 may extract the second beam indication information of data channel from the DCI based on one or more of these extraction parameters. For example, the extraction parameters may include a parameter identifying whether the DCI includes the second beam indication information of data channel, and/or a parameter identifying the quantity of second activated beams indicated by the second beam indication information of data channel. This will also be described in detail in Sections 7-1 and 7-2 below.

In addition, it should be noted that determining the beams to be used for the one or more subsequent transmissions in the physical data channel based on the second beam indication information of data channel included in the DCI does not mean that the electronic device 9010 cannot indicate the beams used for that one or more subsequent transmissions based on other approaches. For example, if, after receiving the second beam indication information of data channel from the control-side electronic device, a RRC signaling or a MAC CE signaling including information for indicating the activated beam is received as well, the electronic device 9010 may determine the activated beam based on that new RRC signaling or that new MAC CE signaling. In other words, the second beam indication information of control channel included in the DCI is an approach for beam indication that is compatible with beam indication through the RRC signaling and/or the MAC CE signaling, and is not intended to exclude the beam indication approach through the RRC signaling and/or the MAC CE signaling.

Next, description will be made for the physical downlink shared channel (PDSCH) and the physical uplink shared channel (PUSCH) respectively.

7-1. Beam Indication Process for the PDSCH

The beam indication for the PDSCH is used to indicate to the user-side electronic device an activated receive beam for the PDSCH. In the standard Release 15, the beam indication process for the PDSCH may involve one or more of an RRC signaling, a MAC CE signaling, and a DCI.

For example, during the beam indication process, the user-side electronic device (for example, 9010) may extract (for example, through the RRC signaling processing unit 9014) a beam configuration information from the RRC signaling from the control-side electronic device. The beam configuration information includes, for example, one or more TCI states, for example the TCI state 350 described above in respect to FIG. 3A. Similar to the processing for the PDCCH, the user-side electronic device may establish an association between the TCI states and the transmit/activated receive beam pairs based on the beam configuration information from the RRC signaling, and may store the association locally in the user-side electronic device for subsequent use.

The user-side electronic device may then extract a beam activation information from the MAC CE signaling from the control-side electronic device through an MAC CE signaling processing unit (for example, 9015). The beam activation information may identify one or more TCI states to be activated among the one or more TCI states that have been configured by the RRC signaling, thereby indicating a set of TCI states to be activated.

Figure 10A:
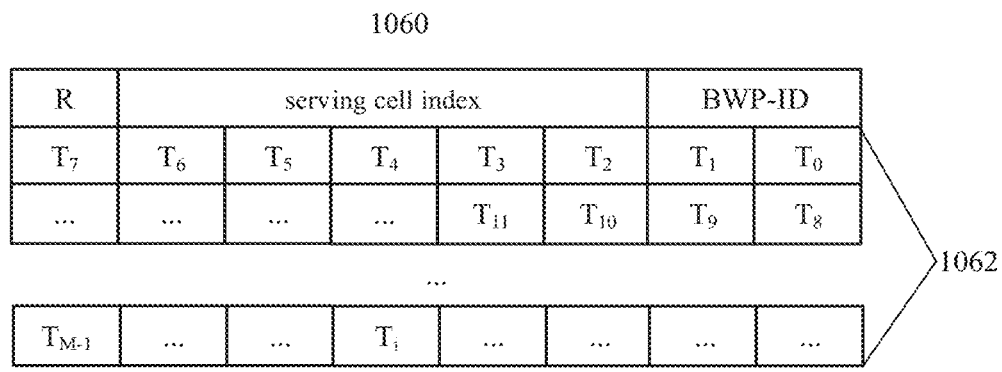
FIG. 10A illustrates a schematic block diagram of an exemplary beam activation information for the PDSCH in a MAC CE signaling.

As one example, FIG. 10A illustrates a schematic block diagram of an exemplary beam activation information for the PDSCH in the MAC CE signaling. As illustrated in the figure, in addition to the subfields used to indicate a serving cell index and a BWP-ID, the field 1060 in the MAC CE signaling may further include a subfield 1062 consisting of multiple bits Ti ($i=1, \ldots, M$, M is the maximum number of TCI states configured through the RRC signaling, for example, M=64). The set of TCI states to be activated may be indicated by setting one or more bits in the subfield 1062 to 1. For example, when $T_0$ and $T_1$ are set to 1, it may indicate that the two TCI states with TCI state IDs equal to 0 and 1 belong to the set of TCI states to be activated. In the standard Release 15, the set of TCI states to be activated indicated by the beam activation information in the MAC CE may include up to 8 elements. That is, at most 8 bits in the subfield 1062 may be set to 1, and the remaining bits are all set to 0.

The user-side electronic device may then extract (for example, through the DCI processing unit 1016) a first beam indication information of data channel from the DCI. The first beam indication information of data channel is, for example, a TCI index for the PDSCH. The TCI index for the PDSCH may indicate only one TCI state to be activated in the determined set of TCI states to be activated. For example, in the standard Release 15, the TCI index information may have a length of 3 bits, thereby indicating only one TCI state in the determined set (with maximum 8 elements) of TCI state to be activated. It should be noted that, when the set of TCI states to be activated includes less than 8 elements, the MAC CE signaling may be skipped, and one TCI state to be activated is indicated directly by the information of a 3-bit TCI index. The activated receive beam associated with that TCI state is the indicated activated receive beam to be used for the PDSCH.

It is described above that the user-side electronic device determines the activated receive beam for the PDSCH based on configuration information provided by both the RRC signaling and the MAC CE signaling (for example, beam configuration information and optional beam activation information) and the first beam indication information of data channel in the DCI. This approach may lead to a large latency and may reduce the performance of transmission. FIG. 10B illustrates a schematic diagram of the latency and performance degradation caused by such beam indication for the PDSCH. In particular, when the DCI including the first beam indication information of data channel is close enough in time to the transmission of PDSCH that is scheduled by that DCI (that is, if a transmission of the PDSCH arrives within a switching time threshold of activated receive beam (for example, the time difference between the two is less than a threshold T3, Threshold-Sched-Offset, illustrated in FIG. 10B)), the user-side electronic device may not properly prepare the activated receive beam that is indicated by the first beam indication information of data channel to be used for the PDSCH, due to the limitation of the radio frequency hardware of the user-side electronic device itself. In this case, if the user-side electronic device still uses an old activated receive beam, the old activated receive beam would not match the activated transmit beam of the control-side electronic device, which will reduce the performance of transmission of PDSCH.

According to an embodiment of the present disclosure, in order to reduce the latency and avoid performance degradation, a second beam indication information of data channel may be additionally included in the DCI. Unlike the first beam indication information of data channel that only indicates the activated beam used for a currently scheduled transmission in the PDSCH, the second beam indication information of data channel may indicate activated beams used for one or more subsequent transmissions carried by the PDSCH. A DCI processing unit (for example, 9016) of the user-side electronic device may be configured to extract the second beam indication information of data channel from the DCI, in addition to the first beam indication information of data channel from the DCI. The first and second beam indication information of data channel may be transmitted to a beam activation unit (for example, 9017). The beam activation unit may determine a first activated receive beam used for the current transmission in the PDSCH based on the first beam indication information of data channel, and may also determine one or more second activated receive beams used for the one or more subsequent transmissions after the current transmission based on the second beam indication information of data channel. In this way, the user-side electronic device may determine, in advance, the one or more activated receive beams to be used for transmissions in the PDSCH. This ahead-of-time determination may occur at a far point in time before the actual transmissions, so that the user-side electronic device may have enough time to prepare the activated receive beams.

Figure 10D:
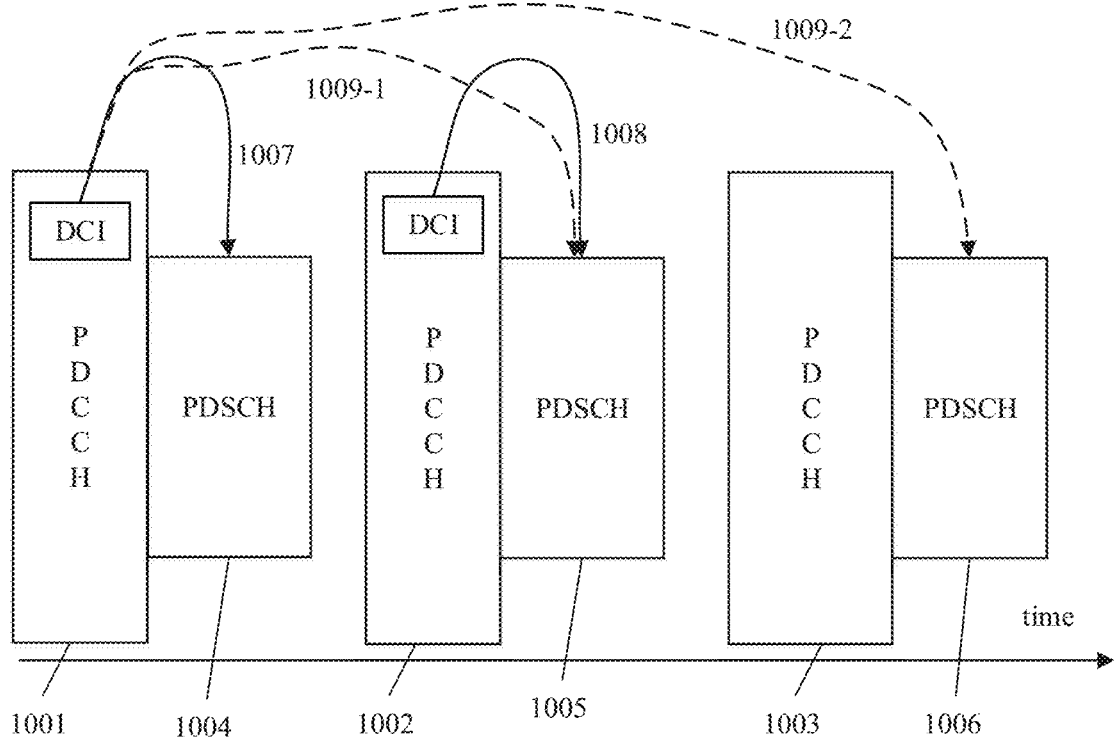
FIG. 10D illustrates a schematic diagram of a dynamic beam indication process for the PDSCH according to an embodiment of the present disclosure.
Figure 10B:
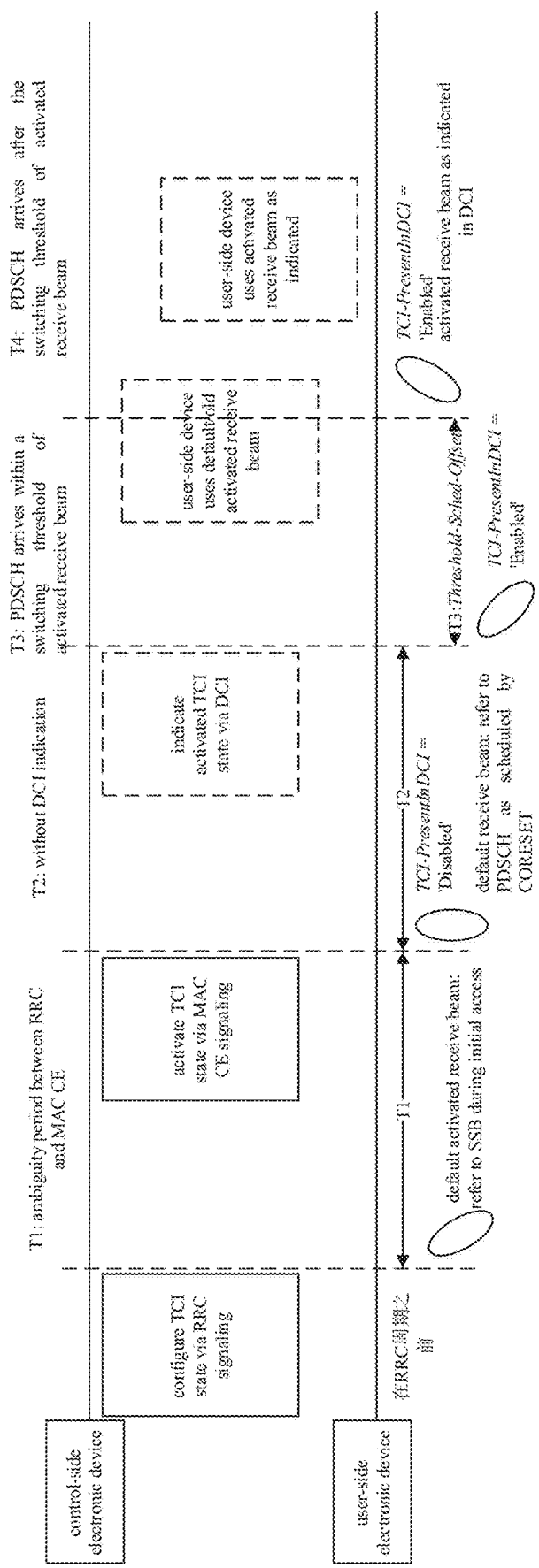
FIG. 10B illustrates a schematic diagram of latency and performance degradation caused by a beam indication process for the PDSCH.
Figure 10C:
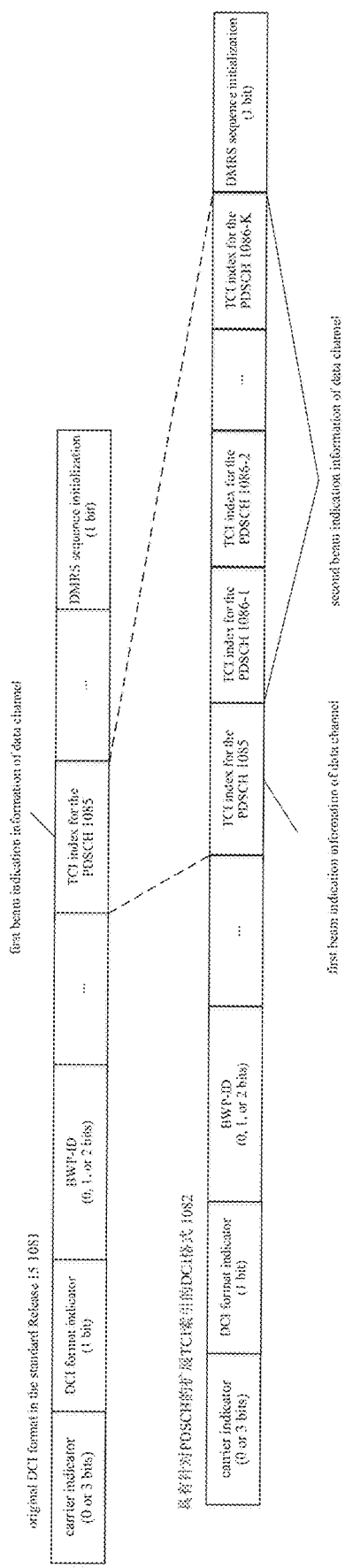
FIG. 10C illustrates a schematic diagram of an exemplary field structure of a DCI according to an embodiment of the present disclosure.

FIG. 10C illustrates a schematic diagram of an exemplary field structure of the DCI according to an embodiment of the present disclosure. The standard Release 15 has specified an original DCI format 1081 for downlink scheduling, which may include subfields of: a carrier indicator (0 or 3 bits), a DCI format indicator (1 bit), a BWP-ID (0, 1, or 2 bits), and a DMRS sequence initialization (1 bit) and the like. The DCI format 1081 may further include a TCI index 1085 for the PDSCH (for example, 3 bits). The TCI index for the PDSCH may be used as the first beam indication information of data channel. The user-side electronic device may determine, based on the first beam indication information of data channel, one activated receive beam for the current transmission in the PDSCH.

According to an embodiment of the present disclosure, a DCI format 1082 with an extended TCI index may be adopted. As illustrated in FIG. 10C, in addition to the TCI index 1085 for the PDSCH, the DCI format 1082 further includes a second beam indication information of data channel, which is composed of K (K greater than or equal to 1) TCI indexes 1086-1 to 1086-K for the PDSCH. Each of the TCI indexes 1086-1 to 1086-K for the PDSCH may have a same length and value range as the TCI index 1085. Each TCI index in the second beam indication information of data channel may indicate an activated receive beam used for the PDSCH in one subsequent transmission, thereby in total indicating activated receive beams used for the PDSCH in subsequent K transmissions. In this way, when the user-side electronic device receives the DCI with the DCI format 1082, it may determine a first activated receive beam for the current transmission in the PDSCH based on the TCI index 1085, and may also determine K second activated receive beams for subsequent K transmissions in the PDSCH (where the K second activated receive beams may be same or different). This allows the user-side electronic device to have enough time to prepare these second activated receive beams, thereby avoiding effectively the latency or performance degradation as illustrated in FIG. 10B.

It should be noted that although the TCI indexes 1086-1 to 1086-K are illustrated as being successively placed after the TCI index 1085 for the PDSCH in FIG. 10C, this is merely one preferred embodiment, as it is advantageous to put fields with similar functions together. According to an embodiment of the present disclosure, the TCI indexes 1086-1 to 1086-K may be placed in any position in the DCI format 1082 in any manner.

According to an embodiment of the present disclosure, a DCI processing unit (for example, 9016) of the user-side electronic device may extract the TCI indexes 1086-1 to 1086-K for the PDSCH in the DCI based on configuration information in RRC signaling. The configuration information may include one or more extraction parameters. According to an embodiment of the present disclosure, these extraction parameters may include a parameter (for example, PDSCH_TCI_PresentInDCI) that identifies whether the DCI includes the second beam indication information of data channel, so as to identify whether there are one or more of TCI indexes 1086-1 to 1086-K for the PDSCH existing the DCI. According to an embodiment of the present disclosure, these extraction parameters may further include a parameter (for example, K_PDSCH_TCI_PresentInDCI) that identifies the quantity of second activated receive beams that are indicated by the second beam indication information of data channel, thereby indicating the quantity (K) of TCI indexes for the PDSCH that are included in the second beam indication information of data channel in the DCI.

In this way, the user-side electronic device may determine, in advance, activated receive beams for one or more subsequent transmissions of PDSCH based on the second beam indication information of data channel in the DCI, so that the user-side electronic device has enough time to prepare the indicated activated receive beams.

FIG. 10D illustrates a schematic diagram of a dynamic beam indication for the PDSCH according to an embodiment of the present disclosure. The figure illustrates one or more control signaling transmissions 1001-1003 carried by the PDCCH, one or more of which may include a DCI for downlink scheduling. The figure also illustrates one or more data transmissions 1004-1006 carried by the PDSCH. The solid arrow 1007 illustrates that the activated receive beam to be used for the PDSCH data transmission 1004 scheduled by the DCI is indicated based on the DCI in the PDCCH control signaling transmission 1001. The solid arrow 1008 illustrates that the activated receive beam to be used for the PDSCH data transmission 1005 scheduled by the DCI is indicated based on the DCI in the PDCCH control signaling transmission 1002. The beam indications achieved by the solid arrows 1007 and 1008 are based on the first beam indication information of data channel in the DCI. According to an embodiment of the present disclosure, the DCI may further include the second beam indication information of data channel that indicates activated receive beams for one or more subsequent transmissions. As illustrated by the dashed arrows 1009-1 and 1009-2, the DCI in the control signaling transmission 1001 carried by the PDCCH may further indicate activated receive beams used for the data transmission 1005 and 1006 in the PDSCH. It should be noted that although it is illustrated here that the second beam indication information of data channel may indicate activated receive beams used for two subsequent data transmissions in the PDSCH, it will be clear to those skilled in the art that the quantity of indicated subsequent transmissions may be more or less.

7-2 Beam Indication Process for the PUSCH

The beam indication process for the PUSCH is used to indicate to the user-side electronic device an activated transmit beam for the PUSCH. In the standard Release 15, the beam indication process for the PUSCH may involve one or more of an RRC signaling, a MAC CE signaling, and a DCI.

For example, during the beam indication process, the user-side electronic device (for example, 9010) may extract a beam configuration information from the RRC signaling from the control-side electronic device (for example, through the RRC signaling processing unit 9014). The beam configuration information may include a SRI for each SRS resource. Then, the user-side electronic device may extract (for example, by the DCI processing unit 9016) a first beam indication information of data channel from the DCI used for uplink scheduling. The first beam indication information of data channel may indicate a SRI to be activated for a currently scheduled PUSCH, thereby indicating to the user-side electronic device an activated transmit beam for the PUSCH.

Figure 11A:
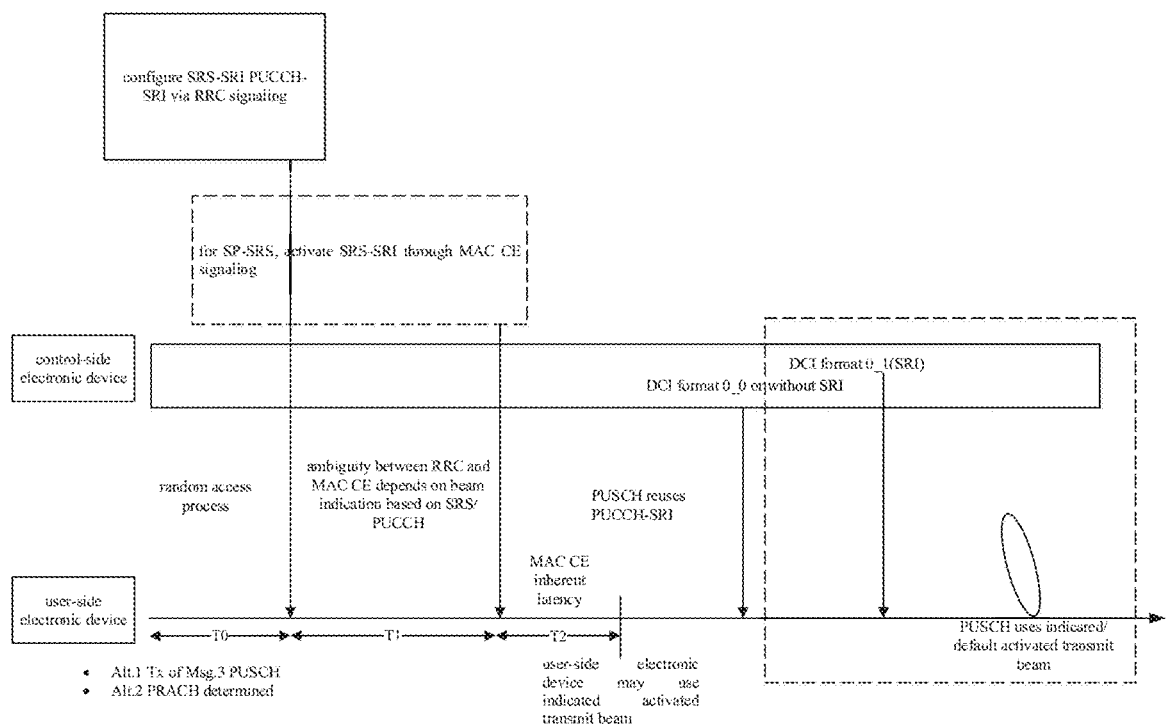
FIG. 11A illustrates a schematic diagram of a latency caused by a beam indication process for the PUSCH.

For systems using semi-static SRS (SP-SRS), the beam indication process for the PUSCH may further require participation of the MAC CE signaling. As explained above, the participation of the RRC signaling and the MAC CE signaling will result in a large latency. FIG. 11A illustrates a schematic diagram of a latency caused by the beam indication process for the PUSCH.

In addition, similar to the case of the PDSCH, after receiving the DCI for uplink scheduling, the user-side electronic device also needs a certain amount of time to prepare the indicated activated transmit beam. If the arrival time of the DCI is too close to the transmitting time for a transmission in the PUSCH (for example, less than a time threshold for the user-side electronic device to prepare the beam), the user-side electronic device may not properly prepare the activated transmit beam that is indicated by the DCI. This will degrade quality of the transmission in the PUSCH.

According to an embodiment of the present disclosure, in order to reduce the latency and avoid performance degradation, a second beam indication information of data channel may be additionally included in the DCI. Unlike the first beam indication information of data channel that only indicates the activated beam used for a currently scheduled transmission in the PUSCH, the second beam indication information of data channel may indicate activated beams used for one or more subsequent transmissions carried by the PUSCH. A DCI processing unit (for example, 9016) of the user-side electronic device may be configured to extract the second beam indication information of data channel from the DCI, in addition to extracting the first beam indication information of data channel from the DCI. The first and second beam indication information of data channel may be transmitted to a beam activation unit (for example, 9017). The beam activation unit may determine a first activated receive beam used for a current transmission in the PUSCH based on the first beam indication information of data channel, and may also determine one or more second activated receive beams used for one or more subsequent transmissions after the current transmission based on the second beam indication information of data channel. In this way, the user-side electronic device may determine, in advance, one or more activated receive beams used for transmissions in the PUSCH. This ahead-of-time determination may occur at a far point in time before the actual transmissions, so that the user-side electronic device may have enough time to prepare the activated transmit beams.

Figure 11B:
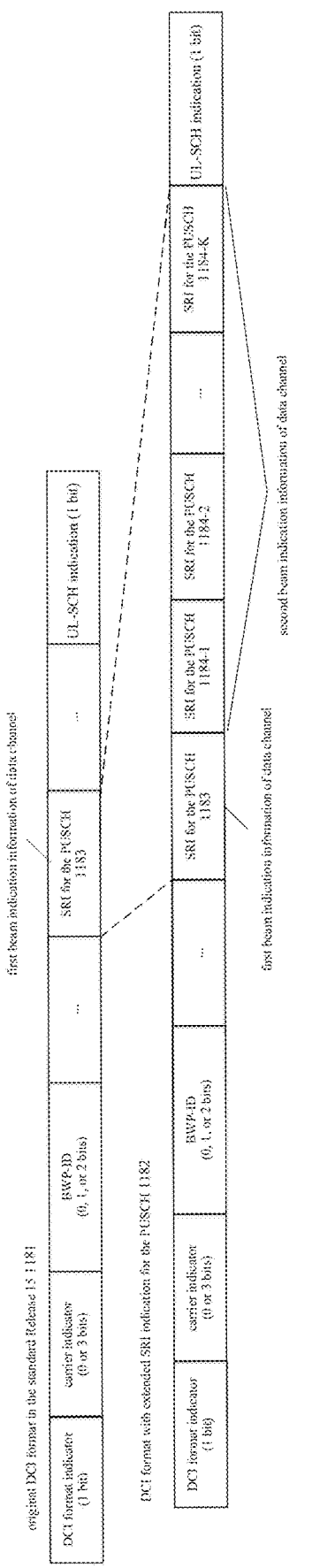
FIG. 11B illustrates a schematic diagram of an exemplary field structure of a DCI according to an embodiment of the present disclosure.

FIG. 11B illustrates a schematic diagram of an exemplary field structure of the DCI according to an embodiment of the present disclosure. The standard Release 15 has specified an original DCI format 1181 for downlink scheduling (for example, the DCI format 0_1 in the standard Release 15), which may include subfields of: a carrier indicator (0 or 3 bits), a DCI format indicator (1 bit), a BWP-ID (0, 1, or 2 bits) and a UL-SCH indication (1 bit) and the like. The DCI format 1181 may further include a TCI index 1183 for the PUSCH. The TCI index for the PUSCH may be used as the first beam indication information of data channel. The user-side electronic device may determine, based on the first beam indication information of data channel, one activated transmit beam for the current transmission in the PUSCH.

According to an embodiment of the present disclosure, a DCI format 1182 with an extended SRI indication for the PUSCH may be adopted. As illustrated in FIG. 11B, according to an embodiment of the present disclosure, in addition to the SRI indication 1183 for the PUSCH, the DCI format 1182 may further include a second beam indication information of data channel, which is composed of K (K greater than or equal to 1) SRI indications 1184-1 to 1184 for the PUSCH. Each of the SRI indications 1184-1 to 1184-K for the PUSCH may have a same length and a same value range as the SRI indication 1183. Each SRI indication in the second beam indication information of data channel may indicate an activated transmit beam used for the PUSCH in one subsequent transmission, thereby in total indicating activated transmit beams used for the PUSCH in subsequent K transmissions. In this way, when the user-side electronic device receives the DCI with the DCI format 1182, it may determine a first activated transmit beam for the current transmission in the PUSCH based on the SRI indication 1183, and may also determine K second activated transmit beams for subsequent K transmissions in the PUSCH (where the K second activated transmit beams may be the same or different). This allows the user-side electronic device to have enough time to prepare the second activated transmit beams, thereby avoiding effectively the latency or performance degradation as illustrated in FIG. 11A.

It should be noted that although the SRI indications 1184-1 to 1184-K are illustrated as being successively placed after the SRI indication 1183 for the PUSCH in FIG. 11B, this is merely one preferred embodiment, as it is advantageous to put fields with similar functions together. According to an embodiment of the present disclosure, the SRI indications 1184-1 to 1184-K may be placed in any position in the DCI format 1182 in any manner.

According to an embodiment of the present disclosure, a DCI processing unit (for example, 9016) of the user-side electronic device may extract the SRI indications 1184-1 to 1184-K for the PUSCH in the DCI based on configuration information in the RRC signaling. The configuration information may include one or more extraction parameters. According to an embodiment of the present disclosure, these extraction parameters may include a parameter (for example, PUSCH_SRI_PresentInDCI) that identifies whether the DCI includes the second beam indication information of data channel, so as to identify whether there exist one or more of SRI indications 1184-1 to 1184-K for the PUSCH in the DCI. According to an embodiment of the present disclosure, these extraction parameters may further include a parameter (for example, K_PUSCH_SRI_PresentInDCI) that identifies the quantity of second activated transmit beams that are indicated by the second beam indication information of data channel, thereby indicating the quantity (K) of SRI indications for the PUSCH included in the second beam indication information of data channel in the DCI.

In this way, the user-side electronic device may determine, in advance, activated transmit beams for one or more subsequent transmissions in the PUSCH based on the second beam indication information of data channel in the DCI, thereby, on one hand, avoiding using the RRC signaling/MAC signaling to indicate these activated receive beams, and, on the other hand, also allowing the user-side electronic device to have enough time to prepare the indicated activated transmit beams.

Figure 11C:
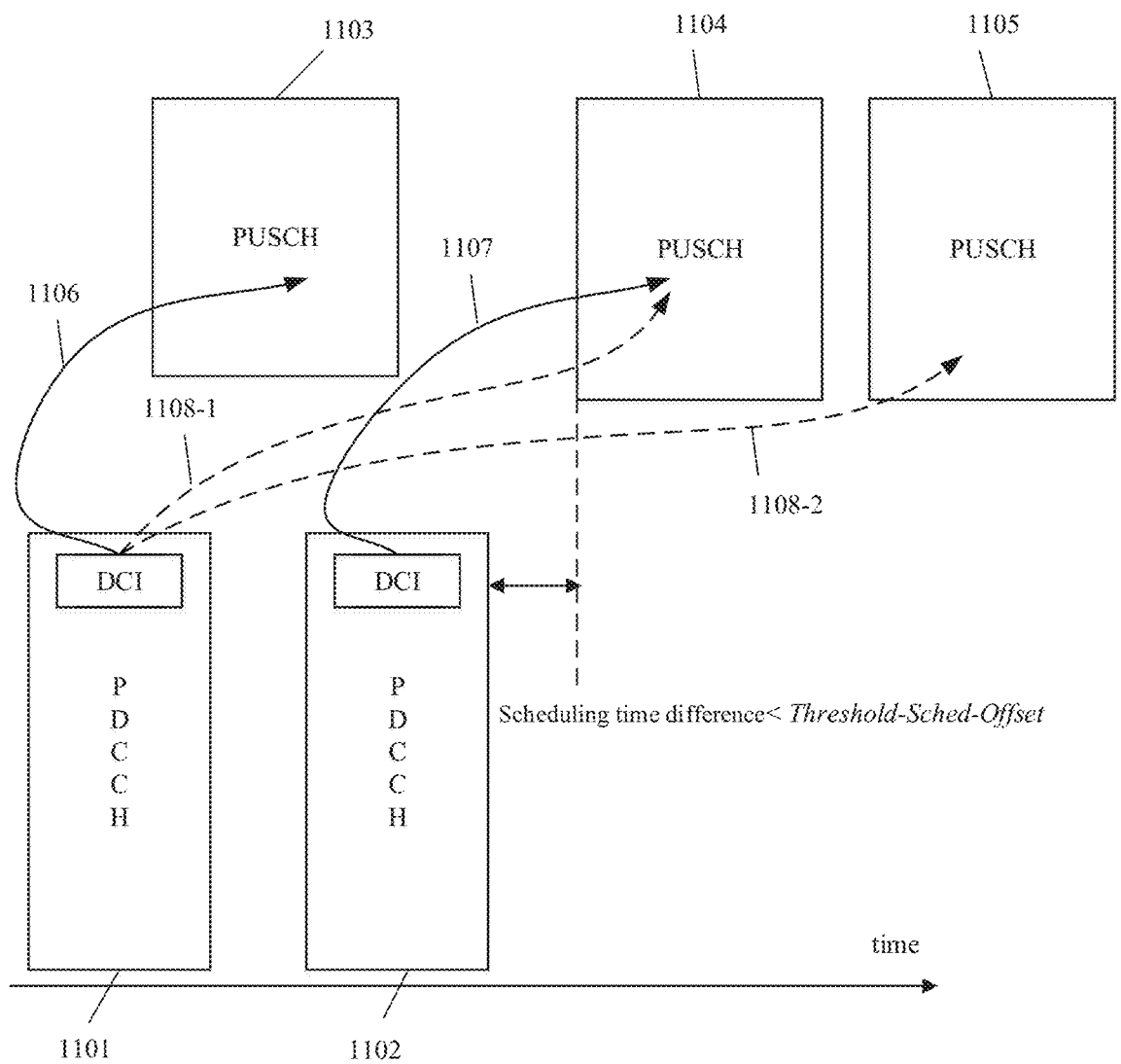
FIG. 11C illustrates a schematic diagram of a dynamic beam indication process for the PUSCH according to an embodiment of the present disclosure.

FIG. 11C illustrates a schematic diagram of a dynamic beam indication process for the PUSCH according to an embodiment of the present disclosure. The figure illustrates one or more control signaling transmissions 1101-1102 carried by the PDCCH, one or more of which may include a DCI for uplink scheduling. The figure also illustrates one or more data transmissions 1103-1105 carried by the PUSCH. The solid arrow 1106 illustrates that an activated transmit beam to be used for the PUSCH data transmission 1103 as scheduled by the DCI is indicated based on the DCI in the PDCCH control signaling transmission 1101. The solid arrow 1107 illustrates that an activated transmit beam to be used for the PUSCH data transmission 1104 as scheduled by the DCI is indicated based on the DCI in the PDCCH control signaling transmission 1102. The beam indications achieved by the solid arrows 1106 and 1107 are based on the first beam indication information of data channel in the DCI. According to an embodiment of the present disclosure, the DCI may further include the second beam indication information of data channel that indicates activated transmit beams for one or more subsequent transmissions. As illustrated by the dashed arrows 1108-1 and 1108-2, the DCI in the control signaling transmission 1101 carried by the PDCCH may further indicate activated transmit beams used for subsequent data transmissions 1104 and 1105 in the PUSCH. It should be noted that although it is illustrated here that the second beam indication information of data channel may indicate activated transmit beam used for two subsequent data transmissions of PUSCH, it will be clear to those skilled in the art that the quantity of indicated subsequent transmissions may be more or less.

Figure 12:
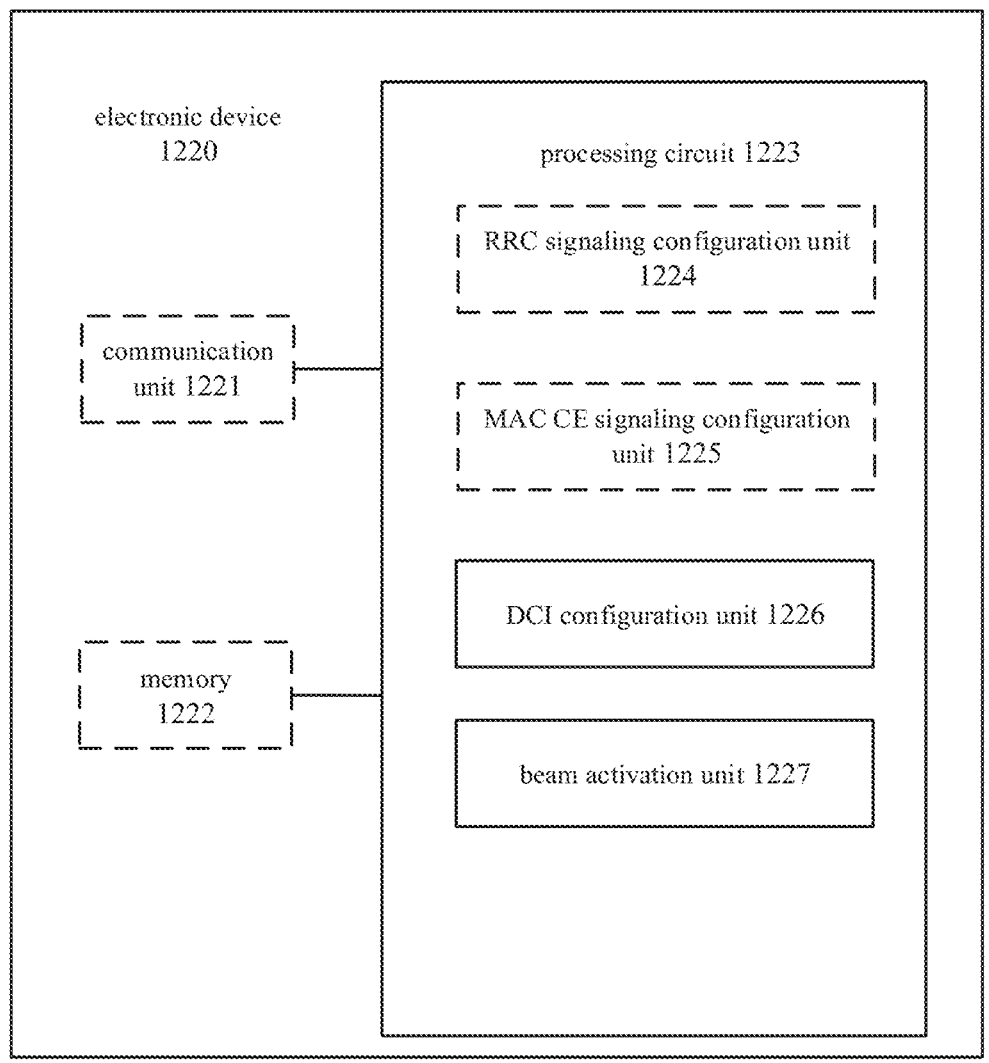
FIG. 12 illustrates a block diagram of a control-side electronic device that has a reduced latency of beam indication for a physical data channel according to an embodiment of the present disclosure.

8. a Control-Side Electronic Device that has a Reduced Latency of Beam Indication for a Physical Data Channel FIG. 12 illustrates a block diagram of a control-side electronic device that has a reduced latency of beam indication for a physical data channel according to an embodiment of the present disclosure. According to an embodiment of the present disclosure, the electronic device 1220 may reside in various control devices or transmitting apparatus. The control devices mentioned here are, for example, base stations such as eNBs or gNBs of 3GPP's 5G communication standard, remote radio heads, wireless access points, etc. The transmitting apparatus include, for example, large on-board transmitting apparatus or fixed transmitting apparatus (for example, Unmanned Aerial Vehicle management towers) and transmitters in satellite communication systems.

The communication unit 1221 may be used to receive radio signals transmitted by the user-side electronic device through one or more of the PUCCH or the PUSCH, and may also perform processing such as down-conversion and analog-digital conversion on the received radio signals, and may provide the information obtained from the radio signals to other parts of the electronic device 1220 (for example, the processing circuit 1223 or the memory 1222). The communication unit 1221 may also be used to transmit radio signals from the control-side electronic device 1220 to the user-side electronic device through the PDCCH or PDSCH, and may perform processing such as digital-to-analog conversion and up-conversion on the radio signals before transmitting. The information transmitted by the communication unit 1221 may come from other parts of the electronic device 1220 (for example, the processing circuit 1223 or the memory 1222). The radio signal received or transmitted by the communication unit 1221 may include control information or data (for example, a RRC signaling, a MAC CE signaling, a DCI or ACK/NACK, CQI, PMI, etc.). In an embodiment of the present disclosure, the communication unit 1221 may be implemented as a communication interface component like an antenna device, a radio frequency circuit, and a part of a baseband processing circuit etc., for example. The communication unit 1221 is drawn with a dashed line as it may also reside within the processing circuit 1223 or outside of the electronic device 1220.

The memory 1222 of the electronic device 1220 may store information generated by the processing circuit 1223, information received from other devices through the communication unit 1221, programs, machine codes, and data used for operations of the electronic device 1220, and the like. The memory 1222 is drawn with a dashed line as it may also reside within the processing circuit 1223 or outside of the electronic device 1220. The memory 1222 may be a volatile memory and/or a non-volatile memory. For example, the memory 1222 may include, but is not limited to, a random access memory (RAM), a dynamic random access memory (DRAM), a static random access memory (SRAM), a read only memory (ROM), and a flash memory.

The processing circuit 1223 may provide various functions of the electronic device 1220. According to an embodiment of the present disclosure, the processing circuit 1223 may be configured to send (for example, using the communication unit 1221) a downlink control information (DCI) to the user-side electronic device through the PDCCH, the DCI including: a first beam indication information of data channel, which is used to indicate to the user-side electronic device a first activated beam used for a transmission in the physical data channel that is scheduled by the DCI; a second beam indication information of data channel, which is used to indicate to the user-side electronic device one or more second activated beams to be used by one or more subsequent transmissions in the physical data channel. The processing circuit 1223 may further be configured to use the first activated beam to perform the transmission in the physical data channel with the user-side electronic device; and after using the first activated beam to perform the transmission in the physical data channel with the user-side electronic device, use the one or more second activated beams to perform the one or more subsequent transmissions in the physical data channel with the user-side electronic device.

According to an embodiment of the present disclosure, the processing circuit 1223 may include various units, e.g., a DCI configuration unit 1226 and a beam activation unit 1227, for implementing the functions described above. These processing units included in the processing circuit 1223 may be communicatively coupled to each other (not shown) and/or coupled to one or more of the communication unit 1221 or the memory 1222 (not shown). It should be noted that, although each unit is illustrated as a separate unit in FIG. 12, one or more of these units may be combined into one unit as well or split into multiple units.

According to an embodiment of the present disclosure, the DCI configuration unit 1226 may be configured to configure the DCI to be sent to the user-side electronic device so that the DCI includes the first beam indication information of data channel and the second beam indication information of data channel. The first beam indication information of data channel is used to indicate to the user-side electronic device a first activated beam used for a transmission in the physical data channel that is scheduled by the DCI, and the second beam indication information of data channel is used to indicate to the user-side electronic device one or more second activated beams to be used by one or more subsequent transmissions in the physical data channel.

The beam activation unit 1227 may be configured to determine the first activated beam to be used by the control-side electronic device 1220 based on the first beam indication information of data channel to perform the transmission in the physical data channel with the user-side electronic device. The beam activation unit 1227 may also be configured to determine one or more second activated beams to be used by the control-side electronic device 1220 based on the second beam indication information of data channel, and the one or more second activated beams may be used in the one or more subsequent transmissions after the first activated beam is used to perform the transmission in the physical data channel with the user-side electronic device.

According to an embodiment of the present disclosure, the processing circuit 1223 may also optionally include an RRC signaling configuration unit 1224 and/or a MAC CE signaling configuration unit 1225. They are illustrated in dashed lines in FIG. 12. According to an embodiment of the present disclosure, the RRC signaling configuration unit 1224 may configure an RRC signaling to be sent to the user-side electronic device so that the RRC signaling includes at least a beam configuration information. According to an embodiment of the present disclosure, the MAC CE signaling configuration unit 1225 may be used to configure a MAC CE signaling to be sent to the user-side electronic device so that the MAC CE signaling includes at least a beam activation information. The beam configuration information and beam activation information in the RRC signaling and the MAC CE signaling have been described in detail in Sections 7-1 and 7-2.

According to an embodiment of the present disclosure, the RRC signaling configuration unit 1224 may also be used to configure one or more extraction parameters in the RRC signaling. These extraction parameters may be used to indicate to the user-side electronic device how to extract the first and second beam indication information of data channel from the DCI. For example, the extraction parameters may include a parameter identifying whether the DCI includes the second beam indication information of data channel, and/or a parameter identifying the quantity of second activated beams that are indicated by the second beam indication information of data channel.

Next, description will be made for the physical downlink data channel (PDSCH) and the physical uplink data channel (PUSCH) respectively.

8-1. Beam Indication Process for the PDSCH

As already described in Section 7-1 about the user-side electronic device, the beam indication process for the PDSCH may be performed through the DCI used for downlink scheduling. The control-side electronic device 1220 may configure the DCI such that the DCI includes the first beam indication information of data channel to indicate to the user-side electronic device a first activated receive beam for a transmission in the PDSCH.

As already discussed in respect to FIG. 10B, the above approach may cause the user-side electronic device to not have enough time to prepare the indicated activated receive beam. Therefore, according to the embodiment of the present disclosure, a DCI configuration unit (for example, 1226) may make the DCI for downlink scheduling further include the second beam indication information of data channel, so as to indicate to the user-side electronic device in advance one or more second activated receive beams that may be used for subsequent transmissions. According to an embodiment of the present disclosure, the DCI may have the field structure described in respect to FIG. 10C. The beneficial effects of using the DCI for a dynamic beam indication process for the PDSCH have been discussed above in respect to FIG. 10D.

8-2. Beam Indication Process for the PUSCH

As already described in Section 7-2 about the user-side electronic device, the DCI for uplink scheduling may be used to perform the beam indication process for the PUSCH. The control-side electronic device 1220 may configure the DCI for uplink scheduling to make it include the first beam indication information of data channel, so as to indicate to the user-side electronic device a first activated transmit beam for a transmission in the PUSCH.

According to an embodiment of the present disclosure, a DCI configuration unit (for example, 1226) may make the DCI for uplink scheduling further include the second beam indication information of data channel, thereby indicating to the user-side electronic device in advance one or more second activated transmit beams that may be used for subsequent transmissions. According to an embodiment of the present disclosure, the DCI may have the field structure as described in respect to FIG. 11B.

9. A User-Side Communication Method that has a Reduced Latency of Beam Indication for a Physical Data Channel According to an Embodiment of the Present Disclosure.

Figure 13:
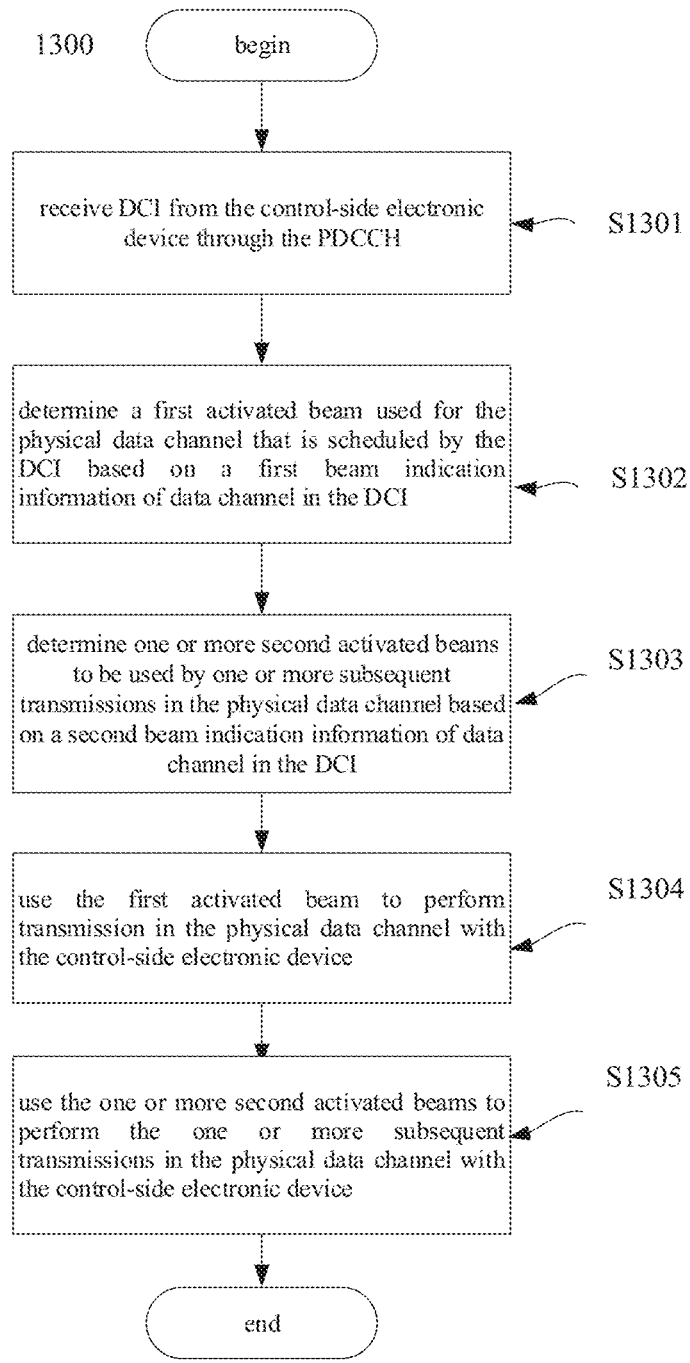
FIG. 13 illustrates a flowchart of a user-side communication method that has a reduced latency of beam indication for a physical data channel according to an embodiment of the present disclosure.

FIG. 13 illustrates a flowchart of a user-side communication method that has a reduced latency of beam indication for a physical data channel according to an embodiment of the present disclosure. The communication method 1300 may be executed by, for example, the electronic device 9010 as described in respect to FIG. 9.

As illustrated in FIG. 13, at step S1301, a DCI from the control-side electronic device may be received through the PDCCH.

At step S1302, a first activated beam used for the physical data channel that is scheduled by the DCI may be determined based on a first beam indication information of data channel in the DCI.

At step S1303, one or more second activated beams to be used by one or more subsequent transmissions in the physical data channel are determined based on a second beam indication information of data channel in the DCI.

At step S1304, the first activated beam is used to perform a transmission in the physical data channel with the control-side electronic device.

At step S1305, the one or more second activated beams are used to perform one or more subsequent transmissions in the physical data channel with the control-side electronic device.

Figure 14:
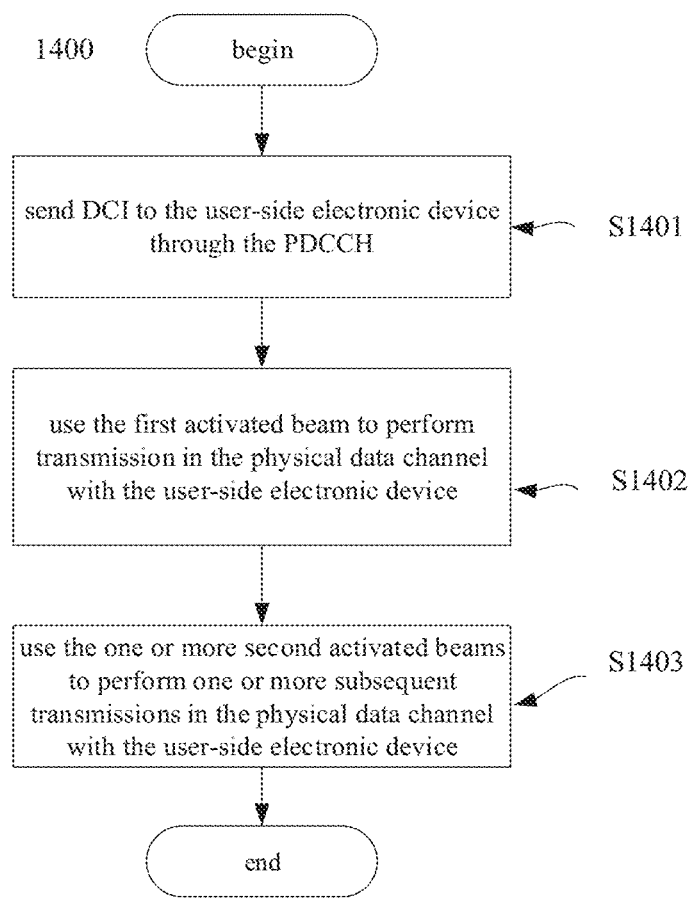
FIG. 14 illustrates a flowchart of a control-side communication method that has a reduced latency of beam indication for a physical data channel according to an embodiment of the present disclosure.

10. A Control-Side Communication Method that has a Reduced Latency of Beam Indication for a Physical Data Channel According to an Embodiment of the Present Disclosure FIG. 14 illustrates a flowchart of a control-side communication method that has a reduced latency of beam indication for a physical data channel according to an embodiment of the present disclosure. The communication method 1400 may be executed by, for example, the electronic device 1220 as described in respect to FIG. 12.

As illustrated in FIG. 14, at step S1401, a DCI may be sent to the user-side electronic device through the PDCCH, where the DCI includes a first beam indication information of data channel and a second beam indication information of data channel. The first beam indication information of data channel is used to indicate to the user-side electronic device a first activated beam used for a transmission in the physical data channel that is scheduled by the DCI, and the second beam indication information of data channel is used to indicate to the user-side electronic device one or more second activated beams to be used for one or more subsequent transmissions in the physical data channel.

At step S1402, the first activated beam is used to perform a transmission in the physical data channel with the user-side electronic device.

At step S1403, the one or more second activated beams are used to perform the one or more subsequent transmissions in the physical data channel with the user-side electronic device.

11. A Beam Indication Process that has a Reduced Latency of Beam Indication for a Physical Data Channel According to an Embodiment of the Present Disclosure FIG. 15 illustrates a signaling diagram 1500 of a beam indication process that has a reduced latency of beam indication for a physical data channel according to an embodiment of the present disclosure.

Figure 15:
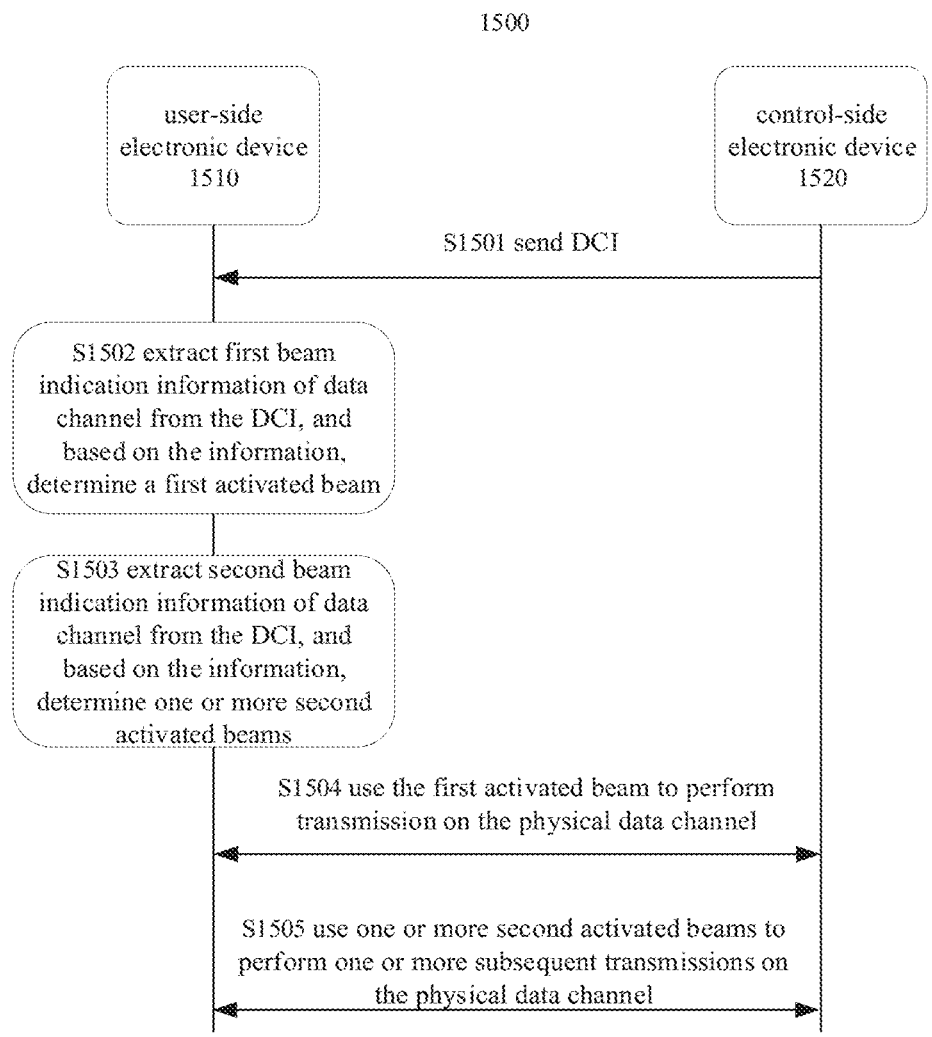
FIG. 15 illustrates a signaling diagram of a beam indication process that has a reduced latency of beam indication for a physical data channel according to an embodiment of the present disclosure.

As illustrated in FIG. 15, at step S1501, the control-side electronic device 1520 sends a DCI to the user-side electronic device 1510.

At step S1502, the user-side electronic device 1510 extracts a first beam indication information of data channel from the DCI, and based on the first beam indication information of data channel, determines a first activated beam used for the physical data channel that is scheduled by the DCI.

At step S1503, the user-side electronic device 1510 extracts a second beam indication information of data channel from the DCI, and based on the second beam indication information of data channel, determines one or more second activated beams to be used for one or more subsequent transmissions in the physical data channel.

At step S1504, the user-side electronic device 1510 uses the first activated beam, and the control-side electronic device 1520 uses a corresponding transmit/activated receive beam, to perform a transmission on the physical data channel.

At step S1505, the user-side electronic device 1510 uses the one or more second activated beams, and the control-side electronic device 1520 uses corresponding activated transmit/receive beams, to perform the one or more subsequent transmissions on the physical data channel.

12. Application Scenarios of the Present Disclosure

One or more embodiments of the present disclosure are used in a wide range of scenarios. For example, for the control-side electronic device indicating multiple transmit beams of PUSCH, it may be considered that the user-side electronic device is located in a high-speed and predictable mobile environment (like a high-speed rail scenario). Since the movement speed and position change of the user-side electronic device are predictable, the control-side electronic device may configure different uplink activated transmit beams for the user-side electronic device in advance to reduce the signaling overhead of multiple beam indications.

13. Application Examples According to the Present Disclosure

The technology of the present disclosure may be applied to various products.

For example, the user-side electronic device 210, 9010 may be implemented as a mobile terminal (such as a smart phone, a tablet personal computer (PC), a notebook PC, a portable game terminal, a portable/dongle type mobile router, and a digital camera) or an in-vehicle terminal (such as a car navigation device). The user-side electronic device may also be implemented as a terminal (also referred to as a machine type communication (MTC) terminal) that performs machine-to-machine (M2M) communication. In addition, the user-side electronic device may be a wireless communication module (such as an integrated circuit module including a single chip) mounted on each of the above terminals.

The control-side electronic devices 520, 1220 may be implemented as, for example, any type of base station, preferably, such as a macro gNB and a small gNB in the 3GPP's 5G communication standard New Radio (NR) access technology. The small gNB may be a gNB covering a cell smaller than a macro cell, such as a pico gNB, a micro gNB, and a home (femto) gNB. Alternatively, the control device may be implemented as any other type of base station, such as a NodeB and a base transceiver station (BTS). The control device may include: a main body (also referred to as a base station device) configured to control wireless communication, and one or more remote radio heads (RRH) disposed in a different place from the main body.

13-1. Application Examples on the Control-Side Electronic Device (First Application Example)

It should be understood that the term base station in the present disclosure has the full breadth of its ordinary meaning, and includes at least a wireless communication station that is used as a portion of a wireless communication system or a radio system to facilitate communication. Examples of the base station may be, for example, but not limited to the following: the base station may be either or both of a base transceiver station (BTS) and a base station controller (BSC) in a GSM system, and may be a either or both of a radio network controller (RNC) and NodeB in WCDMA systems, may be eNBs in LTE and LTE-Advanced systems, or may be corresponding network nodes in future communication systems (for example, a gNB that may appear in 5G communication systems, etc.). In D2D, M2M, and V2V communication scenarios, a logical entity that has a control function for communication may also be called a base station. In a cognitive radio communication scenario, a logical entity that plays a role of spectrum coordination may also be called a base station.

Figure 16:
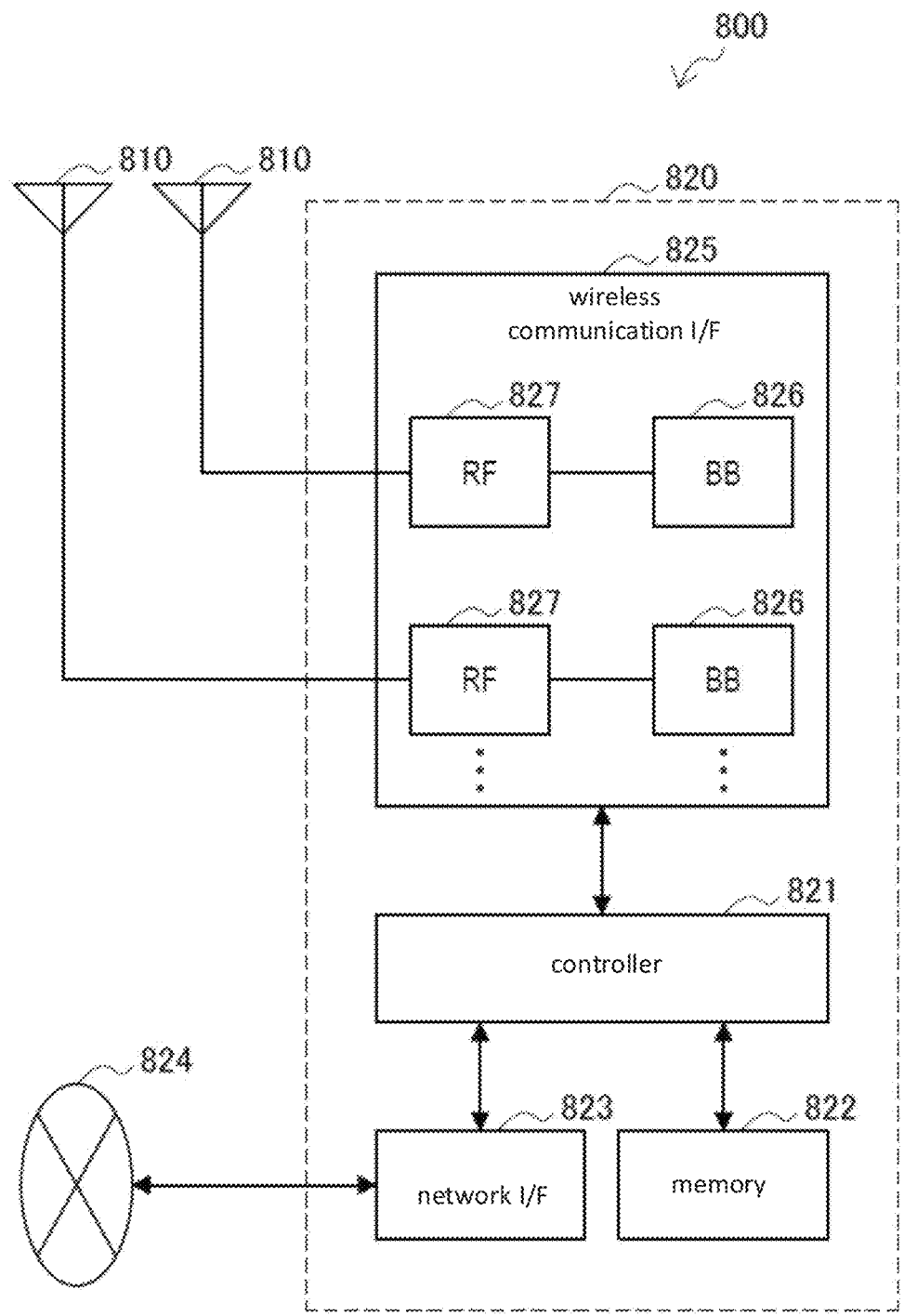
FIG. 16 is a block diagram of a first example of a schematic configuration of an electronic device on control device-side according to an embodiment of the present disclosure.

FIG. 16 is a block diagram showing a first example of a schematic configuration of a control device-side electronic device to which the technology of the present disclosure may be applied. The control-side electronic device may be the electronic device 520 according to an embodiment of the present disclosure, or may be the electronic device 1220 according to an embodiment of the present disclosure. Wherein, the electronic device 520 or the electronic device 1220 is illustrated as gNB 800. Wherein, the gNB 800 includes multiple antennas 810 and base station device 820. The base station device 820 and each antenna 810 may be connected to each other via an RF cable.

Each of the antennas 810 includes multiple antenna elements (such as multiple antenna elements included in a multiple input multiple output (MIMO) antenna), and is used for the base station device 820 to send and receive wireless signals. As illustrated in FIG. 16, the gNB 800 may include multiple antennas 810. For example, the multiple antennas 810 may be compatible with multiple frequency bands used by the gNB 800. FIG. 16 illustrates an exemplary in which the gNB 800 includes multiple antennas 810 that may be used to implement the multi-carrier system described in the embodiment of the present disclosure.

The base station device 820 includes a controller 821, a memory 822, a network interface 823, and a wireless communication interface 825.

The controller 821 may be, for example, a CPU or a DSP, and operates various functions of higher layers of the base station device 820. For example, the controller 821 may include the above processing circuit 523 or 1223. For example, the controller 821 generates a data packet from data in signals processed by the wireless communication interface 825, and transfers the generated packet via the network interface 823. The controller 821 may bundle data from a plurality of baseband processors to generate a bundled packet, and transfer the generated bundled packet. The controller 821 may have logic functions to perform control such as radio resource control, radio bearer control, mobility management, admission control, and scheduling. This control may be performed in conjunction with nearby gNBs or core network nodes. The memory 822 includes RAM and ROM, and stores programs executed by the controller 821 and various types of control data (such as a terminal list, transmission power data, and scheduling data).

The network interface 823 is a communication interface for connecting the base station device 820 to the core network 824. The controller 821 may communicate with a core network node or another gNB via the network interface 823. In this case, the gNB 800 and the core network node or other gNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than the frequency band used by the wireless communication interface 825.

The wireless communication interface 825 supports any cellular communication scheme (such as Long Term Evolution (LTE) and LTE-Advanced), and provides wireless connection to a terminal located in a cell of the gNB 800 via the antenna 810. The wireless communication interface 825 may generally include, for example, a baseband (BB) processor 826 and an RF circuit 827. The BB processor 826 may perform, for example, encoding/decoding, modulating/demodulating, and multiplexing/demultiplexing, and perform various types of signal processing of layers (for example, L1, Medium Access Control (MAC), Radio Link Control (RLC), and Packet Data Convergence Protocol (PDCP)). The BB processor 826 may have a part or all of the above described logical functions instead of the controller 821. The BB processor 826 may be a memory storing a communication control program, or a module including a processor and related circuits configured to execute the program. Updating the program may change functions of the BB processor 826. The module may be a card or a blade inserted into a slot of the base station device 820. Alternatively, the module may also be a chip mounted on a card or blade. Meanwhile, the RF circuit 827 may include, for example, a mixer, a filter, and an amplifier, and transmit and receive wireless signals via the antenna 810.

As illustrated in FIG. 16, the wireless communication interface 825 may include multiple BB processors 826. For example, multiple BB processors 826 may be compatible with multiple frequency bands used by gNB 800. As illustrated in FIG. 16, the wireless communication interface 825 may include multiple RF circuits 827. For example, the multiple RF circuits 827 may be compatible with multiple antenna elements. Although FIG. 16 illustrates an exemplary in which the wireless communication interface 825 includes multiple BB processors 826 and multiple RF circuits 827, the wireless communication interface 825 may also include a single BB processor 826 or a single RF circuit 827.

In the gNB 800 illustrated in FIG. 16, one or more components included in the processing circuit 523 described with reference to FIG. 5 or the processing circuit 1223 described with reference to FIG. 12 may be implemented in the wireless communication interface 825. Alternatively, at least a part of these components may be implemented in the controller 821. For example, the gNB 800 includes a portion (for example, the BB processor 826) or the whole of the wireless communication interface 825, and/or a module including the controller 821, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 800, and the wireless communication interface 825 (for example, the BB processor 826) and/or the controller 821 may execute the program. As above, as an apparatus including one or more components, a gNB 800, a base station device 820, or a module may be provided, and a program for allowing the processor to function as one or more components may be provided. In addition, a readable medium in which the program is recorded may be provided.

In addition, in the gNB 800 illustrated in FIG. 16, the communication unit 521 described with reference to FIG. 5 or the communication unit 1221 described with reference to FIG. 12 may be implemented in the wireless communication interface 825 (for example, the RF circuit 827). In addition, the communication unit 521 or the communication unit 1221 may be implemented in the controller 821 and/or the network interface 823.

(Second Application Example)

Figure 17:
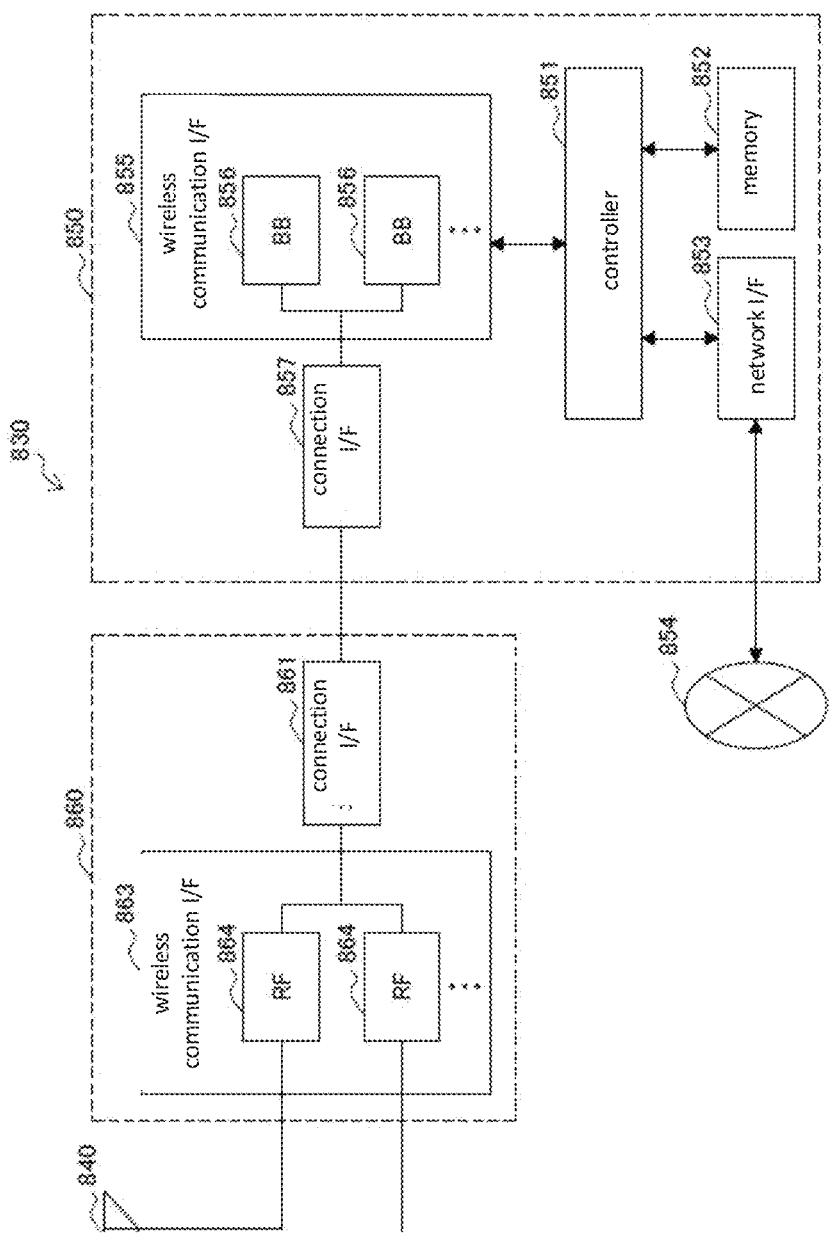
FIG. 17 is a block diagram of a second example of the schematic configuration of an electronic device on control device-side according to an embodiment of the present disclosure.

FIG. 17 is a block diagram showing a second example of a schematic configuration of a control device-side electronic device to which the technology of the present disclosure may be applied. The control-side electronic device may be the electronic device 520 according to an embodiment of the present disclosure, or may be the electronic device 1220 according to an embodiment of the present disclosure. The control device may include, for example, the electronic device 520 or the electronic device 1220 for downlink transmission. Wherein, the electronic device 520 or 1220 is illustrated as gNB 830. The gNB 830 includes one or more antennas 840, a base station device 850 and a RRH 860. The RRH 860 and each antenna 840 may be connected to each other via an RF cable. The base station device 850 and the RRH 860 may be connected to each other via a high-speed line such as an optical fiber cable.

Each of the antennas 840 includes a single or multiple antenna elements (such as multiple antenna elements included in a MIMO antenna) and is used for the RRH 860 to send and receive wireless signals. As illustrated in FIG. 17, the gNB 830 may include multiple antennas 840. For example, the multiple antennas 840 may be compatible with multiple frequency bands used by the gNB 830. FIG. 17 illustrates an exemplary in which the gNB 830 includes multiple antennas 840 that may be used to implement the multi-carrier system of the embodiments of the present disclosure.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 16.

The wireless communication interface 855 supports any cellular communication scheme (such as LTE and LTE-Advanced), and provides wireless communication to a terminal located in a sector corresponding to the RRH 860 via the RRH 860 and the antenna 840. The wireless communication interface 855 may generally include, for example, a BB processor 856. The BB processor 856 is the same as the BB processor 826 described with reference to FIG. 16 except that the BB processor 856 is connected to the RF circuit 864 of the RRH 860 via the connection interface 857. As illustrated in FIG. 17, the wireless communication interface 855 may include multiple BB processors 856. For example, the multiple BB processors 856 may be compatible with multiple frequency bands used by gNB 830. Although FIG. 17 illustrates an exemplary in which the wireless communication interface 855 includes multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high-speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high-speed line.

The wireless communication interface 863 transmits and receives wireless signals via the antenna 840. The wireless communication interface 863 may generally include, for example, an RF circuit 864. The RF circuit 864 may include, for example, a mixer, a filter, and an amplifier, and transmit and receive wireless signals via the antenna 840. As illustrated in FIG. 17, the wireless communication interface 863 may include multiple RF circuits 864. For example, the multiple RF circuits 864 may support multiple antenna elements. Although FIG. 17 illustrates an exemplary in which the wireless communication interface 863 includes multiple RF circuits 864, the wireless communication interface 863 may also include a single RF circuit 864.

In the gNB 830 illustrated in FIG. 17, one or more components included in the processing circuit 523 described with reference to FIG. 5 or the processing circuit 1223 described with reference to FIG. 12 may be implemented in the wireless communication interface 855. Alternatively, at least a part of these components may be implemented in the controller 851. For example, the gNB 830 includes a portion (for example, the BB processor 856) or the whole of the wireless communication interface 855, and/or a module including the controller 851, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 830, and the wireless communication interface 855 (for example, the BB processor 856) and/or the controller 851 may execute the program. As above, as an apparatus including one or more components, a gNB 830, a base station device 850, or a module may be provided, and a program for allowing the processor to function as one or more components may be provided. In addition, a readable medium in which the program is recorded may be provided.

In addition, in the gNB 830 illustrated in FIG. 17, the communication unit 521 described with reference to FIG. 5 or the communication unit 1221 described with reference to FIG. 12 may be implemented in the wireless communication interface 855 (for example, the BB circuit 856). In addition, the communication unit 521 or the communication unit 1221 may be implemented in the controller 851 and/or the network interface 853.

13-2. Application Examples on the User-Side Electronic Device (First Application Example)

Figure 18:
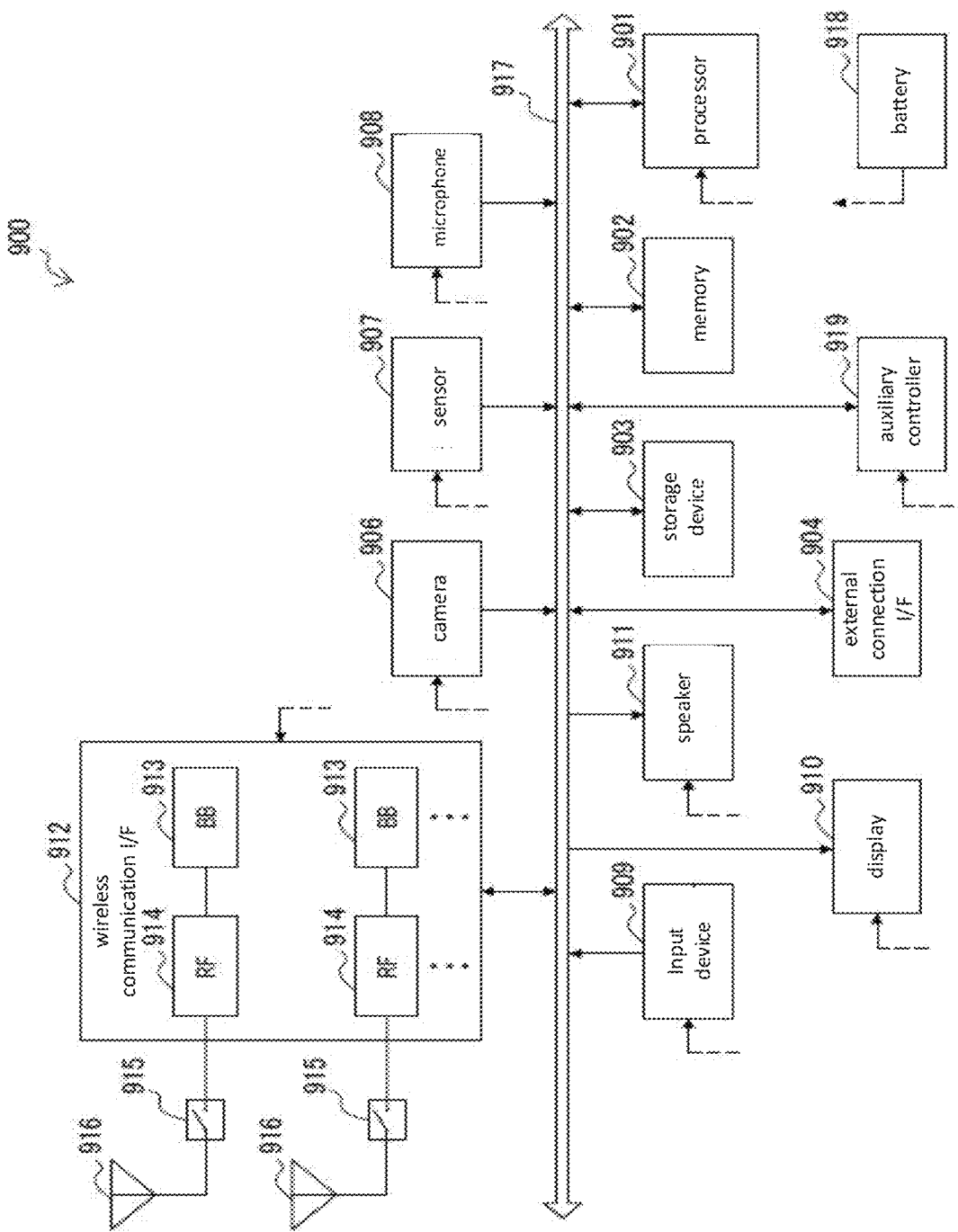
FIG. 18 is a block diagram of an exemplary of a schematic configuration of a smart phone according to an embodiment of the present disclosure.

FIG. 18 is a block diagram showing an exemplary of a schematic configuration of a smart phone 900 to which the technology of the present disclosure may be applied. The smart phone 900 may be an electronic device 210 according to an embodiment of the present disclosure, or may be an electronic device 9010 according to an embodiment of the present disclosure. The smart phone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switch 915, one or more antennas 916, a bus 917, a battery 918, and an auxiliary controller 919.

The processor 901 may be, for example, a CPU or a system on a chip (SoC), and controls functions of an application layer and other layers of the smart phone 900. The memory 902 includes RAM and ROM, and stores data and programs executed by the processor 901. The storage 903 may include a storage medium such as a semiconductor memory and a hard disk. The external connection interface 904 is an interface for connecting an external device such as a memory card and a universal serial bus (USB) device to the smart phone 900.

The camera 906 includes an image sensor such as a charge coupled device (CCD) and a complementary metal oxide semiconductor (CMOS), and generates a captured image. The sensor 907 may include a group of sensors, such as a measurement sensor, an f-gyro sensor, a geomagnetic sensor, and an acceleration sensor. The microphone 908 converts sounds that are input to the smart phone 900 into audio signals. The input device 909 includes, for example, a touch sensor configured to detect touch on the screen of the display device 910, a keypad, a keyboard, a button, or a switch, and receives an operation or information input from a user. The display device 910 includes a screen such as a liquid crystal display (LCD) and an organic light emitting diode (OLED) display, and displays an output image of the smart phone 900. The speaker 911 converts audio signals that are output from the smart phone 900 into sounds.

The wireless communication interface 912 supports any cellular communication scheme (such as LTE and LTE-Advanced) and performs wireless communication. The wireless communication interface 912 may generally include, for example, a BB processor 913 and an RF circuit 914. The BB processor 913 may perform, for example, encoding/decoding, modulating/demodulating, and multiplexing/demultiplexing, and perform various types of signal processing for wireless communication. Meanwhile, the RF circuit 914 may include, for example, a mixer, a filter, and an amplifier, and transmit and receive wireless signals via the antenna 916. The wireless communication interface 912 may be one chip module on which the BB processor 913 and the RF circuit 914 are integrated. As illustrated in FIG. 18, the wireless communication interface 912 may include multiple BB processors 913 and multiple RF circuits 914. Although FIG. 18 illustrates an exemplary in which the wireless communication interface 912 includes multiple BB processors 913 and multiple RF circuits 914, the wireless communication interface 912 may also include a single BB processor 913 or a single RF circuit 914.

Furthermore, in addition to the cellular communication scheme, the wireless communication interface 912 may support another type of wireless communication scheme, such as a short-range wireless communication scheme, a near field communication scheme, and a wireless local area network (LAN) scheme. In this case, the wireless communication interface 912 may include a BB processor 913 and an RF circuit 914 for each wireless communication scheme.

Each of the antenna switches 915 switches connection destinations of the antenna 916 among a plurality of circuits (for example, circuits for different wireless communication schemes) included in the wireless communication interface 912.

Each of the antennas 916 includes a single or multiple antenna elements (such as multiple antenna array elements included in a MIMO antenna), and is used for the wireless communication interface 912 to transmit and receive wireless signals. As illustrated in FIG. 18, the smart phone 900 may include multiple antennas 916. Although FIG. 18 illustrates an exemplary in which the smart phone 900 includes multiple antennas 916, the smart phone 900 may also include a single antenna 916.

In addition, the smart phone 900 may include an antenna 916 for each wireless communication scheme. In this case, the antenna switch 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smart phone 900 illustrated in FIG. 18 via a feeder line, which is partially illustrated as a dashed line in the figure. The auxiliary controller 919 operates the minimum necessary functions of the smart phone 900 in a sleep mode, for example.

In the smart phone 900 illustrated in FIG. 18, one or more components included in the processing circuits 213 and 9013 described with reference to FIG. 2 or FIG. 9 may be implemented in the wireless communication interface 912. Alternatively, at least a part of these components may be implemented in the processor 901 or the auxiliary controller 919. As one example, the smart phone 900 includes a portion (for example, the BB processor 913) or the whole of the wireless communication interface 912, and/or a module including the processor 901 and/or the auxiliary controller 919, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the smart phone 900, and the wireless communication interface 912 (for example, the BB processor 913), the processor 901, and/or the auxiliary controller 919 may execute the program. As above, as an apparatus including one or more components, a smart phone 900 or a module may be provided, and a program for allowing the processor to function as one or more components may be provided. In addition, a readable medium in which the program is recorded may be provided.

In addition, in the smart phone 900 illustrated in FIG. 18, for example, the communication unit 211 or 9011 described with reference to FIG. 2 or FIG. 13 may be implemented in the wireless communication interface 912 (for example, the RF circuit 914).

(Second Application Example)

Figure 19:
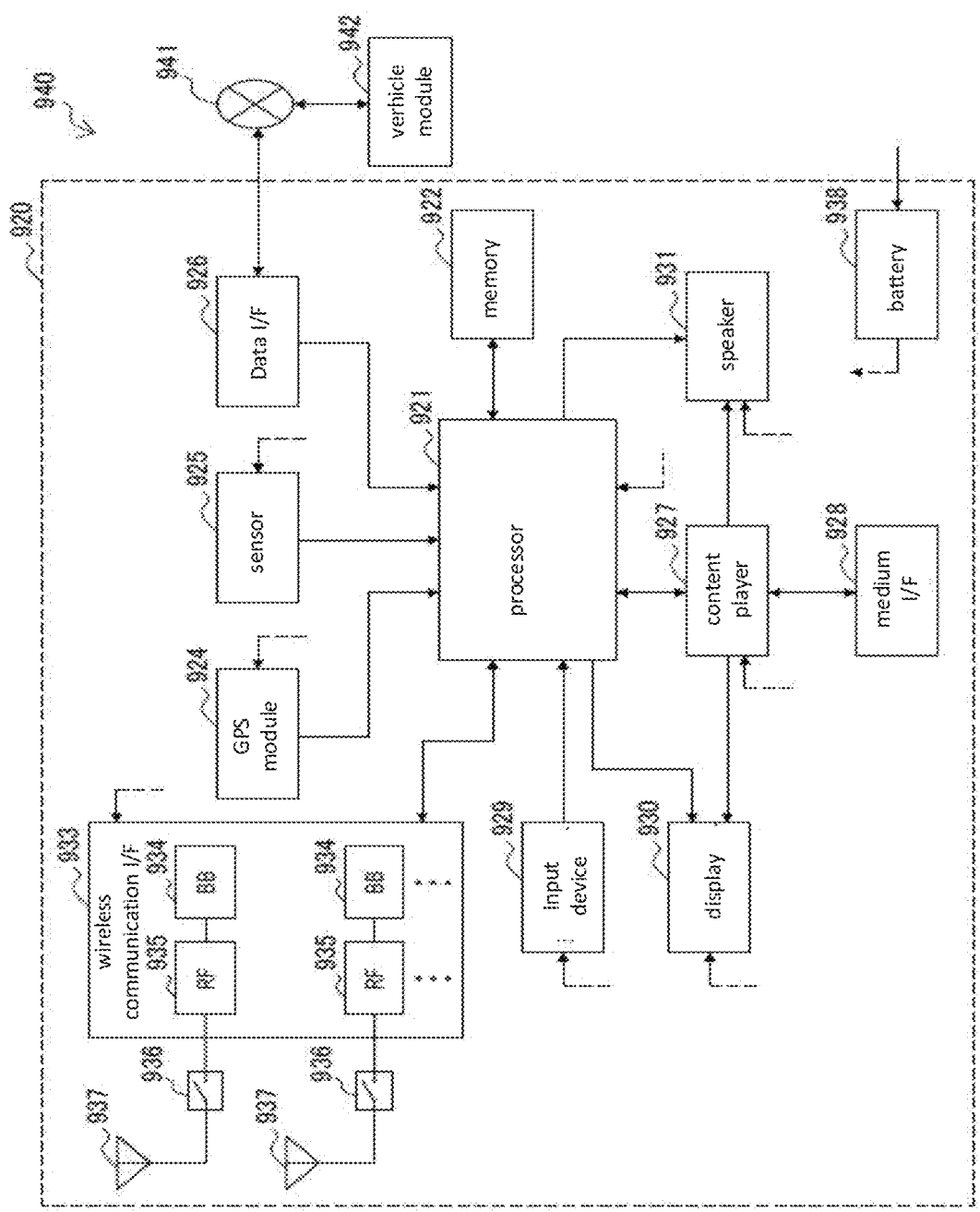
FIG. 19 is a block diagram of an exemplary of a schematic configuration of a car navigation device according to an embodiment of the present disclosure.

FIG. 19 is a block diagram showing an exemplary of a schematic configuration of a car navigation device 920 to which the technology of the present disclosure may be applied. The car navigation device 920 may be user-side electronic devices 210, 9010 according to an embodiment of the present disclosure. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls the navigation function and other functions of the car navigation device 920. The memory 922 includes RAM and ROM, and stores data and programs executed by the processor 921.

The GPS module 924 uses GPS signals received from GPS satellites to measure the position (such as latitude, longitude, and altitude) of the car navigation device 920. The sensor 925 may include a group of sensors, such as a gyro sensor, a geomagnetic sensor, and a barometric sensor. The data interface 926 is connected to, for example, an in-vehicle network 941 via a terminal that is not shown, and acquires data (such as vehicle speed data) generated by the vehicle.

The content player 927 reproduces content stored in a storage medium (such as CD and DVD) that is inserted into the storage medium interface 928. The input device 929 includes, for example, a touch sensor configured to detect touch on the screen of the display device 930, a button, or a switch, and receives an operation or information input from a user. The display device 930 includes a screen such as an LCD or an OLED display, and displays images of navigation functions or reproduced content. The speaker 931 outputs sounds of the navigation functions or the reproduced content.

The wireless communication interface 933 supports any cellular communication scheme (such as LTE and LTE- Advanced) and performs wireless communication. The wireless communication interface 933 may generally include, for example, a BB processor 934 and an RF circuit 935. The BB processor 934 may perform, for example, encoding/decoding, modulating/demodulating, and multiplexing/demultiplexing, and perform various types of signal processing for wireless communication. Meanwhile, the RF circuit 935 may include, for example, a mixer, a filter, and an amplifier, and transmit and receive wireless signals via the antenna 937. The wireless communication interface 933 may also be one chip module on which the BB processor 934 and the RF circuit 935 are integrated. As illustrated in FIG. 19, the wireless communication interface 933 may include multiple BB processors 934 and multiple RF circuits 935. Although FIG. 19 illustrates an exemplary in which the wireless communication interface 933 includes multiple BB processors 934 and multiple RF circuits 935, the wireless communication interface 933 may also include a single BB processor 934 or a single RF circuit 935.

Also, in addition to the cellular communication scheme, the wireless communication interface 933 may support another type of wireless communication scheme, such as a short-range wireless communication scheme, a near field communication scheme, and a wireless LAN scheme. In this case, the wireless communication interface 933 may include a BB processor 934 and an RF circuit 935 for each wireless communication scheme.

Each of the antenna switches 936 switches connection destinations of the antenna 937 among a plurality of circuits (such as circuits for different wireless communication schemes) included in the wireless communication interface 933.

Each of the antennas 937 includes a single or multiple antenna elements (such as multiple antenna array elements included in a MIMO antenna), and is used for the wireless communication interface 933 to transmit and receive wireless signals. As illustrated in FIG. 19, the car navigation device 920 may include multiple antennas 937. Although FIG. 19 illustrates an exemplary in which the car navigation device 920 includes multiple antennas 937, the car navigation device 920 may also include a single antenna 937.

In addition, the car navigation device 920 may include an antenna 937 for each wireless communication scheme. In this case, the antenna switch 936 may be omitted from the configuration of the car navigation device 920.

The battery 938 supplies power to each block of the car navigation device 920 illustrated in FIG. 19 via a feeder line that is partially illustrated as a dashed line in the figure. The battery 938 accumulates electric power supplied from the vehicle.

In the car navigation device 920 illustrated in FIG. 19, one or more components included in the processing circuits 213 and 9013 described with reference to FIGS. 2 and 9 may be implemented in the wireless communication interface 933. Alternatively, at least a part of these components may be implemented in the processor 921. As one example, the car navigation device 920 includes a portion (for example, the BB processor 934) or the whole of the wireless communication interface 933, and/or a module including the processor 921, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the car navigation device 920, and the wireless communication interface 933 (for example, the BB processor 934) and/or the processor 921 may execute the program. As above, as an apparatus including one or more components, a car navigation device 920 or a module may be provided, and a program for allowing the processor to function as one or more components may be provided. In addition, a readable medium in which the program is recorded may be provided.

In addition, in the car navigation device 920 illustrated in FIG. 19, for example, the communication units 211, 9011 described with reference to FIGS. 2 and 9 may be implemented in the wireless communication interface 933 (for example, the RF circuit 935).

The technology of the present disclosure may also be implemented as an in-vehicle system (or vehicle) 940 including one or more blocks in the car navigation device 920, the in-vehicle network 941, and the vehicle module 942. The vehicle module 942 generates vehicle data (such as vehicle speed, engine speed, and failure information), and outputs the generated data to the in-vehicle network 941.

In addition, a readable medium in which the program is recorded may be provided. Therefore, the present disclosure also relates to a computer-readable storage medium on which there is stored a program including instructions, which are used to implement the aforementioned communication method when loaded and executed by a processor such as a processing circuit or a controller.

The present disclosure also discloses the following solutions:

Solution 1. An electronic device comprising: a processing circuit configured to: receive an RRC signaling and/or a MAC CE signaling from a control-side electronic device; determine, based on a first beam indication information of control channel in the RRC signaling and/or the MAC CE signaling, an activated beam for performing a transmission in the physical control channel with the control-side electronic device; rewrite the activated beam based on a second beam indication information of control channel included in a downlink control information (DCI) carried by a physical downlink control channel (PDCCH); and use the rewritten activated beam to perform the transmission in the physical control channel with the control-side electronic device.

Solution 2. The electronic device according to solution 1, wherein: the physical control channel is a physical downlink control channel; and the DCI is a DCI used for downlink scheduling.

Solution 3. The electronic device according to solution 2, wherein: the second beam indication information of control channel includes information related to only one activated beam, and the one activated beam corresponds to a current CORESET used by the PDCCH.

Solution 4. The electronic device according to solution 2, wherein: the second beam indication information of control channel includes information related to a plurality of activated beams, and the plurality of activated beams correspond to one or more CORESETs of a plurality of CORESETs the electronic device is capable of using; and the second beam indication information of control channel further includes one or more CORESET identifiers corresponding to the one or more CORESETs.

Solution 5. The electronic device according to solution 1, wherein: the physical control channel is a physical uplink control channel (PUCCH); and the DCI is a DCI used for uplink scheduling.

Solution 6. The electronic device according to solution 5, wherein: the second beam indication information of control channel includes information related to at least one activated beam, and the at least one activated beam corresponds to at least one PUCCH resource that the electronic device is capable of using; and the second beam indication information of control channel further includes at least one PUCCH resource identifier corresponding to the at least one PUCCH resource.

Solution 7. The electronic device according to any of solutions 1-6, wherein: the processing circuit is further configured to: extract, based on extraction parameters in the RRC signaling, the second beam indication information of control channel from the DCI.

Solution 8. The electronic device according to solution 7, wherein: the extraction parameters include one or more of the following: a parameter identifying whether the DCI includes the second beam indication information of control channel; and a parameter identifying the quantity of activated beams associated with the second beam indication information of control channel.

Solution 9. The electronic device according to solution 1, wherein: the processing circuit is further configured to: when the second beam indication information of control channel is correctly extracted, rewrite the activated beam; and when the second beam indication information of control channel is not correctly extracted, not rewrite the activated beam.

Solution 10. The electronic device according to solution 9, wherein: the processing circuit is further configured to: send feedback information to the control-side electronic device to indicate whether the second beam indication information of control channel is correctly extracted.

Solution 11. The electronic device according to solution 10, wherein: the feedback information is sent through a HARQ mechanism used for the PDCCH or used for a physical downlink shared channel (PDSCH).

Solution 12. The electronic device according to solution 1, wherein: the processing circuit is further configured to: when receiving a new RRC signaling and/or a new MAC CE signaling from the control-side electronic device, rewrite the activated beam based on the first beam indication information of control channel in the new RRC signaling and/or the new MAC CE signaling.

Solution 13. An electronic device, comprising: a processing circuit configured to: send an RRC signaling and/or MAC CE signaling to a user-side electronic device, the RRC signaling and/or the MAC CE signaling including a first beam indication information of control channel, wherein the first beam indication information of control channel indicates to the user-side electronic device an activated beam for a transmission in the physical control channel; send a downlink control information (DCI) to the user-side electronic device through a physical downlink control channel (PDCCH), the DCI including a second beam indication information of control channel, and the second beam indication information of control channel indicates to the user-side electronic device an activated beam for the transmission in the physical control channel; and use the activated beam indicated by the second beam indication information of control channel to perform the transmission in the physical control channel with the user-side electronic device.

Solution 14. The electronic device according to solution 13, wherein: the physical control channel is a physical downlink control channel; and the DCI is a DCI used for downlink scheduling.

Solution 15. The electronic device according to solution 13, wherein: the physical control channel is a physical uplink control channel (PUCCH); and the DCI is a DCI used for uplink scheduling.

Solution 16. The electronic device according to any of solutions 13-15, wherein: the RRC signaling further includes extraction parameters, the extraction parameters indicating the user-side electronic device to extract the second beam indication information of control channel from the DCI, and the extraction parameters include one or more of the following: a parameter identifying whether the DCI includes the second beam indication information of control channel; and a parameter identifying the quantity of activated beams associated with the second control channel beam indication.

Solution 17. The electronic device according to any of solutions 13-15, wherein: the circuit is further configured to: receive feedback information from the user-side electronic device and determine whether to use the activated beam indicated by the second beam indication information of control channel based on the feedback information.

Solution 18. The electronic device according to solution 17, wherein: the feedback information is one of the following: a HARQ-ACK/HARQ-NACK used for a physical downlink control channel (PDCCH); or a HARQ-ACK/HARQ-NACK used for a physical downlink shared channel (PDSCH).

Solution 19. An electronic device, comprising: a processing circuit configured to: receive, through a physical downlink control channel (PDCCH), a downlink control information (DCI) from a control-side electronic device; determine, based on a first beam indication information of data channel in the DCI, a first activated beam for a physical data channel that is scheduled by the DCI; determine, based on a second beam indication information of data channel in the DCI, one or more second activated beams to be used by one or more subsequent transmissions in the physical data channel; use the first activated beam to perform a transmission in the physical data channel with the control-side electronic device; after using the first activated beam to perform the transmission in the physical data channel with the control-side electronic device, use the one or more second activated beams to perform the one or more subsequent transmissions in the physical data channel with the control-side electronic device.

Solution 20. The electronic device according to solution 19, wherein: the physical data channel is a physical downlink shared channel (PDSCH); and the DCI is a DCI used for downlink scheduling.

Solution 21. The electronic device according to solution 19, wherein: the physical data channel is a physical uplink shared channel (PUSCH); and the DCI is a DCI used for uplink scheduling.

Solution 22. The electronic device according to any of solutions 19-21, wherein: the processing circuit is further configured to: before receiving the DCI, receive an RRC signaling and/or a MAC CE signaling from the control-side electronic device, where at least one of the RRC signaling and the MAC CE signaling includes a configuration information related to data channel beam indication.

Solution 23. The electronic device according to solution 22, wherein: the configuration information includes at least extraction parameters used to extract the second beam indication information of data channel from the DCI, and the extraction parameters include one or more of the following: a parameter identifying whether the DCI includes the second beam indication information of data channel; and a parameter identifying the quantity of second beams indicated by the second beam indication information of data channel.

Solution 24. An electronic device, comprising: a processing circuit configured to: send, through a physical downlink control channel (PDCCH), a downlink control information (DCI) to a user-side electronic device, the DCI including: a first beam indication information of data channel to indicate to the user-side electronic device a first activated beam for a transmission in the physical data channel that is scheduled by the DCI; and a second beam indication information of data channel to indicate to the user-side electronic device one or more second activated beams to be used by one or more subsequent transmissions in the physical data channel; use the first activated beam to perform the transmission in the physical data channel with the user-side electronic device; and after using the first activated beam to perform the transmission in the physical data channel with the user-side electronic device, use the one or more second activated beams to perform the one or more subsequent transmissions in the physical data channel with the user-side electronic device.

Solution 25. The electronic device according to solution 24, wherein: the physical data channel is a physical downlink shared channel (PDSCH); and the DCI is a DCI used for downlink scheduling.

Solution 26. The electronic device according to solution 24, wherein: the physical data channel is a physical uplink shared channel (PUSCH); and the DCI is a DCI used for uplink scheduling.

Solution 27. The electronic device according to any of solutions 24-26, wherein: the processing circuit is further configured to: before sending the DCI, send an RRC signaling and/or a MAC CE signaling to the user-side electronic device, wherein at least one of the RRC signaling and the MAC CE signaling includes a configuration information related to data channel beam indication.

Solution 28. The electronic device according to solution 27, wherein: the configuration information includes at least extraction parameters, the extraction parameters indicating to extract the second beam indication information of data channel from the DCI, and the extraction parameters include one or more of the following: a parameter identifying whether the DCI includes the second beam indication information of data channel; and a parameter identifying the quantity of second beams indicated by the second beam indication information of data channel.

Solution 29. A communication method, comprising: receiving an RRC signaling and/or a MAC CE signaling from a control-side electronic device; determining, based on a first beam indication information of control channel in the RRC signaling and/or the MAC CE signaling, an activated beam for performing a transmission in the physical control channel with the control-side electronic device; rewriting the activated beam based on a second beam indication information of control channel included in a downlink control information (DCI) carried by a physical downlink control channel (PDCCH); and using the rewritten activated beam to perform the transmission in the physical control channel with the control-side electronic device.

Solution 30. A communication method, comprising: sending an RRC signaling and/or a MAC CE signaling to a user-side electronic device, the RRC signaling and/or the MAC CE signaling including a first beam indication information of control channel, wherein the first beam indication information of control channel indicates to the user-side electronic device an activated beam for a transmission in the physical control channel; sending, through a physical downlink control channel (PDCCH), a downlink control information (DCI) to the user-side electronic device, the DCI including a second beam indication information of control channel, wherein the second beam indication information of control channel indicates to the user-side electronic device an activated beam for the transmission in the physical control channel; and using the activated beam indicated by the second beam indication information of control channel to perform the transmission in the physical control channel with the user-side electronic device.

Solution 31. A communication method, comprising: receiving, through a physical downlink control channel (PDCCH), a downlink control information (DCI) from a control-side electronic device; determining, based on a first beam indication information of data channel in the DCI, a first activated beam for the physical data channel that is scheduled by the DCI; determine, based on a second beam indication information of data channel in the DCI, one or more second activated beams to be used by one or more subsequent transmissions in the physical data channel; using the first activated beam to perform a transmission in the physical data channel with the control-side electronic device; after using the first beam to perform the transmission in the physical data channel with the control-side electronic device, using the one or more second activated beams to perform the one or more subsequent transmissions in the physical data channel with the control-side electronic device.

Solution 32. A communication method, comprising: sending, through a physical downlink control channel (PDCCH), a downlink control information (DCI) to a user-side electronic device, the DCI including: a first beam indication information of data channel to indicate to the user-side electronic device a first activated beam for a transmission in the physical data channel that is scheduled by the DCI; and a second beam indication information of data channel to indicate to the user-side electronic device one or more second activated beam to be used by one or more subsequent transmissions in the physical data channel; using the first activated beam to perform the transmission in the physical data channel with the user-side electronic device; and after using the first activated beam to perform the transmission in the physical data channel with the user-side electronic device, using the one or more second activated beams to perform the one or more subsequent transmissions in the physical data channel with the user-side electronic device.

Solution 33. A computer-readable storage medium having a computer program stored thereon, wherein the computer program, when loaded and executed by a processor, is used to implement methods according to any of the solutions 30-32.

Although some specific embodiments of the present disclosure have been described in detail, those skilled in the art should understand that the foregoing embodiments are only illustrative and do not limit the scope of the present disclosure. Those skilled in the art should understand that the foregoing embodiments may be combined, modified or replaced without departing from the scope and essence of the present disclosure. The scope of the present disclosure is defined by the appended claims.

The invention claimed is:

1. An electronic device comprising:
a processing circuit configured to:
receive, from a control-side electronic device, a downlink control information (DCI) comprising an indication of a second Transmission Configuration Indication (TCI) in a case that a first TCI was activated;
decode the DCI;
in a case of correctly decoding the DCI, change a TX beam to a second TX beam for a subsequent transmission, from a first TX beam for a current transmission;
wherein the first TX beam is indicated by the first TCI; the second TX beam is indicated by the second TCI; and
wherein the DCI is a DCI used for uplink scheduling.

2. The electronic device of claim 1, wherein the first TCI was activated by a MAC Control Element (MAC CE) signaling or another DCI.

3. The electronic device of claim 1, wherein
the processing circuit is further configured to:
in a case that the DCI is not correctly decoded, use the first TX beam for the subsequent transmission.

4. The electronic device of claim 1, wherein
the processing circuit is further configured to:
extract, based on extraction parameters in a Radio Resource Control (RRC) signaling, the second TCI from the DCI.

5. The electronic device of claim 1, wherein
the processing circuit is further configured to:
in a case of correctly decoding the DCI, transmit a HARQ-ACK to the control-side electronic device; and
in a case that the DCI is not correctly decoded, transmit a HARQ-NACK to the control-side electronic device.

6. The electronic device of claim 1, wherein the first TX beam and the second TX beam are used to perform a transmission in a physical uplink shared channel (PUSCH) or a physical uplink control channel (PUCCH) with the control-side electronic device successively.

7. An electronic device comprising:
a processing circuit configured to:
send, to a user-side electronic device, a downlink control information (DCI) used for uplink scheduling, the DCI including:
a first Transmission Configuration Indication (TCI) to indicate the user-side electronic device a first TX beam; and
a second TCI to indicate the user-side electronic device a second TX beam;
change a RX beam to a second RX beam for a subsequent transmission, from a first RX beam for a current transmission;
wherein the first RX beam of the electronic device matches with the first TX beam of the user-side electronic device; the second RX beam of the electronic device matches with the second TX beam of the user-side electronic device.

8. The electronic device of claim 1, wherein
the processing circuit is further configured to:
send, through a Radio Resource Control (RRC) signaling, extraction parameters to the user-side electronic device, the extraction parameters indicating to extract the second TCI from the DCI.

9. The electronic device of claim 8, wherein the extraction parameters include a parameter identifying whether the DCI includes the second TCI.

10. A method performed by an electronic device comprising:
receiving, from a control-side electronic device, a downlink control information (DCI) comprising an indication of a second Transmission Configuration Indication (TCI) in a case that a first TCI was activated;
decoding the DCI;
in a case of correctly decoding the DCI, changing a TX beam to a second TX beam for a subsequent transmission, from a first TX beam for a current transmission;
wherein the first TX beam is indicated by the first TCI; the second TX beam is indicated by the second TCI; and
wherein the DCI is a DCI used for uplink scheduling.

11. The method of claim 10, wherein the first TCI was activated by a MAC Control Element (MAC CE) signaling or another DCI.

12. The method of claim 10, wherein in a case that the DCI is not correctly decoded, using the first TX beam for the subsequent transmission.

13. The method of claim 10, further comprising:
extracting, based on extraction parameters in a Radio Resource Control (RRC) signaling, the second TCI from the DCI.

14. The method of claim 10, further comprising:
in a case of correctly decoding the DCI, transmitting a HARQ-ACK to the control-side electronic device; and
in a case that the DCI is not correctly decoded, transmitting a HARQ-NACK to the control-side electronic device.

15. The method of claim 10, wherein the first TX beam and the second TX beam are used to perform a transmission in a physical uplink shared channel (PUSCH) or a physical uplink control channel (PUCCH) with the control-side electronic device successively.

* * * * *